(12) United States Patent
Kondo et al.

(10) Patent No.: US 11,682,355 B2
(45) Date of Patent: Jun. 20, 2023

(54) DISPLAY APPARATUS, DISPLAY CONTROL METHOD, AND PORTABLE TERMINAL APPARATUS, AND PROGRAM

(71) Applicant: Saturn Licensing LLC, New York, NY (US)

(72) Inventors: Masao Kondo, Kanagawa (JP); Fumiya Matsuoka, Kanagawa (JP); Ken Yano, Tokyo (JP); Hirotaka Tako, Kanagawa (JP)

(73) Assignee: Saturn Licensing LLC, New York, NY (US)

( * ) Notice: Subject to any disclaimer, the term of this patent is extended or adjusted under 35 U.S.C. 154(b) by 0 days.

(21) Appl. No.: 17/397,696

(22) Filed: Aug. 9, 2021

(65) Prior Publication Data

US 2022/0101802 A1    Mar. 31, 2022

Related U.S. Application Data

(63) Continuation of application No. 14/366,981, filed as application No. PCT/JP2012/082379 on Dec. 13, 2012, now abandoned.

(30) Foreign Application Priority Data

Dec. 28, 2011    (JP) ................................ 2011-288091

(51) Int. Cl.
*G09G 3/34* (2006.01)
*H04N 5/64* (2006.01)
(Continued)

(52) U.S. Cl.
CPC ......... *G09G 3/3406* (2013.01); *G06F 11/325* (2013.01); *G06F 11/326* (2013.01);
(Continued)

(58) Field of Classification Search
CPC .. G09G 3/3406; G09G 5/003; G09G 2320/08; G09G 2340/12; G09G 2340/14;
(Continued)

(56) References Cited

U.S. PATENT DOCUMENTS 6,380,967 B1    4/2002    Sacca
7,016,612 B1    3/2006    Ikeda et al.
(Continued)

FOREIGN PATENT DOCUMENTS

CN    101924675 A    12/2010
EP    1422874 A1     5/2004
(Continued)

OTHER PUBLICATIONS

Japanese Office Action dated Apr. 26. 2016 in Patent Application No. 2013-551603.
(Continued)

*Primary Examiner* — Douglas M Wilson
(74) *Attorney, Agent, or Firm* — Oblon, McClelland, Maier & Neustadt, L.L.P.

(57) ABSTRACT

The present technology relates to a display apparatus, a display control method, a portable terminal apparatus, and a program capable of representing various states of an apparatus in a limited region. A television receiver includes a display unit that displays a predetermined image, a communication unit that performs communication of image data with another image display apparatus, an indicator unit that is disposed at at least a part of surroundings of the display unit and includes an indicator which is turned on with predetermined luminance, and a control unit that turns on the indicator so as to correspond to a transmission operation of the image data in another image display apparatus. The present invention is applicable to, for example, a display apparatus such as a television receiver.

16 Claims, 47 Drawing Sheets

(51) Int. Cl.

| | | |
|---|---|---|
| *H04N 21/488* | (2011.01) | |
| *G09G 5/00* | (2006.01) | |
| *H04N 21/472* | (2011.01) | |
| *G06F 11/32* | (2006.01) | |
| *G06F 3/14* | (2006.01) | |
| *H04N 21/485* | (2011.01) | |
| *H04N 21/4788* | (2011.01) | |
| *H04N 21/426* | (2011.01) | |

(52) U.S. Cl.
CPC ............... *G09G 5/003* (2013.01); *H04N 5/64* (2013.01); *H04N 21/426* (2013.01); *H04N 21/4788* (2013.01); *H04N 21/47214* (2013.01); *H04N 21/485* (2013.01); *H04N 21/4882* (2013.01); *G06F 3/1423* (2013.01); *G09G 2320/08* (2013.01); *G09G 2340/12* (2013.01); *G09G 2340/14* (2013.01)

(58) Field of Classification Search
CPC .... G06F 11/325; G06F 11/326; G06F 3/1423; H04N 5/64; H04N 21/426; H04N 21/47214; H04N 21/4788; H04N 21/485; H04N 21/4882
See application file for complete search history.

(56) References Cited

U.S. PATENT DOCUMENTS

| | | | |
|---|---|---|---|
| 7,724,281 | B2 | 5/2010 | Vale et al. |
| 8,291,335 | B2 | 10/2012 | Okamoto |
| 2003/0145977 | A1 | 8/2003 | Vale et al. |
| 2004/0032394 | A1 | 2/2004 | Ayatsuka et al. |
| 2004/0156192 | A1 | 8/2004 | Kerr et al. |
| 2006/0171360 | A1 | 8/2006 | Kim et al. |
| 2007/0124503 | A1 | 5/2007 | Ramos et al. |
| 2008/0256471 | A1 | 10/2008 | Okamoto |
| 2009/0123086 | A1 | 5/2009 | Iwanami et al. |
| 2009/0132923 | A1 | 5/2009 | Han et al. |
| 2009/0140960 | A1 | 6/2009 | Mahowald |
| 2010/0281363 | A1 | 11/2010 | Inaba |
| 2010/0313143 | A1* | 12/2010 | Jung .................... G06F 3/1446 715/753 |
| 2010/0321403 | A1 | 12/2010 | Inadome |
| 2011/0018849 | A1* | 1/2011 | Lowe .................... G09G 5/003 345/205 |
| 2011/0051019 | A1 | 3/2011 | Hardacker et al. |
| 2011/0074835 | A1 | 3/2011 | He et al. |
| 2011/0122069 | A1 | 5/2011 | Asakura et al. |
| 2011/0197147 | A1 | 8/2011 | Fai |
| 2011/0267374 | A1 | 11/2011 | Sakata et al. |
| 2012/0057085 | A1 | 3/2012 | Sasaki |
| 2012/0133301 | A1 | 5/2012 | Kerr et al. |
| 2014/0285096 | A1 | 9/2014 | Cuppen et al. |

FOREIGN PATENT DOCUMENTS

| | | |
|---|---|---|
| EP | 1 763 184 A2 | 3/2007 |
| EP | 2226713 A1 | 9/2010 |
| JP | 2005-267897 A | 9/2005 |
| JP | 2007-180852 A | 7/2007 |
| JP | 2008-257442 A | 10/2008 |
| RU | 2 427 097 C2 | 8/2011 |
| WO | 0203186 A2 | 1/2002 |
| WO | 2010-007851 A1 | 1/2010 |
| WO | 2011/028706 A3 | 3/2011 |
| WO | 2011-073817 A1 | 6/2011 |

OTHER PUBLICATIONS

Combined Chinese Office Action and Search Report dated Dec. 2, 2016 in Patent Application No. 201280063446.8 (with partial English translation and English translation of categories of cited documents).
Office Action dated May 24, 2017 in Chinese Patent Application No. 201280063446.8 (English translation only).
Office Action dated Nov. 17, 2016 in Japanese Patent Application No. 2013-551603.
Office Action dated Jun. 26, 2015 in Russian Patent Application No. 2014125279 (English translation only).
Combined Office Action and Search Report dated Dec. 2, 2016 in Chinese Patent Application No. 201280063446.8 (English translation only).
International Search Report from International Publication PCT/JP2012/082379 dated Feb. 25, 2013.
Extended European Search Report dated Jul. 29, 2015 in patent application No. 12863300.5.

\* cited by examiner

DISPLAY APPARATUS, DISPLAY CONTROL METHOD, AND PORTABLE TERMINAL APPARATUS, AND PROGRAM

RELATED APPLICATIONS

This application is a continuation of U.S. Ser. No. 14/366,981, filed on Jun. 19, 2014, which is incorporated by reference. U.S. Ser. No. 14/366,981 is a National Stage of PCT/JP2012/082379, filed on Dec. 13, 2012, and claims the benefit of priority under 35 U.S.C. § 119 of Japanese Application No. 2011-288091, filed on Dec. 28, 2011.

TECHNICAL FIELD

The present technology relates to a display apparatus, a display control method, and a portable terminal apparatus, and a program, and particularly to a display apparatus, a display control method, and a portable terminal apparatus, and a program capable of representing various states of an apparatus in a limited region.

BACKGROUND ART

In recent years, in a television receiver, a frame part in the vicinity of a panel which displays an image has been gradually narrowed (narrowing of a frame). In the related art, for example, a light reception part of a remote controller, an indicator (lamp) indicating power-on, standby, and the like, operation buttons for setting operations of a main body, and the like are disposed at the frame part (for example, refer to Patent Literature 1).

CITATION LIST

Patent Literature

PTL 1: Japanese Unexamined Patent Application Publication No. 2005-267897

SUMMARY OF INVENTION

Technical Problem

However, a region for disposing an indicator indicating an operation or a state of a display apparatus is restricted due to narrowing of the frame part, and thus a new method of representing an operation or the like of the display apparatus is desirable.

The present technology has been made in consideration of these circumstances, and enables various states of an apparatus to be represented in a limited region.

Solution to Problem

According to a first aspect of the present technology, there is provided a display apparatus including a display unit that displays a predetermined image; a communication unit that performs communication of image data with another image display apparatus; an indicator unit that is disposed at at least a part of surroundings of the display unit and includes an indicator which is turned on with predetermined luminance; and a control unit that turns on the indicator so as to correspond to a transmission operation of the image data in another image display apparatus.

According to the first aspect of the present technology, there is provided a display control method for a display apparatus including a display unit that displays a predetermined image, a communication unit that performs communication of image data with another image display apparatus, an indicator unit that is disposed at at least a part of surroundings of the display unit and includes an indicator which is turned on with predetermined luminance, and a control unit that controls turning-on of the indicator, the method including causing the control unit to turn on the indicator so as to correspond to a transmission operation of the image data in another image display apparatus.

According to the first aspect of the present technology, there is provided a program causing a computer which controls a display apparatus, to perform the process of turning on an indicator so as to correspond to a transmission operation of image data in another image display apparatus, in which the display apparatus includes a display unit that displays a predetermined image; a communication unit that performs communication of image data with another image display apparatus; and an indicator unit that is disposed at at least a part of surroundings of the display unit and includes the indicator which is turned on with predetermined luminance.

In the first aspect of the present technology, the indicator is controlled to be turned on so as to correspond to a transmission operation of image data in another image display apparatus.

According to a second aspect of the present technology, there is provided a portable terminal apparatus including a communication unit that performs transmission of image data with an image display apparatus; a display unit that displays an instruction image for instructing a transmission operation of the image data; and a control unit that changes a turning-on state of an indicator of the image display apparatus so as to correspond to a user's transmission operation of the image data based on the instruction image.

In the second aspect of the present technology, a turning-on state of the indicator of the image display apparatus is controlled to be changed so as to correspond to a user's transmission operation based on the instruction image for instructing a transmission operation of the image data, displayed on the display unit.

According to a third aspect of the present technology, there is provided a display apparatus including a display unit that displays a predetermined image; a communication unit that performs communication of image data with another image display apparatus; an indicator unit that is disposed at at least a part of surroundings of the display unit and includes an indicator which is turned on with predetermined luminance; and a control unit that turns on the indicator during communication of the image data with another image display apparatus, in which the control unit turns on the indicator of the indicator unit only during a predetermined period before or after an indicator of another image display apparatus is turned on only during a predetermined period.

According to the third aspect of the present technology, there is provided a display control method for a display apparatus including a display unit that displays a predetermined image, a communication unit that performs communication of image data with another image display apparatus, an indicator unit that is disposed at at least a part of surroundings of the display unit and includes an indicator which is turned on with predetermined luminance, and a control unit that turns on the indicator during communication of the image data with another image display apparatus, the method including causing the control unit to turn on the indicator of the indicator unit only during a predetermined period before or after an indicator of another image display apparatus is turned on only during a predetermined period.

According to the third aspect of the present technology, there is provided a program causing a computer which controls a display apparatus, to perform the process of turning on an indicator of an indicator unit only during a predetermined period before or after an indicator of another image display apparatus is turned on only during a predetermined period while communication of image data with another image display apparatus is performed, in which the display apparatus includes a display unit that displays a predetermined image; a communication unit that performs communication of the image data with another image display apparatus; and an indicator unit that is disposed at at least a part of surroundings of the display unit and includes the indicator which is turned on with predetermined luminance.

In the third aspect of the present technology, control is performed so that the indicator of the indicator unit is turned on only during a predetermined period before or after an indicator of another image display apparatus is turned on only during a predetermined period while communication of image data with another image display apparatus is performed.

The display apparatus may be a standalone apparatus, and may be an internal block which forms a single apparatus.

Advantageous Effects of Invention

According to the first to third aspects of the present technology, it is possible to represent various states of an apparatus in a limited region.

DESCRIPTION OF EMBODIMENTS

Figure 1:
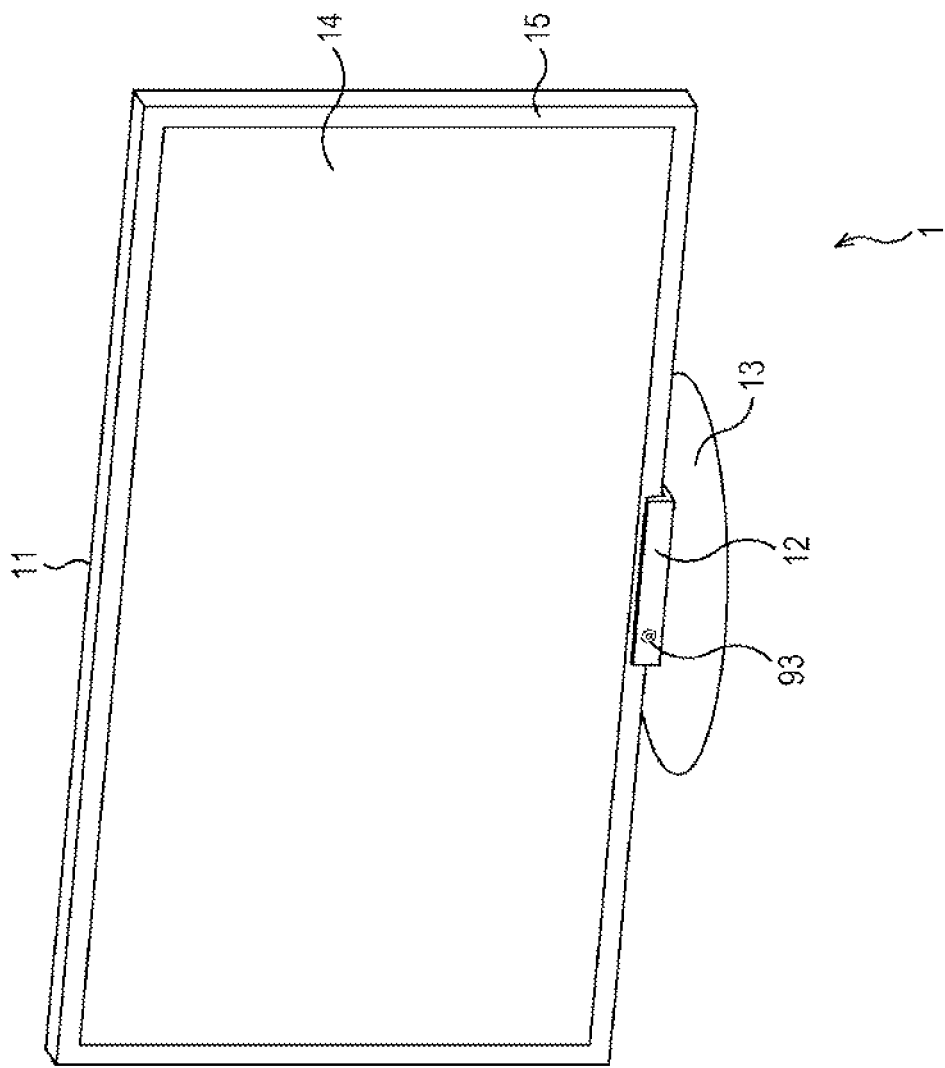
FIG. 1 is a perspective view of a television receiver as an embodiment of a display apparatus to which the present technology is applied.

Hereinafter, embodiments of the present technology will be described. In addition, the description will be made in the following order.

1. Exterior configuration example of display apparatus
2. Control block diagram
3. Basic turning-on example of LED indicator
4. Sequence turning-on example of LED indicator
5. Cooperative turning-on example with image display
6. Turning-on representation of LED indicator corresponding to TV operation
7. Cooperative turning-on representation in image erasure operation
8. Cooperation between video chatting screen and LED indicator
9. Information representation of LED indicator based on image viewing experience
10. Cooperative representation corresponding to user's operation performed on smart unit
11. Flowchart for realizing cooperative representation

[1. Exterior Configuration Example of Display Apparatus]

FIG. 1 illustrates an exterior configuration example of a television receiver as an embodiment of a display apparatus to which the present technology is applied.

A television receiver (hereinafter, referred to as a TV) 1 of FIG. 1 includes a display main body 11, a smart unit 12, and a stand 13. The display main body 11 includes a display 14 which displays a predetermined image such as an image of a received broadcast program, and a frame part 15 disposed at a surrounding part thereof.

The smart unit 12 is an indicator unit which includes at least a light emitting diode (LED) indicator 84 (FIG. 4) as a turning-on part which represents an operation or a state of the TV 1 through illumination. A camera 93 is provided on a front surface of the smart unit 12.

In addition, the smart unit 12 is disposed at the frame part 15 on the lower side of the display main body 11 in FIG. 1, but the smart unit 12 may be disposed at the frame part 15 on any of the upper side, the left side, and the right side of the display main body 11. In other words, the smart unit 12 may be disposed at at least a part of the vicinity of the display 14.

Figure 2:
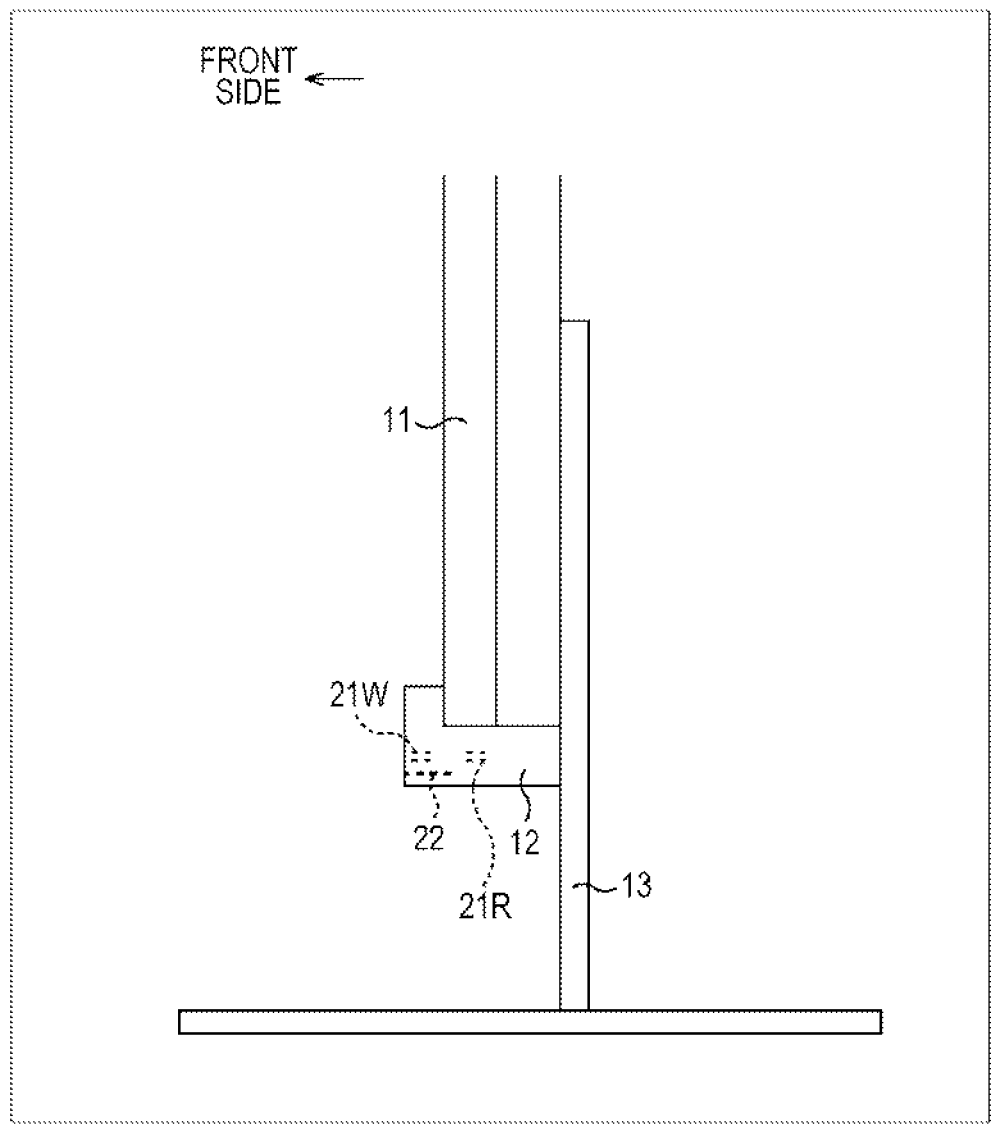
FIG. 2 is a diagram illustrating a configuration of an LED indicator of a smart unit.
Figure 3:
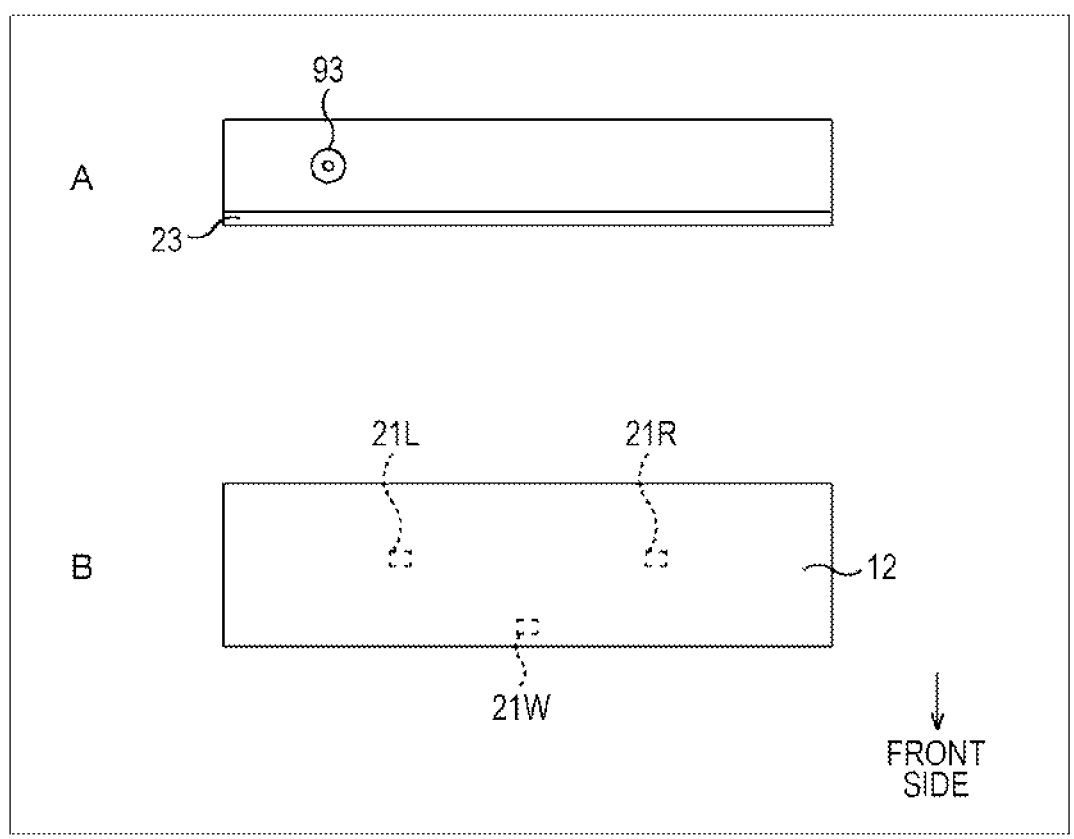
FIG. 3 is a diagram illustrating a configuration of the LED indicator of the smart unit.

With reference to FIGS. 2 and 3, a configuration of the LED indicator 84 of the smart unit 12 will be described.

FIG. 2 is an enlarged side view of the vicinity of the smart unit 12 for illustrating the LED indicator 84 of the smart unit 12, FIG. 3A is a front view of the smart unit 12, and FIG. 3B is a diagram illustrating an arrangement of the LED indicator 84 when the smart unit 12 is viewed from the top. In addition, in FIGS. 2 and 3, a scale of the smart unit 12, an arrangement of respective parts of the smart unit 12, and the like are changed for better understanding of description.

The LED indicator 84 includes, as illustrated in FIG. 3B, a single white LED 21W, and two color LED 21L and LED 21R. The white LED 21W is disposed at a center of the smart unit 12 in the horizontal direction, and is disposed slightly toward the front side in the front and rear directions. The color LED 21L is disposed on the rear side and left side of the white LED 21W, and the color LED 21R is disposed on the rear side and the right side of the white LED 21W. The white LED 21W is a single white LED, and emits white light. The color LEDs 21L and 21R are constituted by three LEDs such as red (R), green (G), and blue (B), and can emit light in predetermined colors.

Light from the white LED 21W is output from an output part 23 (FIG. 3A) on the front side of the smart unit 12 via a lightguide plate (not illustrated). Light from the color LED 21L and the color LED 21L is output from the output part 23 (FIG. 3A) on the front side of the smart unit 12 and an output part 23 (not illustrated) on the lower side of the smart unit 12 via the lightguide plate (not illustrated).

As illustrated in FIG. 2, an electrode pad which is a part of a touch sensor 85 (FIG. 4) and a film antenna 22 including an antenna for NFC communication are buried around the bottom of the smart unit 12. Accordingly, as will be described later, it is possible to detect contact or proximity (becoming close at a distance within several tens of millimeters) of a user's hand, finger, and the like, and proximity of an NFC communication apparatus to the smart unit 12.

In the following description, the white LED 21W, the color LED 21L, and the color LED 21R are also simply referred to as an LED 21W, an LED 21L, and an LED 21R. In addition, in a case where the LED 21W, the LED 21L, and the LED 21R are not required to be differentiated from each other, they are also simply referred to as LEDs 21.

[2. Control Block Diagram]

Figure 4:
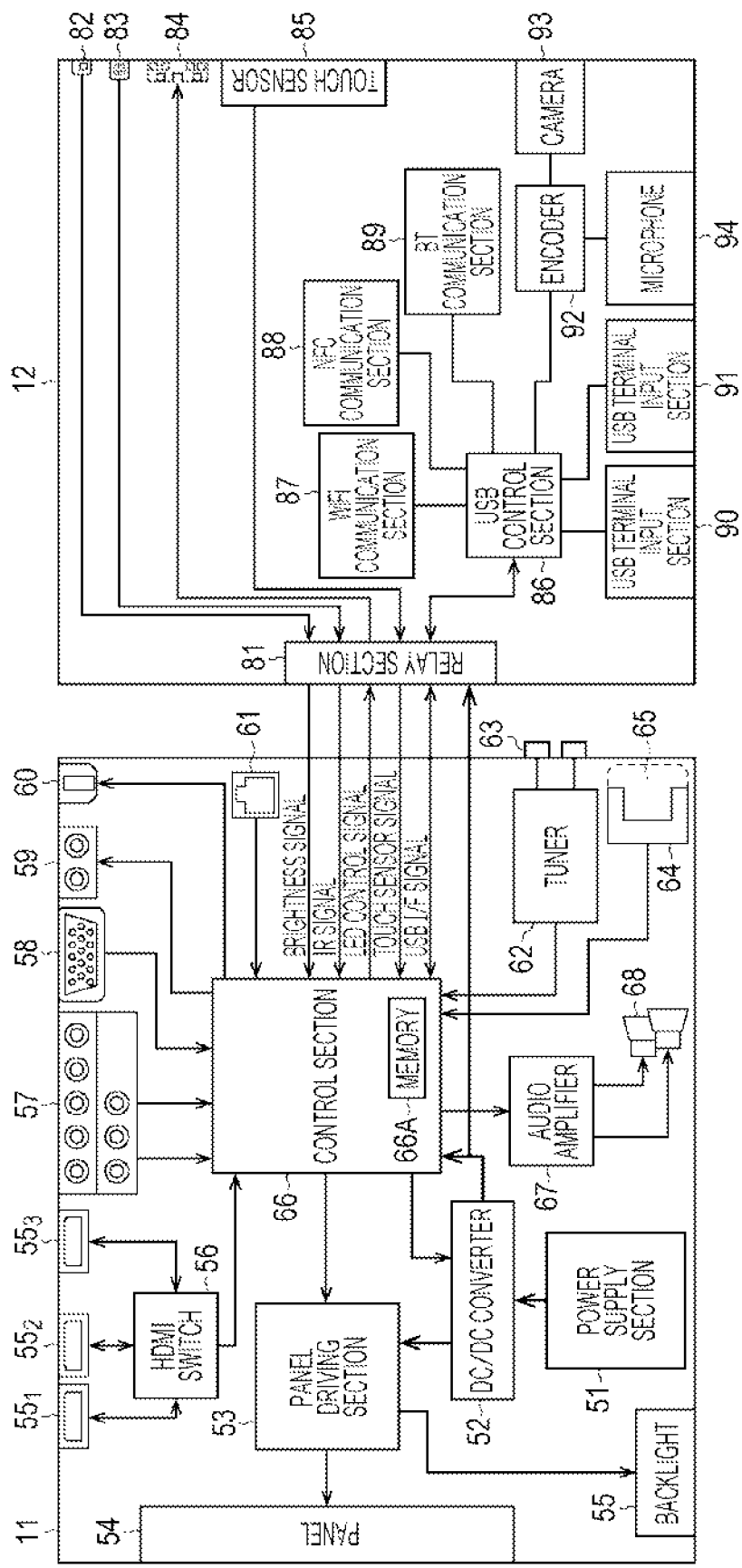
FIG. 4 is a control block diagram of a TV.

FIG. 4 illustrates a control block diagram of the TV 1.

First, a configuration of the display main body 11 of the TV 1 will be described.

A power supply section 51 is connected to an external AC power source, and coverts received AC power into DC power with a predetermined voltage which is then supplied to a DC/DC converter 52. The DC/DC converter 52 converts a first power source voltage supplied from the power supply section 51 into a second power source voltage which is then supplied to respective parts such as a panel driving section 53, a control section 66, and the smart unit 12. In addition, the power source voltage supplied to the respective parts may be the same or different.

The panel driving section 53 drives a panel 54 and a backlight 55 on the basis of an image signal supplied from the control section 66, so as to display an image. The panel 54 and the backlight 55 correspond to the display 14 of FIG. 1. The panel 54 controls an aperture of a liquid crystal of each pixel on the basis of driving control by the panel driving section 53.

The backlight 55 emits light with predetermined luminance on the basis of driving control by the panel driving section 53. In other words, the display 14 of FIG. 1 is a liquid crystal display (LCD), and the backlight 55 is disposed on a rear surface side of the panel 54.

Each of HDMI terminals $55_1$ to $55_3$ transmits and receives a high-definition multimedia interface (HDMI) signal to and from an external apparatus which is a connection destination of each terminal. An HDMI switch 56 appropriately switches HDMI terminals $55_1$ to $55_3$ on the basis of an HDMI control signal, and thus relays an HDMI signal which is transmitted and received between external apparatuses connected to the HDMI terminals 55₁ to 55₃ and the control section 66.

An analog AV input terminal 57 receives an analog audio and visual (AV) signal from an external apparatus, and supplies the signal to the control section 66.

A PC input terminal 58 is formed by, for example, mini D-Sub 15-pin terminals, and receives an analog image signal among AV signals output from a personal computer so as to supply the signal to the control section 66.

An analog audio output terminal 59 outputs an analog audio signal which is supplied from the control section 66, to an external apparatus which is a connection destination. An optical digital sound output terminal 60 outputs an optical digital signal of sounds supplied from the control section 66, to an external apparatus which is a connection destination.

A LAN terminal 61 is constituted by, for example, 10 BASE-T/100 BASE-TX connector or the like, and is connected to a predetermined network such as a home network or the Internet.

A tuner 62 is connected to an antenna (not illustrated) via an antenna terminal 63, and acquires a broadcast signal of a predetermined channel from electric waves received by the antenna so as to supply the signal to the control section 66. In addition, in the present embodiment, electric waves which are received by the tuner 62 are assumed to be, for example, a broadcast signal of terrestrial digital broadcast.

A B-CAS (registered trademark) card 65 which stores an encryption key for descrambling terrestrial digital broadcast is inserted into a CAS card I/F 64. The CAS card I/F 64 reads the encryption key stored in the B-CAS (registered trademark) card 65 so as to supply the encryption key to the control section 66.

The control section 66 controls the entire TV 1 on the basis of a control program stored in an internal memory 66A including a read only memory (ROM) and the like. The control section 66 performs, for example, an A/D (analog to digital) conversion process or a D/A (digital to analog) conversion process of an image signal or an audio signal, a descramble process a decoding process of a broadcast signal, and the like. In addition, the control section 66 also performs control based on a brightness signal, an IR signal, a touch sensor signal, and a USB I/F signal from the smart unit 12 described later or LED control of the LED indicator 84. The control section 66 may be constituted by a system on a chip (SoC) in which a central processing unit (CPU), a micro processing unit (MPU), a dynamic random access memory (DRAM), and the like are integrated into a single chip.

The control program stored in the internal memory 66A may be installed via a USE memory or a hard disk device connected to a USB terminal input part 90 described later, or via a wired or wireless transmission medium such as a home network or the Internet.

An audio amplifier 67 amplifies an analog audio signal supplied from the control section 66 so as to supply the amplified signal to a speaker 68. The speaker 68 outputs sounds corresponding to the analog audio signal from the audio amplifier 67.

Next, a configuration of the smart unit 12 of the TV 1 will be described.

Power supplied from the display main body 11 is supplied to the respective parts of the smart unit 12 via a relay section 81. In addition, a brightness signal, an IR signal, an LED control signal, a touch sensor signal, and a USE I/F signal described later are also transmitted and received between the display main body 11 and the control section 66 of the smart unit 12 via the relay section 81.

A brightness sensor 82 detects brightness of surroundings of the TV 1 (for example, brightness of a room where the TV 1 is installed), and supplies a detection result to the control section 66 as a brightness signal.

An IR reception section 83 receives, for example, an IR signal which is emitted from a remote controller and corresponds to a user's operation when the user operates the remote controller (not illustrated), and supplies the IR signal to the control section 66.

The LED indicator 84 turns on or turns off the LEDs on the basis of an LED control signal from the control section 66.

The touch sensor 85 includes, for example, a plurality of electrodes whose capacitances vary according to proximity of a human finger or the like. The touch sensor 85 detects a proximity operation and a contact operation of a user on the basis of variations in capacitances of the plurality of electrodes, and supplies a detection result thereof to the control section 66 as a touch sensor signal.

A USB control section 86 is connected to the relay section 81, a Wireless Fidelity (Wi-Fi) communication section 87, a near field communication (NFC) communication section 88, Bluetooth (registered trademark; BT) communication section 89, universal serial bus (USB) terminal input sections 90 and 91, and an encoder 92.

The USB control section 86 acquires a USB I/F signal conforming to a USE standard, supplied from each of the Wi-Fi communication section 87, the NFC communication section 88, the BT communication section 89, the USB terminal input section 90, the USE terminal input section 91, and the encoder 92, and outputs the signal to the control section 66. In addition, the USE control section 86 appropriately distributes a USB I/F signal which is supplied from the control section 66 via the relay section 81, to the Wi-Fi communication section 87, the NFC communication section 88, the BT communication section 89, the USB terminal input section 90, the USB terminal input section 91, or the encoder 92.

The Wi-Fi communication section 87 transmits data supplied from the USB control section 86 as a USB I/F signal, to other communication apparatuses such as a mobile phone through wireless communication using a Wi-Fi communication method. In addition, the Wi-Fi communication section 87 receives data which is transmitted from other communication apparatuses (Wi-Fi apparatuses) through Wi-Fi wireless communication, and supplies the data to the USB control section 86 as a USB I/F signal.

The NFC communication section 88 transmits data supplied from the USB control section 86 as a USB I/F signal, to other communication apparatuses (NFC apparatuses) such as a mobile phone through near field communication using NFC defined in ISO/IEC 18092. In addition, the NFC communication section 88 receives data which is transmitted from other communication apparatuses through near field communication, and supplies the data to the USB control section 86 as a USE I/F signal.

The BT communication section 89 transmits data supplied from the USB control section 86 as a USB I/F signal, to other communication apparatuses such as a mobile phone through wireless communication (BT communication) using Bluetooth (registered trademark). In addition, the BT communication section 89 receives data which is transmitted from other communication apparatuses (BT apparatuses) through BT communication, and supplies the data to the USE control section 86 as a USB I/F signal.

The USB terminal input section 90 and the USB terminal input section 91 are connectors to which a USB terminal is connected. For example, a USB memory, a hard disk storage device as an external storage device is connected to the USB terminal input section 90 or the USB terminal input section 91. The USB terminal input section 90 and the USB terminal input section 91 are provided so as to oppose each other, for example, on both side surfaces of a casing of the smart unit 12.

The encoder 92 is connected to the camera 93 and a microphone 94. The camera 93 is constituted by an imaging element such as a charge coupled device (CCD) or a complementary metal oxide semiconductor (CMOS) image sensor, and supplies an image signal obtained through imaging to the encoder 92. The microphone 94 supplies an audio signal obtained through collection of sounds to the encoder 92. The encoder 92 performs signal processes such as an A/D conversion process and encoding process of an image signal and an audio signal, and supplies a processed signal to the USB control section 86 as a USB I/F signal.

Figure 5:
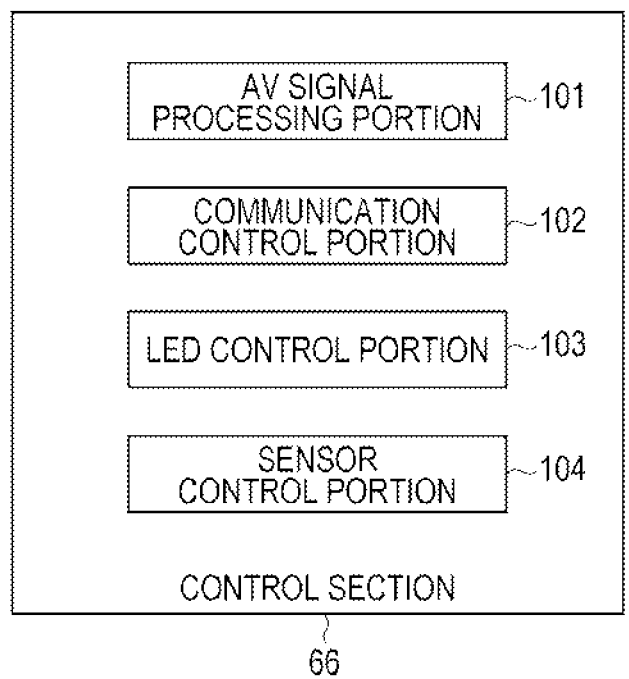
FIG. 5 is a more detailed functional block diagram of a control section of the TV.

FIG. 5 illustrates a more detailed functional block diagram of the control section 66.

In the control section 66, the control program stored in the internal memory 66A is executed, and thus at least an AV signal processing portion 101, a communication control portion 102, an LED control portion 103, and a sensor control portion 104 are realized.

The AV signal processing portion 101 performs control for displaying a predetermined image on the display 14. For example, the AV signal processing portion 101 performs input and output processes, an A/D (analog to digital) conversion process and a D/A (digital to analog) conversion process of an image signal and an audio signal, a descramble process of a broadcast signal, a decoding process, and the like.

The communication control portion 102 performs control of communication with a network connected via the LAN terminal 61, Wi-Fi communication, NFC communication, BT (Bluetooth (registered trademark)) communication, and the like.

The LED control portion 103 performs LED control of the LED indicator 84. Specifically, the LED control portion 103 controls a current supplied to the LED through pulse width modulation (PWM) control so as to control emission luminance. The PWM control is a method in which an On-state and an Off-state of a current are changed through switching so that a ratio (duty ratio) of the On-state and Off-state is varied, and thus an average current is controlled.

The sensor control portion 104 acquires a brightness signal from the brightness sensor 82, an IR signal from the IR reception section 83, an imaging signal obtained by the camera 93, or the like, and performs control according to the acquired signal. The sensor control portion 104 also controls the AV signal processing portion 101, the communication control portion 102, and the LED control portion 103 according to the acquired signal.

In the TV 1 configured as mentioned above, illumination (representation using light) for allowing a user to intuitively recognize an operation or a state of the TV 1, or an operation performed on the TV 1 by the user, is performed through cooperation between a display image of the display 14 and turning-on of the LED indicator 84 of the smart unit 12. Hereinafter, a description will be made of various representations using a display image of the display 14 and turning-on of the LED indicator 84 of the smart unit 12.

[3. Basic Turning-on Example of LED Indicator 84]

First, a description will be made of the simplest turning-on method of the LED indicator 84 of the smart unit 12.

FIG. 6A illustrates a display example in a case where only the central LED 21W is turned on in the LED indicator 84, and FIG. 6B illustrates a display example in a case where the three LEDs 21 are turned on in white.

Figure 6:
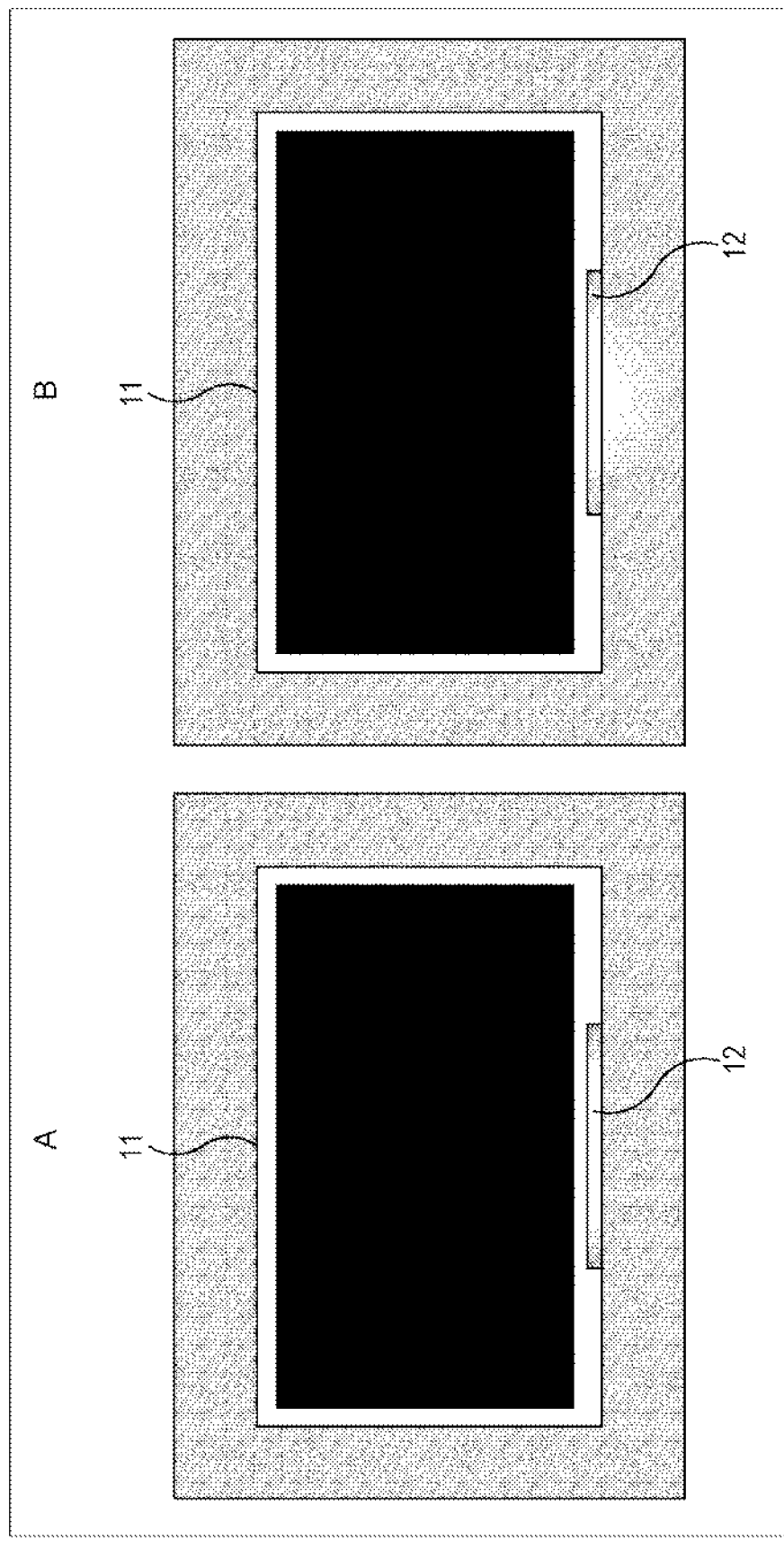
FIG. 6 is a diagram illustrating a basic turning-on example of the LED indicator.

In addition, in FIG. 6 and the subsequent drawings, for better understanding of a turning-on representation, each constituent element of the smart unit 12 is omitted, and turning-on or turning-off of the LED indicator 84 of the smart unit 12 is illustrated in a predetermined appropriate density. Further, in the following description, turning-on or turning-off of the LED indicator 84 is also referred to as turning-on or turning-off of the smart unit 12.

As described with reference to FIG. 2, the light from the LED 21W is output from only (the output part 23 on) the front side of the smart unit 12. Therefore, in a case where only the LED 21W is turned on, as illustrated in FIG. 6A, only the front surface of the smart unit 12 emits light in a linear shape.

The light from the LED 21L and the LED 21R is output from (the output parts 23 on) the front side and the lower side of the smart unit 12. Therefore, in a case where the three LEDs 21 are turned on, as illustrated in FIG. 6B, hemispherical light is formed in the vertical downward direction from the smart unit 12 in addition to the light emission of the front surface of the smart unit 12.

Figure 7:
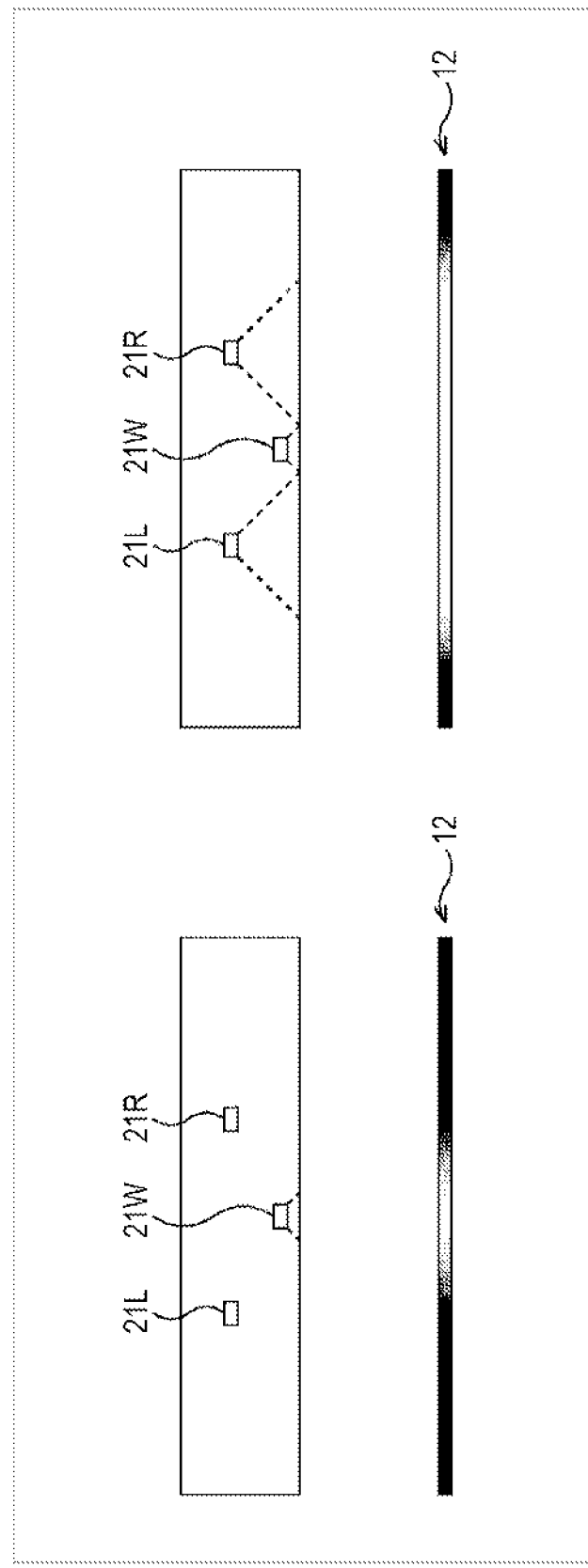
FIG. 7 is a diagram illustrating a basic turning-on example of the LED indicator.

FIG. 7 illustrates an arrangement of the three LEDs 21 when the smart unit 12 is viewed from the top and a turning-on example of the front side of the smart unit 12.

In a case where only the LED 21W is turned on, the LED 21W is disposed on the central front side of the smart unit 12, and thus only the center of the linear smart unit 12 emits light in a dot shape as illustrated in the left part of FIG. 7.

On the other hand, in a case where the two LEDs 21L and 21R disposed on the left and right rear sides are turned on along with the central LED 21W, the smart unit 12 emits light in a linear shape as illustrated in the right part of FIG. 7.

As mentioned above, two types of emission states including a dot representation and a line representation are used separately with the LED indicator 84, and thus it is possible to represent, for example, a difference in a state such as a power-on state and a standby state of the TV 1.

In a case where two types of emission states including a dot representation and a line representation are represented, a user can recognize a difference in the two types of states of the TV 1 even if a color is not discriminated. In a case where such a representation is performed, the two color LEDs 21L and 21R may be turned on in white, and thus the representation can be realized even if the two color LEDs 21L and 21R are white LEDs.

Figure 8:
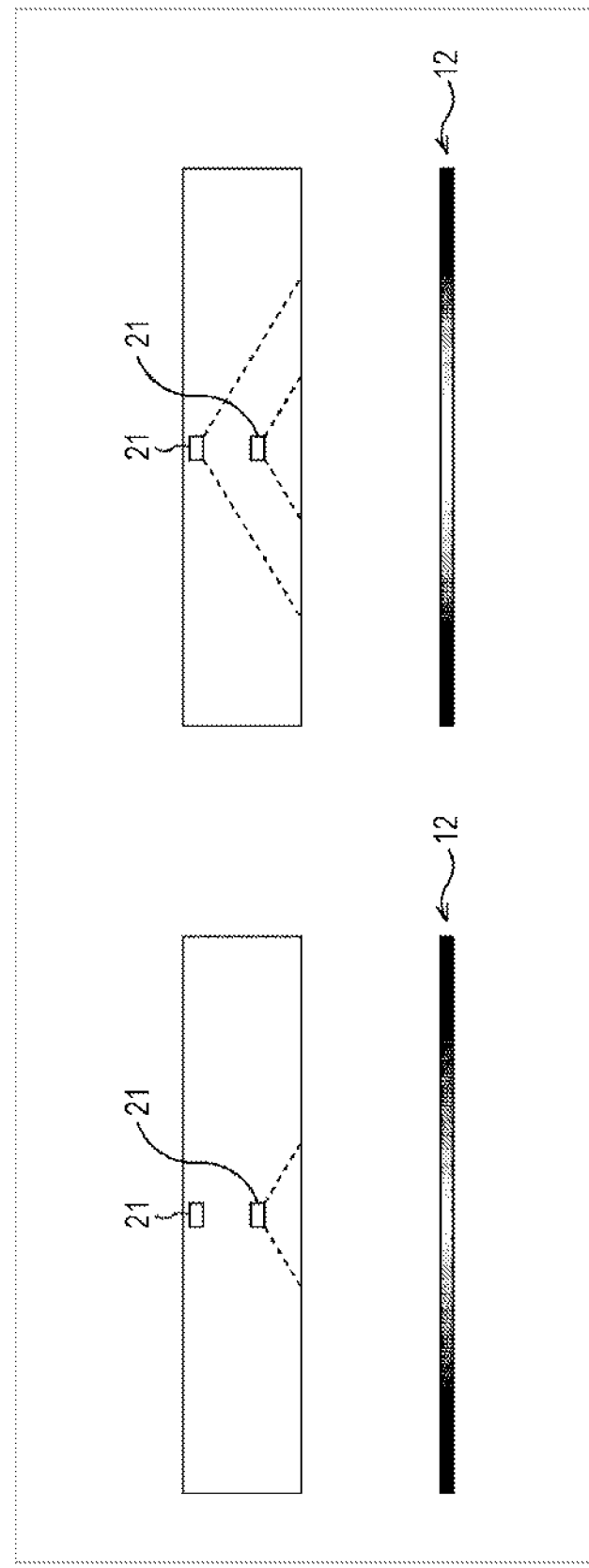
FIG. 8 is a diagram illustrating a basic turning-on example of the LED indicator.
Figure 9:
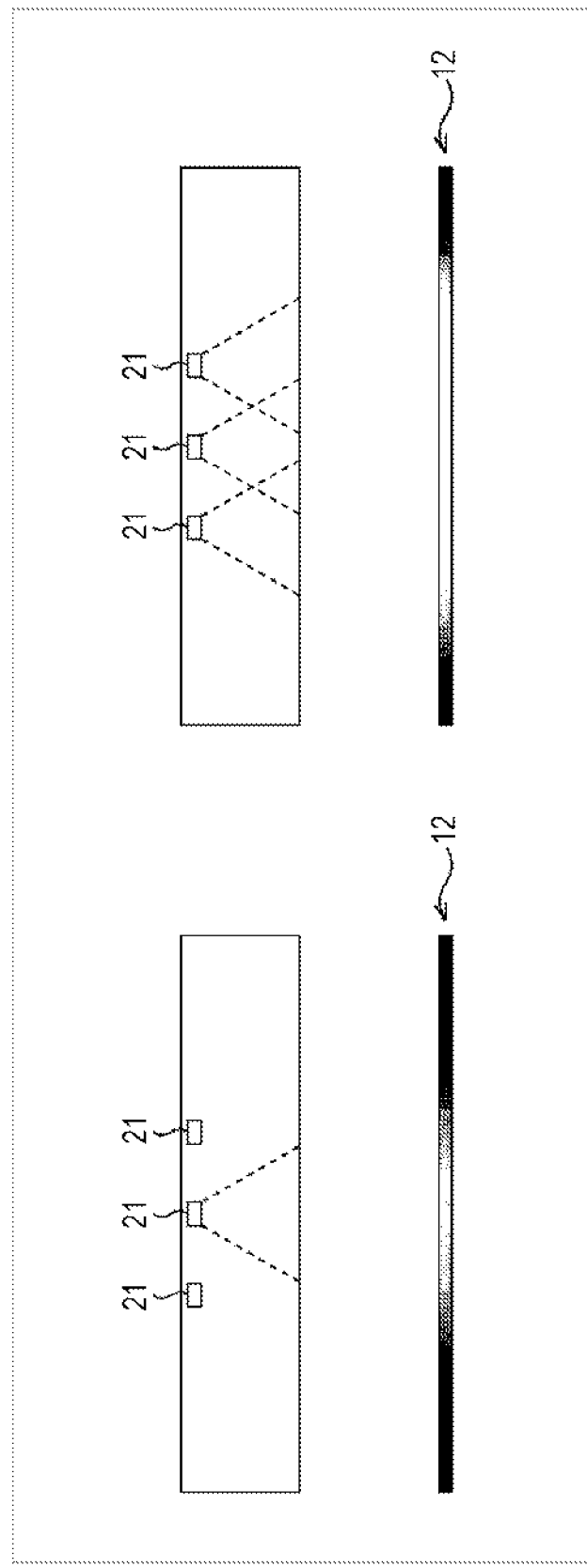
FIG. 9 is a diagram illustrating a basic turning-on example of the LED indicator.

In addition, in the present embodiment, the LED indicator 84 is constituted by the three LEDs 21, but, for example, as illustrated in FIG. 8, two types of emission states including a dot representation and a line representation can be represented even by using two LEDs 21 disposed on front and rear sides. Further, for example, as illustrated in FIG. 9, two types of emission states including a dot representation and a line representation can be represented even in a case where three LEDs 21 are disposed so as to be arranged in the horizontal direction.

In other words, in the present embodiment, the LED indicator 84 is formed by a single LED 21 disposed on the central front side, and the two LEDs 21 disposed on the left and right rear sides, but the number of LEDs 21 forming the LED indicator 84 may be two or more, and an arrangement of the LEDs 21 may also be determined as appropriate.

In addition, for convenience of description, FIGS. 6 to 9 illustrate that light is not emitted from both ends of the smart unit 12, but, in practice, the LED indicator 84 can emit light up to both ends of the smart unit 12.

[4. Sequence Turning-on Example of LED Indicator 84]

The example described with reference to FIGS. 6 to 9 is a turning-on example in a case where one or more LEDs 21 are turned on and off with predetermined emission luminance.

Figure 10:
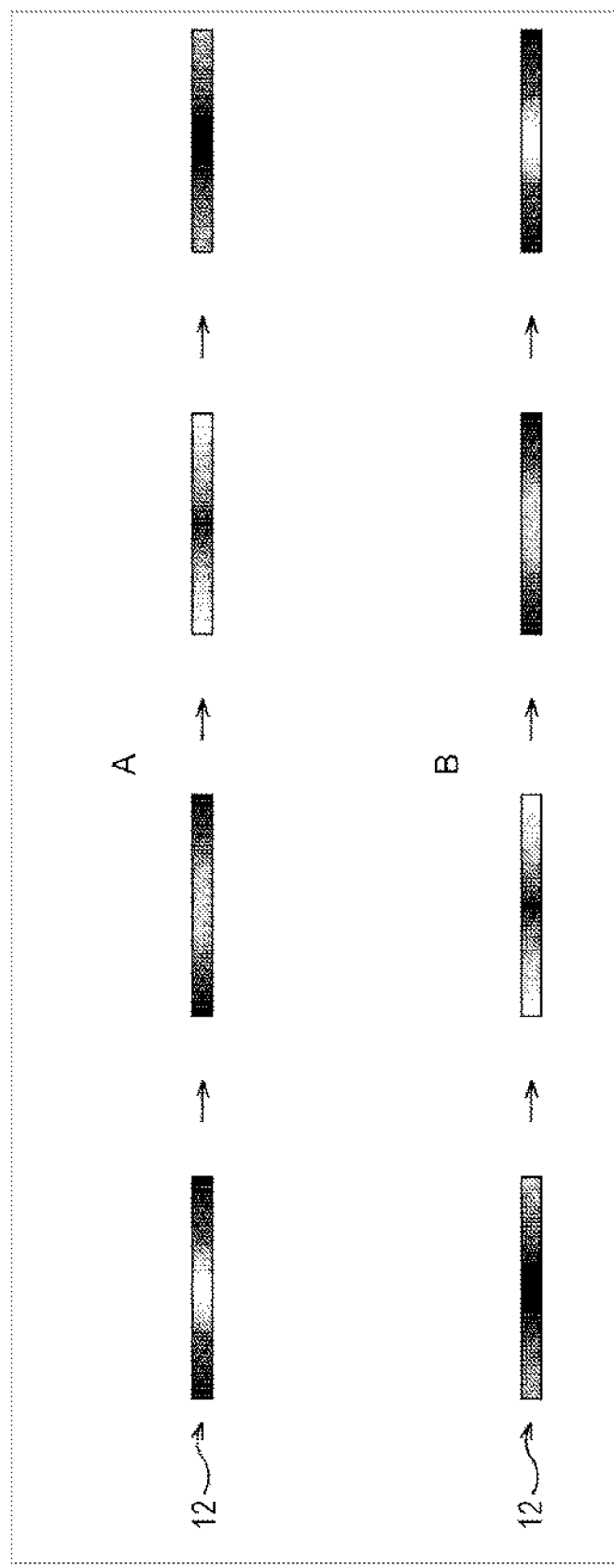
FIG. 10 is a diagram illustrating a sequence turning-on example of the LED indicator.

FIG. 10 illustrates a turning-on example in a case where emission luminance of one or more LEDs 21 is continuously varied through PWM control.

If the LED control portion 103 performs control so as to first turn on the white LED 21W on the central front side, then gradually reduce light and also gradually turn on the color LEDs 21L and 21R on the left and right rear sides in white, and then reduce light, a turning-on representation as illustrated in FIG. 10A is possible. In other words, a turning-on representation becomes possible in which the central part of the linear smart unit 12 emits light, and the light moves and flows in the horizontal direction.

In addition, if control reverse to the turning-on control of FIG. 10A is performed, a turning-on representation as illustrated in FIG. 10B becomes possible. In other words, a turning-on representation becomes possible in which both ends of the linear smart unit 12 emit light, and the light moves and flows toward the central part.

Such a turning-on representation for varying a turning-on position and luminance with the passage of time may be employed as a representation for indicating a continuous operation of the TV 1. For example, the turning-on representation may be a representation indicating an operation in a case where the TV 1 is connected to an external apparatus such as a remote controller, a personal computer (PC), or a mobile phone (smart phone). In a case where the turning-on representation of FIG. 10A is performed, a user can recognize an operation in which data is output (transmitted) from the TV 1 to an external apparatus by using the smart unit 12 as a core or an input and output portion of the TV 1. In a case where the turning-on representation of FIG. 10B is performed, the user can recognize an operation in which data is input to the TV 1 from the external apparatus.

[5. Cooperative Turning-on Example with Image Display]

Figure 11:
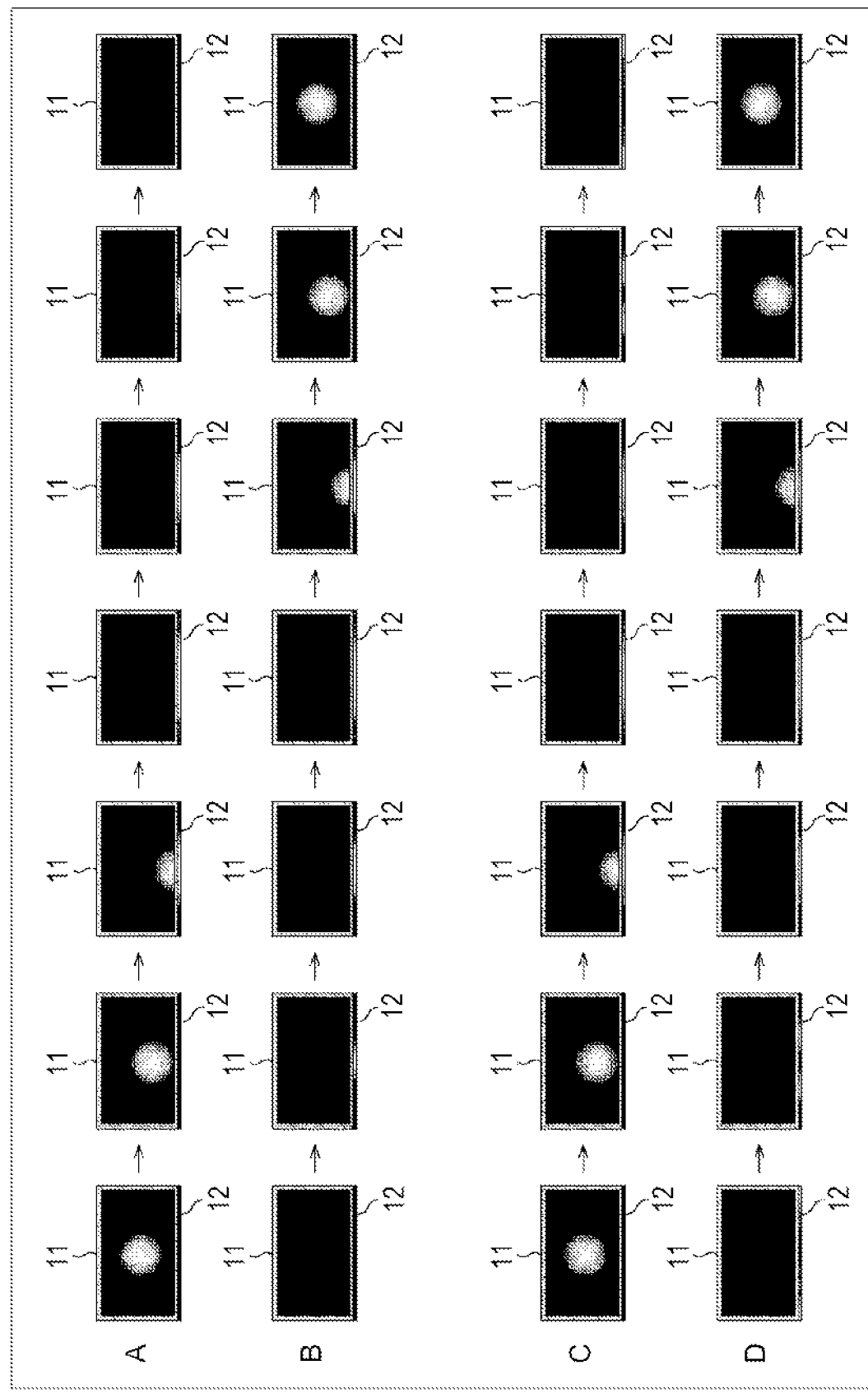
FIG. 11 is a diagram illustrating a turning-on example of the LED indicator cooperating with image display.

FIG. 11 illustrates an example of a cooperative turning-on representation in which image display of the display 14 is additionally combined with the turning-on representation of the LED indicator 84 illustrated in FIG. 10. In addition, in FIG. 11, for better understanding of a turning-on representation of the smart unit 12, a width of the smart unit 12 is illustrated so as to be the same as a width of the display main body 11.

FIG. 11A illustrates an example of a turning-on representation in which turning-on by the single white LED 21W is combined with image display of the display 14, and an example of a turning-on representation for allowing a user to recognize data output in the same manner as in FIG. 10A.

In FIG. 11A, first, an image in which white light is disposed at a screen center is displayed on the display 14. In addition, the light displayed at the screen center gradually moves in the downward direction of the screen toward the smart unit 12. In addition, if the light on the display 14 disappears, the white LED 21W of the smart unit 12 is turned on, and is then turned off.

FIG. 11B illustrates an example of a turning-on representation in which turning-on by the single white LED 21W is combined with image display of the display 14, and an example of a turning-on representation for allowing the user to recognize data input in the same manner as in FIG. 10B.

In FIG. 11B, first, the white LED 21W is turned on at the center of the smart unit 12, and is then turned off. Along with the turning-off of the white LED 21W, an image in which white light appears around the smart unit 12 in the screen is displayed on the display 14. In addition, an image in which the white light displayed on the screen gradually moves in the upward direction of the screen and disappears at the screen center is displayed on the display 14.

FIG. 11C illustrates an example of a turning-on representation in which turning-on by the three LEDs 21 is combined with image display of the display 14, and an example of a turning-on representation for allowing a user to recognize data output.

In FIG. 11C, first, an image in which white light is disposed at a screen center is displayed on the display 14, and the light displayed at the screen center gradually moves in the downward direction of the screen toward the smart unit 12. In addition, along with disappearance of the light on the display 14, a turning-on representation is performed in which the white LED 21W disposed at the center of the smart unit 12 is turned on, and then the light at the center of the smart unit 12 moves and flows to the left and right sides.

FIG. 11D illustrates an example of a turning-on representation in which turning-on by the three LEDs 21 is combined with image display of the display 14, and an example of a turning-on representation for allowing the user to recognize data input.

In FIG. 11D, first, the color LEDs 21L and 21R are turned on in white at both ends of the smart unit 12, and are then turned off. Along with the turning-off of the color LEDs 21L and 21R, the white LED 21W is gradually turned on and is then turned off. Accordingly, a turning-on representation becomes possible in which both ends of the smart unit 12 emits light, and the light moves and flows toward the central part in the same manner as in FIG. 10B. In addition, along with the turning-off of the white LED 21W, an image in which white light appears around the smart unit 12 in the screen is displayed on the display 14. Further, an image in which the white light displayed on the screen gradually moves in the upward direction of the screen and disappears at the screen center is displayed on the display 14.

As mentioned above, a turning-on representation by the LED indicator 84 is combined with image display in which white light is absorbed by the smart unit 12 or is expelled from the smart unit 12, and thus input and output of data can be recognized by the user.

[6. Turning-on Representation of LED Indicator 84 Corresponding to TV Operation]

Next, a turning-on representation of the LED indicator 84 corresponding to an operation on the TV 1 will be described.

[6.1 Power-on and Power-Off Operations]

Figure 12:
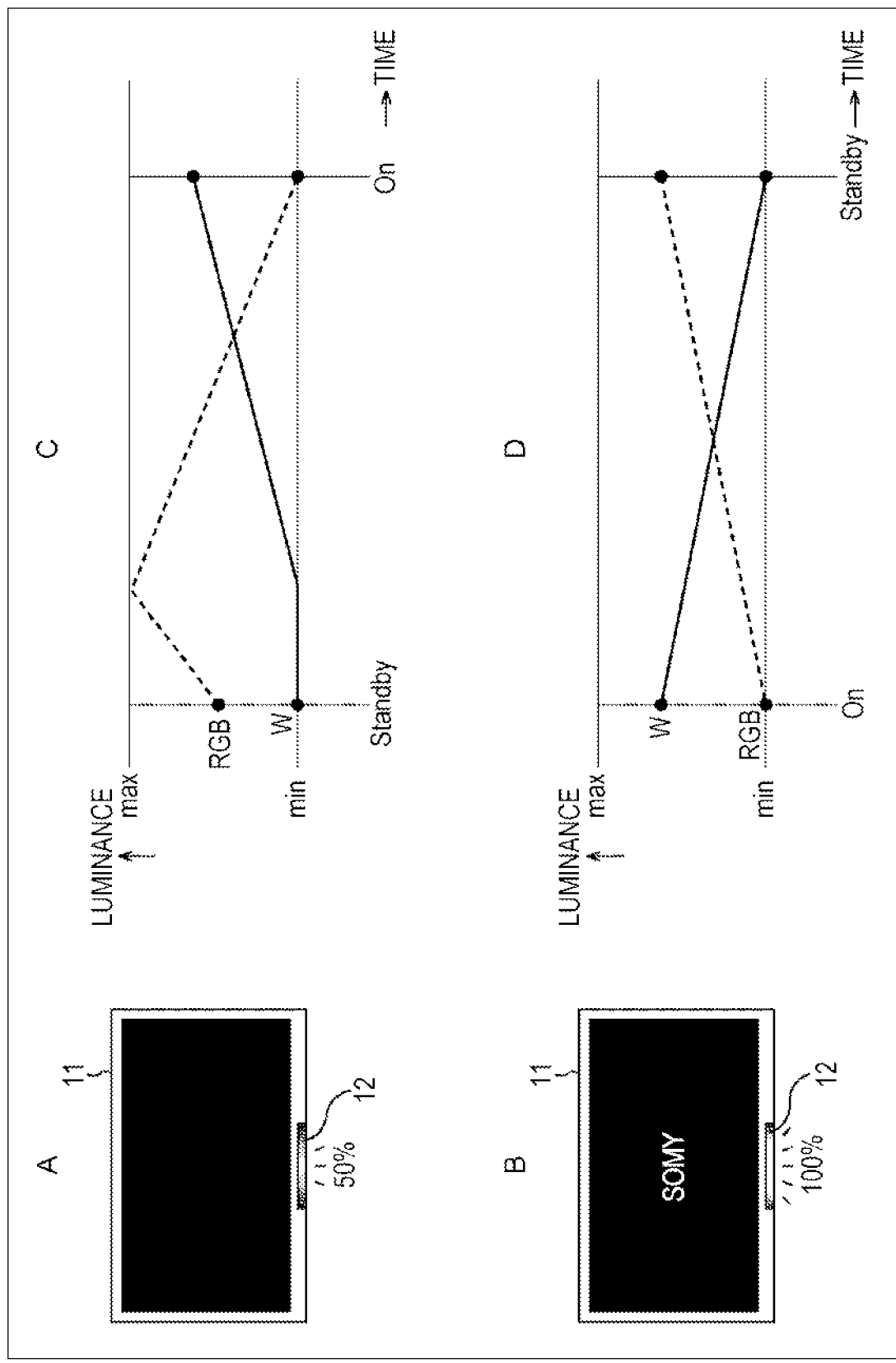
FIG. 12 is a diagram illustrating an example of turning-on representation corresponding to power-on and power-off operations.

FIG. 12 illustrates an example of turning-on representations a starting operation from a standby state (power off) to a starting state (power on) and a standby operation from the starting state to a standby state in the TV 1.

In a case where the TV 1 is in the standby state, the LED control portion 103 controls the color LEDs 21L and 21R so as to emit light with luminance at 50% of the maximal luminance (MAX), for example, as illustrated in FIG. 12A. In addition, in the following description, for example, LED control for causing light to be emitted with luminance at 50% of the maximal luminance is referred to as turning-on or the like with 50% luminance.

In addition, the user presses a power-on button or the like of the remote controller so as to perform a starting operation for turning the TV 1 from the standby state to the starting state. In response to the user's operation, the LED control portion 103 turns on the color LEDs 21L and 21R with 100% luminance as illustrated in FIG. 12B. Further, a predetermined logo ("SOMY") is displayed on the display 14 in a moment.

FIG. 12C illustrates a control sequence of luminance of the three LEDs 21 when the starting operation is detected. The LED control portion 103 performs control so that the color LEDs 21L and 21R are turned on with 100% luminance and are then turned off with 0% luminance at a predetermined time. In addition, the LED control portion 103 performs control so that the white LED 21W with 0% luminance is gradually turned on after a predetermined time has elapsed from the starting operation, and reaches 50% luminance at a predetermined time from the starting operation.

On the other hand, if the user performs a standby operation for turning the TV 1 from the starting state to the standby state, the LED control portion 103 performs LED control illustrated in FIG. 12D. In other words, the LED control portion 103 performs control so that an output level of the color LEDs 21L and 21R is gradually increased from 0% luminance to 50% luminance, and an output level of the white LED 21W is gradually reduced from 50% luminance to 0% luminance.

[6.2 Button Operation]

Figure 13:
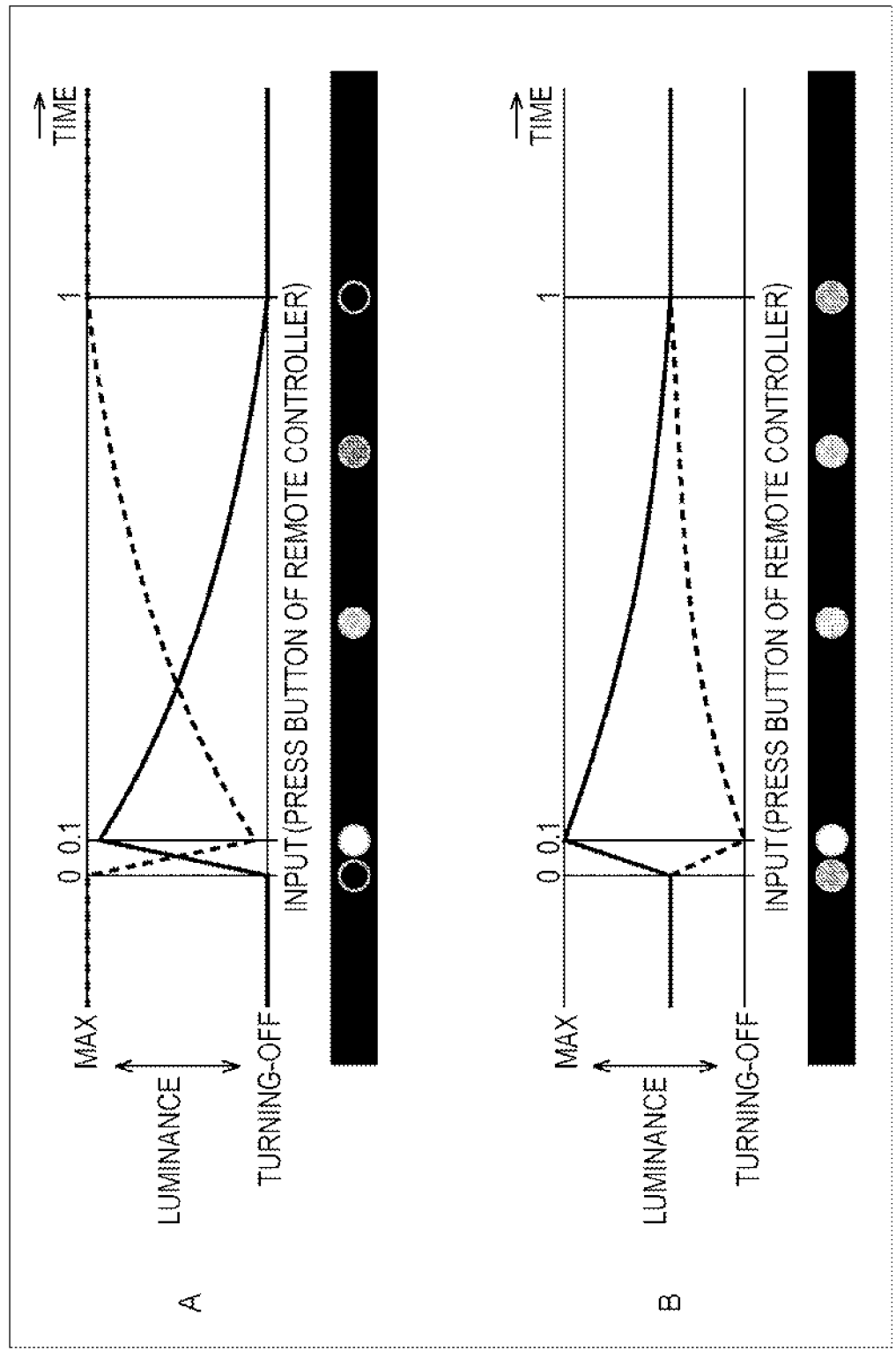
FIG. 13 is a diagram illustrating turning-on representation of the LED indicator when a predetermined button is pressed.

FIG. 13 illustrates a turning-on representation of the LED indicator 84 in a case where a predetermined button such as a channel button or a program table button of the remote controller of the TV 1 is pressed.

In a television receiver of the related art, typically, an LED lamp flashes only for a moment when a button operation is detected. In this case, when a line of sight of a user deviates from a screen even slightly, turning-on of the LED lamp is missed, and thus it is hard to recognize whether or not the button operation is detected.

Therefore, for example, as indicated by a solid line of FIG. 13A, the LED control portion 103 performs control so that an output level of the three LEDs 21 reaches 90% luminance from 0% luminance when a button is operated in a short time (for example, 0.1 seconds), and is then gradually reduced to 0% luminance for a predetermined time (for example, 0.9 seconds).

In addition, for example, in a case where an initial state is a state in which light is emitted at a predetermined output level (for example, 50% luminance), as indicated by a solid line of FIG. 13B, the LED control portion 103 performs control so that an output level is temporarily increased to the maximal luminance, and is then returned to an original output level.

As mentioned above, since a turning-on representation is performed which leaves the user with an allusive feeling by varying luminance with the passage of time as operation feedback corresponding to the user's button operation, turning-on can be recognized even if a line of sight of the user slightly deviated from a screen or the turning-on is missed in a moment, and thus visibility is improved.

In addition, the turning-on representation which leaves the user with an allusive feeling may be performed by control reverse to the above-described luminance control as indicated by a broken line in FIGS. 13A and 13B. In other words, the control indicated by the solid line of FIG. 13 is performed so that first luminance is set, and is then reduced to second luminance lower than the first luminance, but, conversely, control may be performed so that first luminance is set, and is then increased to second luminance higher than the first luminance. In addition, the control value of emission luminance in the above-described examples is only an example, and it is needless to say that a control value is not limited to the exemplified numerical value and can be set to any value (this is the same for other examples).

[6.3 Timer Operation]

Next, a description will be made of a turning-on representation of the LED indicator 84 corresponding to a user's operation for performing a predetermined function. Here, a description will be made of an example of a timer function of turning on or off power of the TV 1 at a predetermined set time point as the predetermined function.

Figure 14:
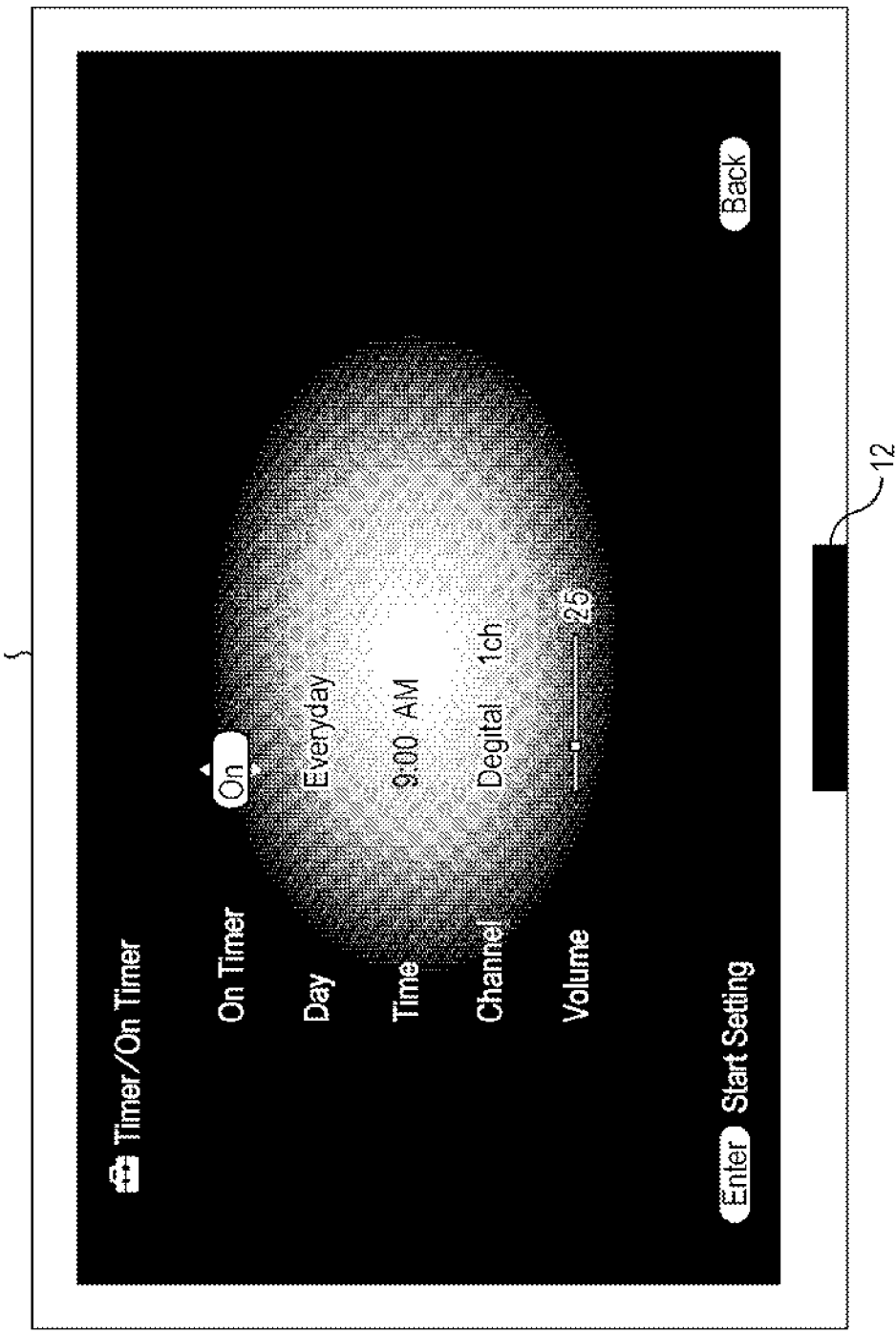
FIG. 14 is a diagram illustrating a setting screen example when a timer is set.

FIG. 14 illustrates a setting screen when timer setting is performed in the TV 1.

The setting screen includes "On Timer" which is an item for designating "power-on" or "power-off" at a designated time point, "Day" which is an item for designating the date, "Time" which is an item for designating a time point, "Channel" which is an item for designating a channel, "Volume" which is an item for designating sound volume, and the like.

In the setting screen, the above-described respective items are displayed on a background image which vaguely flashes in a predetermined color in a circular shape with a screen center as a starting point on a black background. Here, a color of the circle which vaguely shines is a color which is assigned to the timer function in advance, and is, for example, an orange color.

Figure 15:
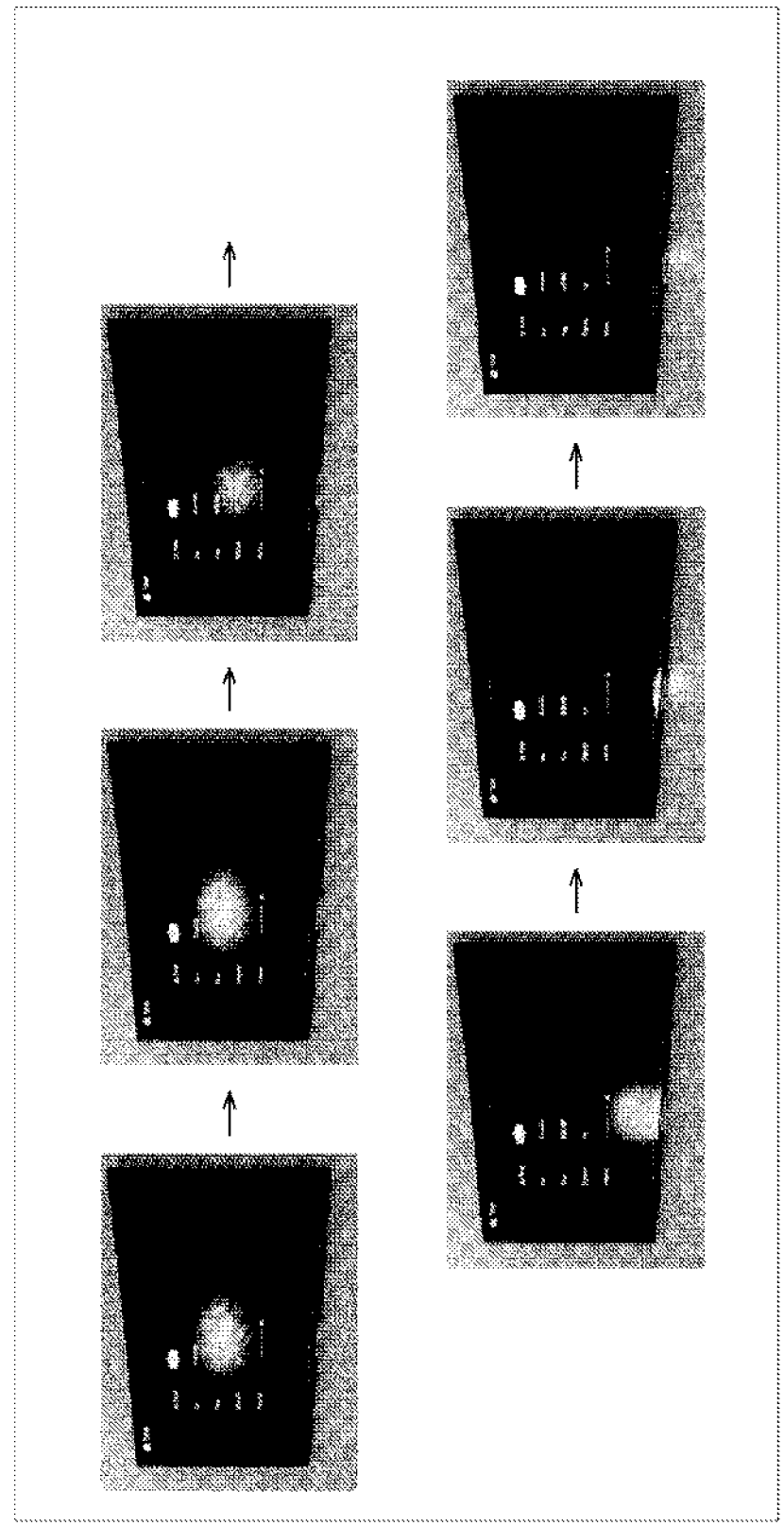
FIG. 15 is a diagram illustrating an example of cooperative representation when a timer setting operation is performed.

A user sets each item of the setting screen to a desired value, and then presses, for example, a determination button of a remote controller as an operation for fixing (registering) the set content. If the determination button is pressed by the user, the TV 1 performs a cooperative representation in which image display of the display 14 is combined with turning-on of the LED indicator 84 of the smart unit 12 as illustrated in FIG. 15.

In other words, in the same manner as in the turning-on representation illustrated in FIG. 11A, the circle of the orange color light of the setting screen gradually moves in the downward direction of the screen toward the smart unit 12. In addition, the LED indicator 84 is turned on in synchronization or interlocking with disappearance of the circle of the orange color light of the setting screen. For example, if the circular light on the setting screen disappears, the color LEDs 21L and 21R of the smart unit 12 gradually emit light in an orange color until reaching the maximal luminance, then reduce light, and are then turned on with constant luminance (for example, 20% luminance) at all times.

A state in which the LED indicator 84 of the smart unit 12 is turned on with constant luminance (for example, 20% luminance) at all times indicates that a function corresponding to an emitted light color is currently operated in the TV 1. In the example here, since the orange color is assigned to the time function, the LED indicator 84 is turned on in the orange color with constant luminance, which indicates that the timer function is currently operated.

In a case where the smart unit 12 is turned on with constant luminance (for example, 20% luminance) at all times, this indicates that a predetermined function is operated in the TV 1, and the user can confirm what kind of function is currently operated by pressing a screen display button of the remote controller.

Figure 16:
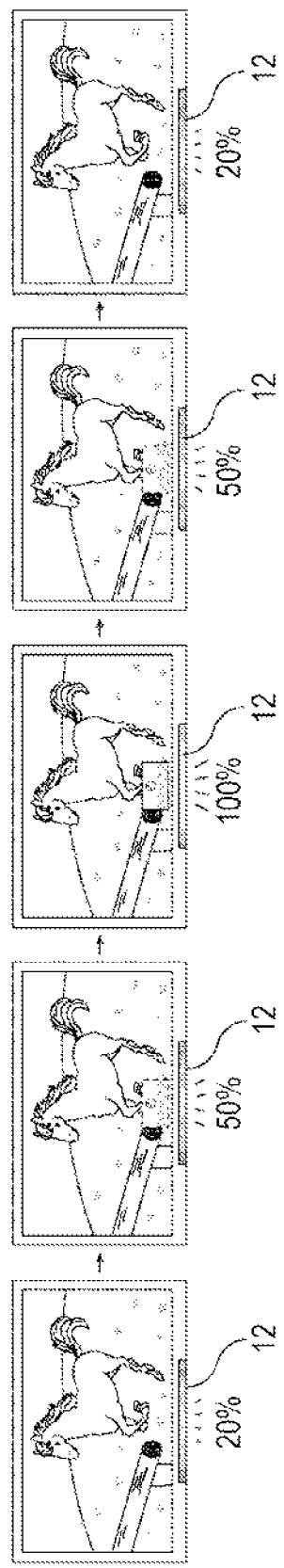
FIG. 16 is a diagram illustrating an operation of the TV when a screen display button is operated.

FIG. 16 illustrates an operation of the TV 1 when the screen display button of the remote controller is pressed in a case where the timer function is currently operated, and the user is viewing a predetermined broadcast program.

The leftmost figure of FIG. 16 illustrates that the smart unit 12 is turned on with constant luminance (for example, 20% luminance) in the orange color indicating that the timer function is currently operated.

If the screen display button of the remote controller is pressed, a display image of the display 14 and turning-on of the smart unit 12 are changed in an order indicated by the arrows with the passage of time. In other words, in the display 14, a sub-screen indicating the set content of the currently operated timer function is displayed in a region of the display image on the upper side of the smart unit 12 in a superimposition manner, and is erased after a predetermined time elapses. At this time, an extent of superimposition of the sub-screen on the broadcast program image which is a main screen is increased with the passage of time, and is then decreased with the passage of time. In addition, emission luminance of the orange color of the smart unit 12 is also increased with the passage of time in synchronization with the extent of superimposition of the sub-screen, and is then decreased. The sub-screen indicating the set content of the timer function has the meaning as supplementary information for supplementing a currently operated function (a function corresponding to a turning-on color of the smart unit 12).

Figure 17:
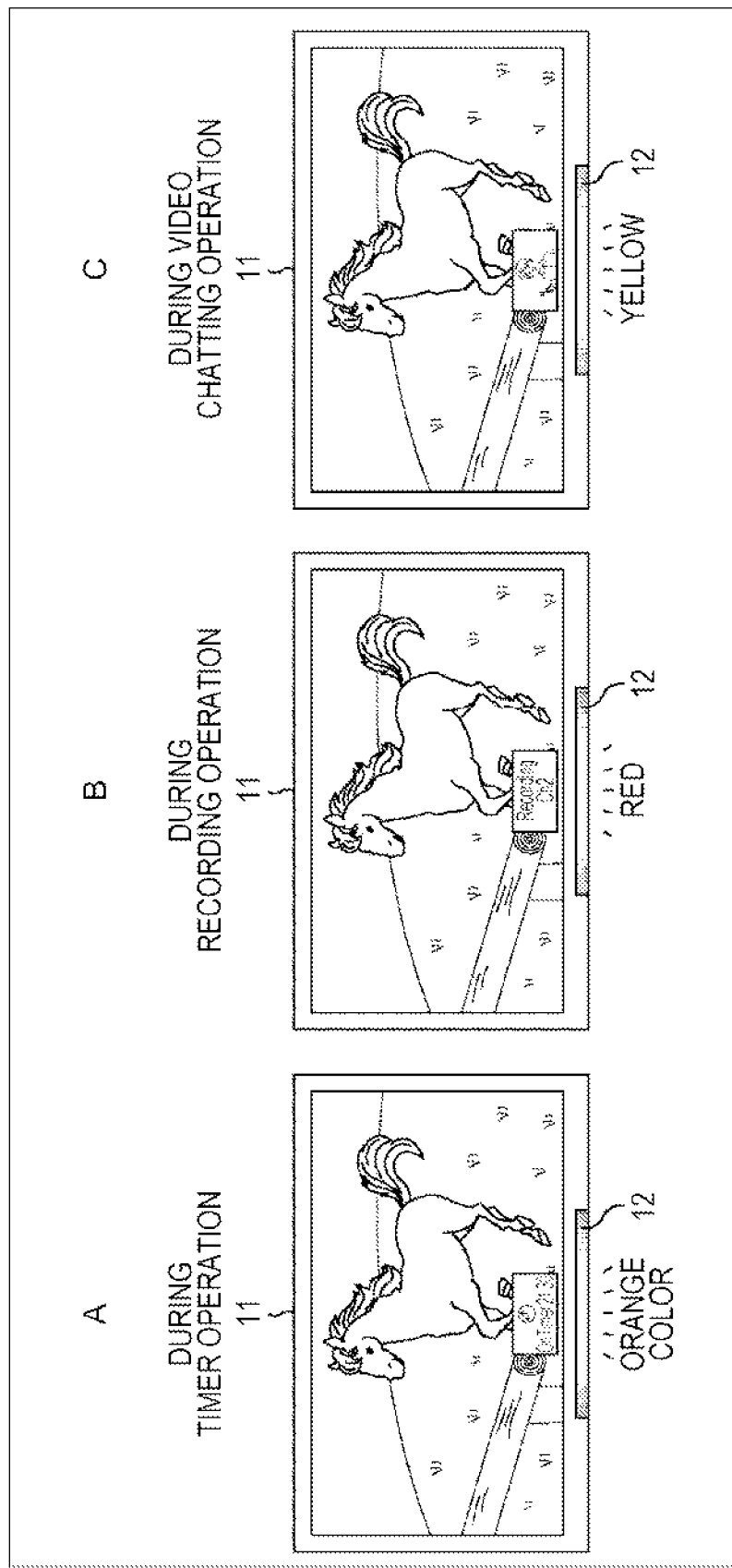
FIG. 17 is a diagram illustrating turning-on colors of the LED indicator.

In addition, for example, in a case where the TV 1 has a recording function of programs broadcast on different channels, and the TV 1 is in a recording operation, the smart unit 12 is turned on in red during the recording operation. Further, if the screen display button of the remote controller is pressed, as illustrated in FIG. 17B, in the TV 1, a channel name, a program title, and a broadcast program image, and the like during the recording operation, are displayed by the sub-screen, and the smart unit 12 is turned on with luminance synchronized with the superimposition display of the sub-screen, and in red.

In addition, for example, in a state in which the user uses a video chatting function via the Internet, and a video chatting screen (also referred to as a video chatting image) is not displayed and a program image is displayed in a full screen, the smart unit 12 emits yellow light corresponding to the video chatting function. Further, if the screen display button of the remote controller is pressed, as illustrated in FIG. 17C, the display 14 displays a video chatting screen on a sub-screen, and the smart unit 12 is turned on with luminance synchronized with superimposition display of the sub-screen, and in yellow.

As mentioned above, when the user presses the screen display button of the remote controller, the display 14 displays supplementary information on the sub-screen, and the smart unit 12 is turned on with luminance synchronized with the sub-screen, and in a color corresponding to the type of supplementary information.

Accordingly, the user can understand what kind of function is operated in the TV 1 if the user only has to view a state in which the smart unit 12 is turned on in a predetermined color at all times. In other words, the user can intuitively recognize an operation or a set state of a predetermined function of the TV 1. In addition, supplementary information of a currently operated function may be displayed by using a sub-screen as necessary.

[6.4 Other Operations]

With reference to FIGS. 18 to 21, a description will be made of an example of a cooperative turning-on representation, corresponding to other operations, in which image display of the display 14 is combined with a turning-on representation of the LED indicator 84.

In addition, in FIGS. 18 to 21, "A" displayed on a circle of light in a display image of the display 14 indicates a predetermined function whose operation (upper and lower key operations, or a drag operation) is currently performed by the user.

Figure 18:
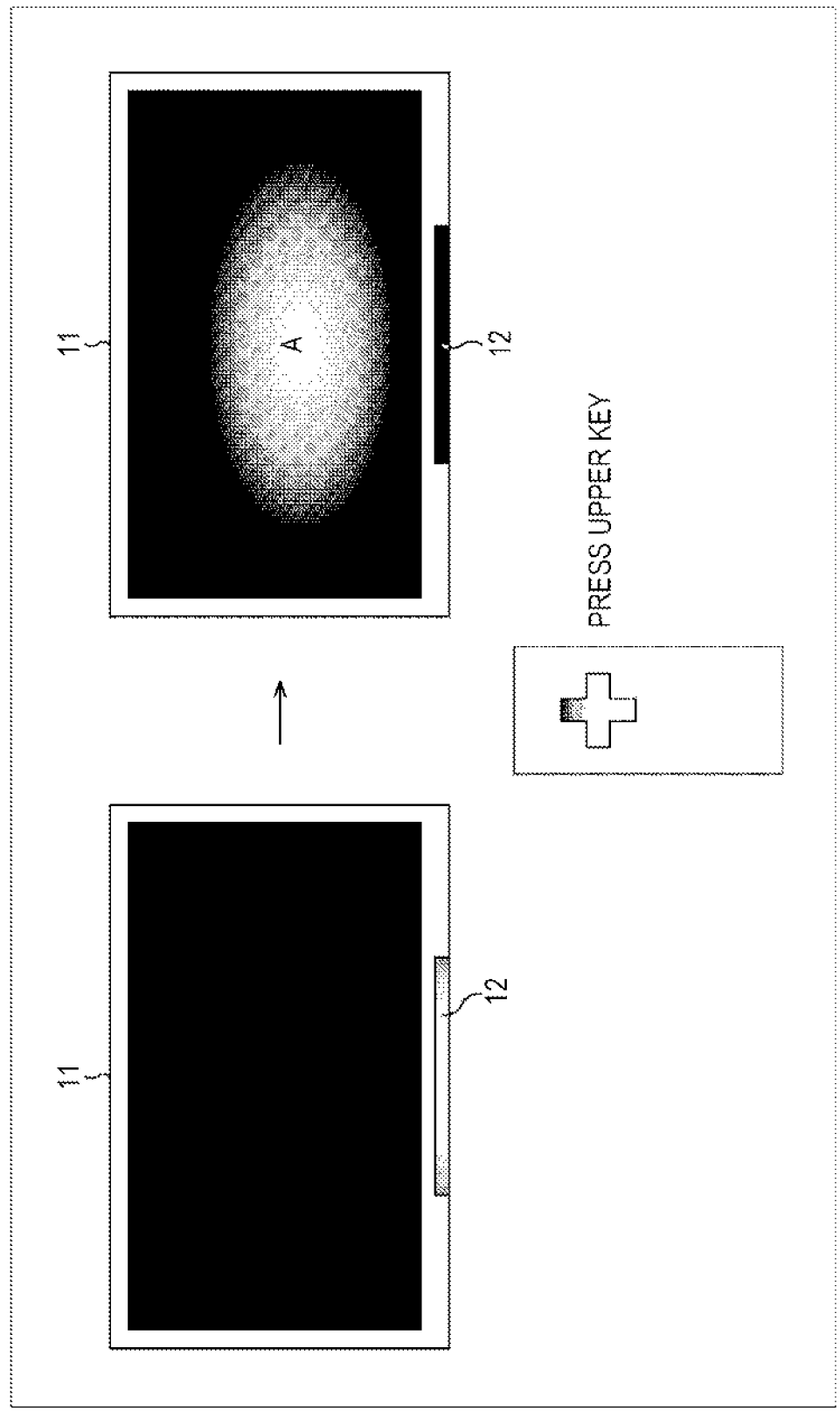
FIG. 18 is a diagram illustrating an example of cooperative turning-on representation corresponding to an upper key operation.

FIG. 18 illustrates a cooperative turning-on representation when an upper key is pressed among direction keys of four directions including the upper key, a lower key, a right key, and a left key of the remote controller.

In a case where the upper key is pressed, a cooperative turning-on representation is performed so that emitted light moves in the upward direction corresponding to the upper key. Specifically, first, the smart unit 12 is turned on. Then, an image in which light displayed near the smart unit 12 moves so as to rise to the screen center is displayed on the display 14 in synchronization with a state in which the light of the smart unit 12 gradually disappears.

Figure 19:
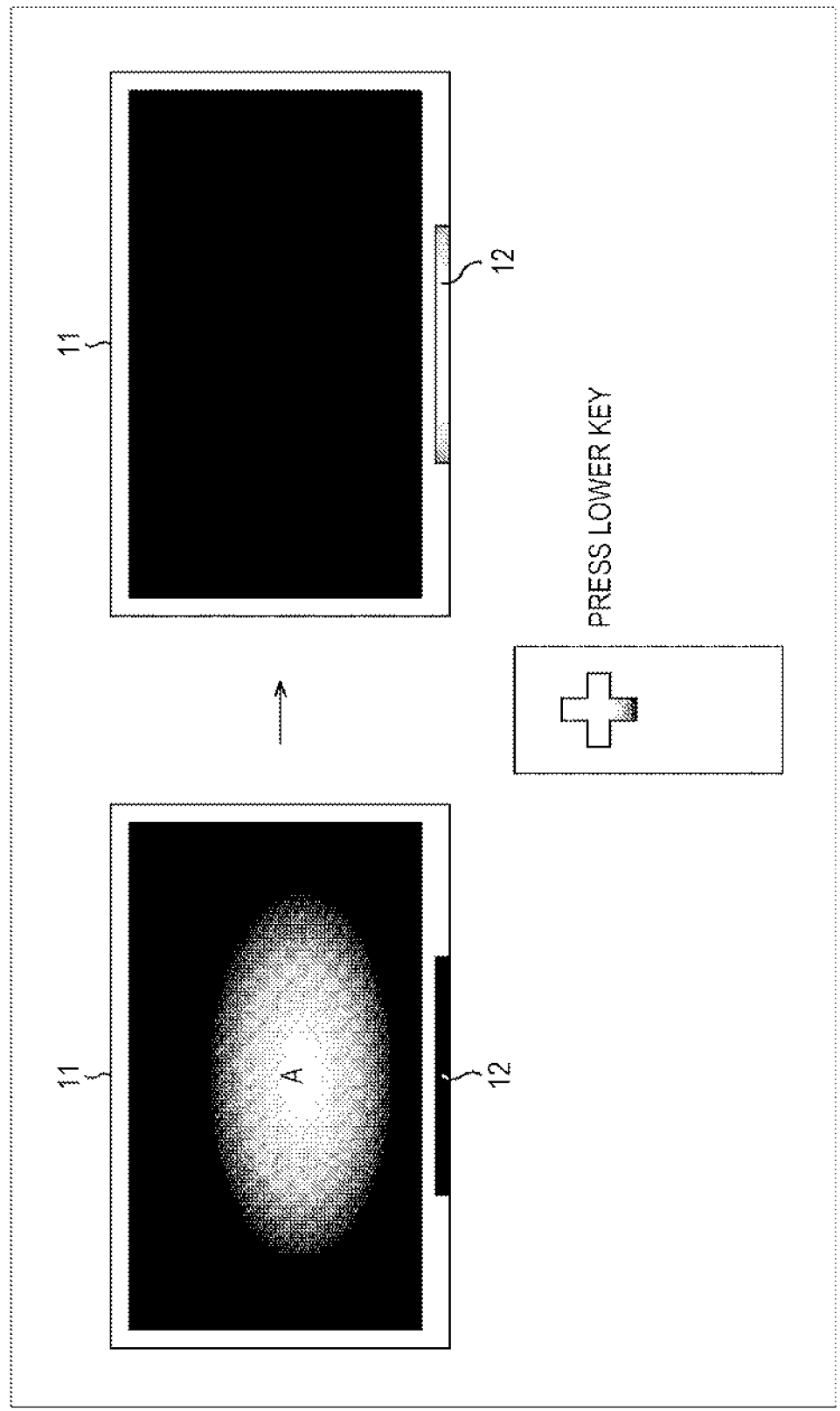
FIG. 19 is a diagram illustrating an example of cooperative turning-on representation corresponding to a lower key operation.

FIG. 19 illustrates a cooperative turning-on representation when the lower key of the remote controller is pressed.

In a case where the lower key is pressed, a cooperative turning-on representation is performed so that emitted light moves in the downward direction corresponding to the lower key. Specifically, first, an image having circular light at the screen center is displayed on the display 14. In addition, an image in which the circular light at the screen center moves in the downward direction of the screen toward the smart unit 12 is displayed on the display 14. Next, the smart unit 12 is turned on and is then turned off in synchronization with disappearance of the light on the display 14.

Figure 20:
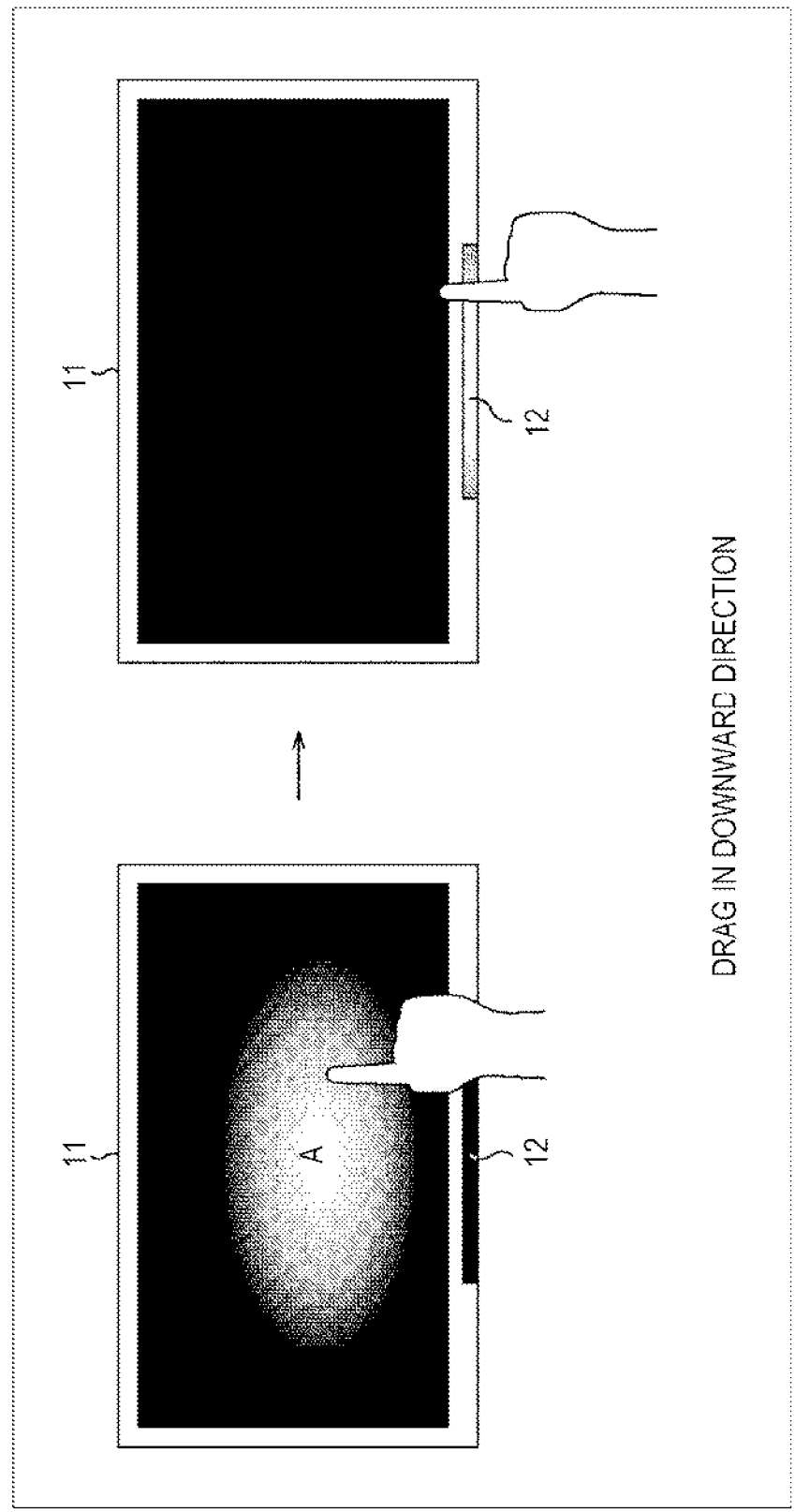
FIG. 20 is a diagram illustrating an example of cooperative turning-on representation corresponding to a downward drag operation.

FIG. 20 illustrates a cooperative turning-on representation when the user touches the display 14 with the finger and performs a dragging operation in the downward direction toward the smart unit 12 in a case where the display 14 of the TV 1 is a touch panel. In this case, the TV 1 performs the same image display and turning-on as when the lower key of the remote controller is pressed, described in FIG. 19.

Figure 21:
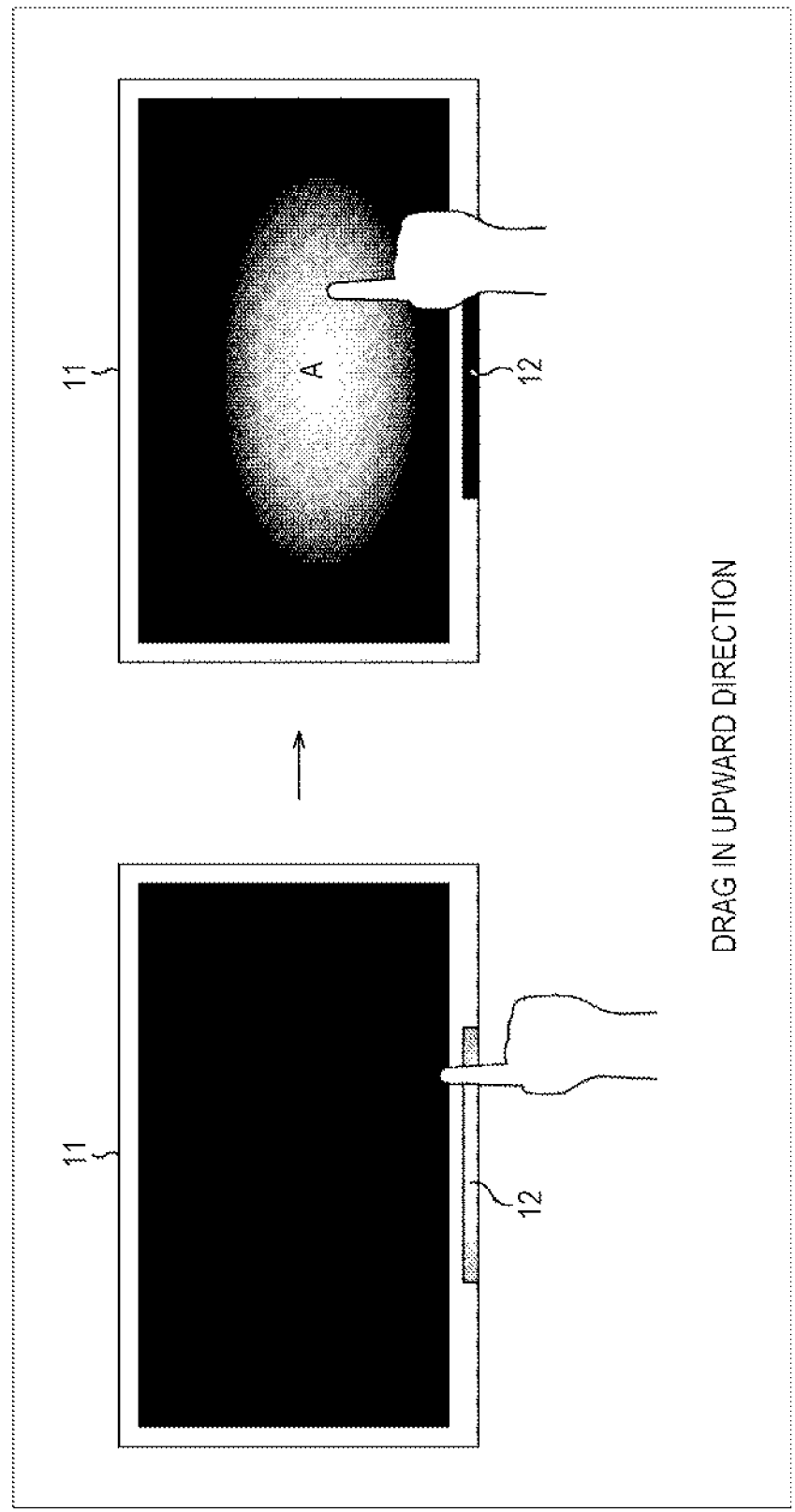
FIG. 21 is a diagram illustrating an example of cooperative turning-on representation corresponding to an upward drag operation.

FIG. 21 illustrates a cooperative turning-on representation when the user touches the display 14 with the finger and performs a dragging operation in the upward direction of the screen from the vicinity of the smart unit 12 in a case where the display 14 of the TV 1 is a touch panel. In this case, the TV 1 performs the same image display and turning-on as when the upper key of the remote controller is pressed, described in FIG. 18.

As mentioned above, when a predetermined setting operation is performed on the TV 1, a cooperative turning-on representation is performed so that the circular light is absorbed by the smart unit 12, or the circular light is expelled from the smart unit 12. In addition, the cooperative turning-on representation is not limited to the "circular shape", and may employ any color and shape. Further, instead of the "circular light", a predetermined character, or graphic, or a combination thereof may be employed.

When the smart unit 12 is turned on or blinks with predetermined luminance and in a predetermined color, the user performs the above-described predefined operation, and thus can immediately and simply confirm content (meaning) indicated by the turning-on or blinking of the smart unit 12.

[7. Cooperative Turning-on Representation in Image Erasure Operation]

The TV 1 is provided with the camera 93 in the smart unit 12, and the camera 93 can detect the user on the front side of the TV 1 on the basis of an image captured by the camera 93. In addition, the TV 1 has an image erasure function of not displaying an image for saving power if a state in which the user is not present in front of the TV 1 for a predetermined time is detected.

Figure 22:
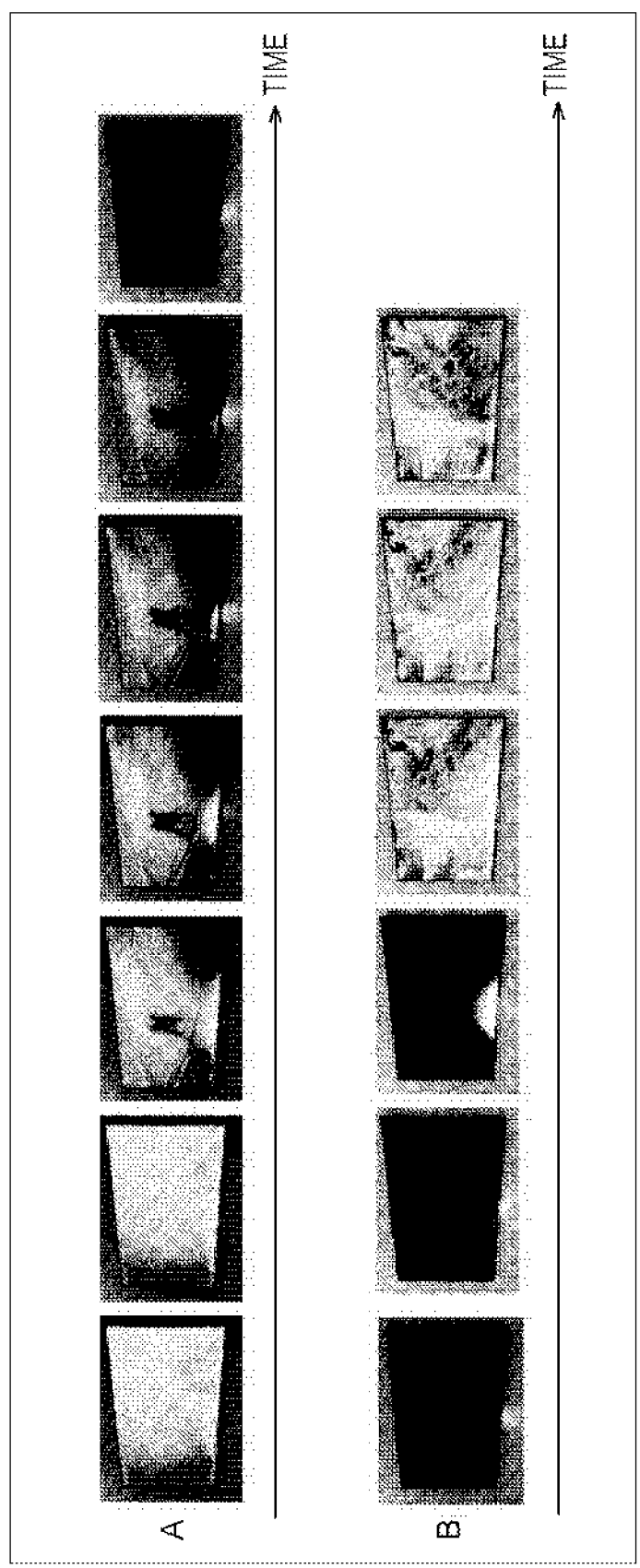
FIG. 22 is a diagram illustrating an example of cooperative turning-on representation in an image erasure operation.

FIG. 22A illustrates a cooperative representation in which image display of the display 14 is combined with turning-on of the smart unit 12 in a case where the TV 1 transitions to an image erasure mode.

In a case where the transition to the image erasure mode is performed, the control section 66 controls image display of the display 14 so that an image to be erased is absorbed by the smart unit 12 disposed on the lower side of the display 14 as illustrated in FIG. 22A. In other words, in the image displayed on the display 14, an image to be erased is absorbed by the smart unit 12, and thus emission luminance around the smart unit 12 increases. In addition, as the image displayed on the display 14 is absorbed by the smart unit 12, the smart unit 12 is turned on so as to become brighter (luminance increases). In other words, the control section 66 controls the display of the display 14 and the turning-on of the smart unit 12 so that a display ratio of the image on the display 14 is inversely proportional to emission luminance of the smart unit 12.

FIG. 22B illustrates a cooperative representation in which image display of the display 14 is combined with turning-on of the smart unit 12 in a case where returning to a normal mode (display mode) from the image erasure mode is performed.

In a case where the returning to a normal mode, the control section 66 control a display image so that an image to be displayed is expelled from the smart unit 12 as illustrated in FIG. 22B. In other words, the image is displayed with high luminance on the display 14 around the smart unit 12, and then the image to be displayed is expanded to a full screen. The smart unit 12 is gradually changed to low luminance as the image to be displayed is displayed on the display 14. In other words, emission luminance of the smart unit 12 is reduced in inverse proportion to a display ratio of the image to be displayed on the display 14.

As mentioned above, the control section 66 performs a cooperative representation between the display 14 and the smart unit 12 so that an image to be erased is absorbed by the smart unit 12, and an image to be displayed is expelled from the smart unit 12. It is possible to allow the user to recognize the smart unit 12 as a core of the TV 1.

[8. Cooperation Between Video Chatting Screen and LED Indicator 84]

Figure 23:
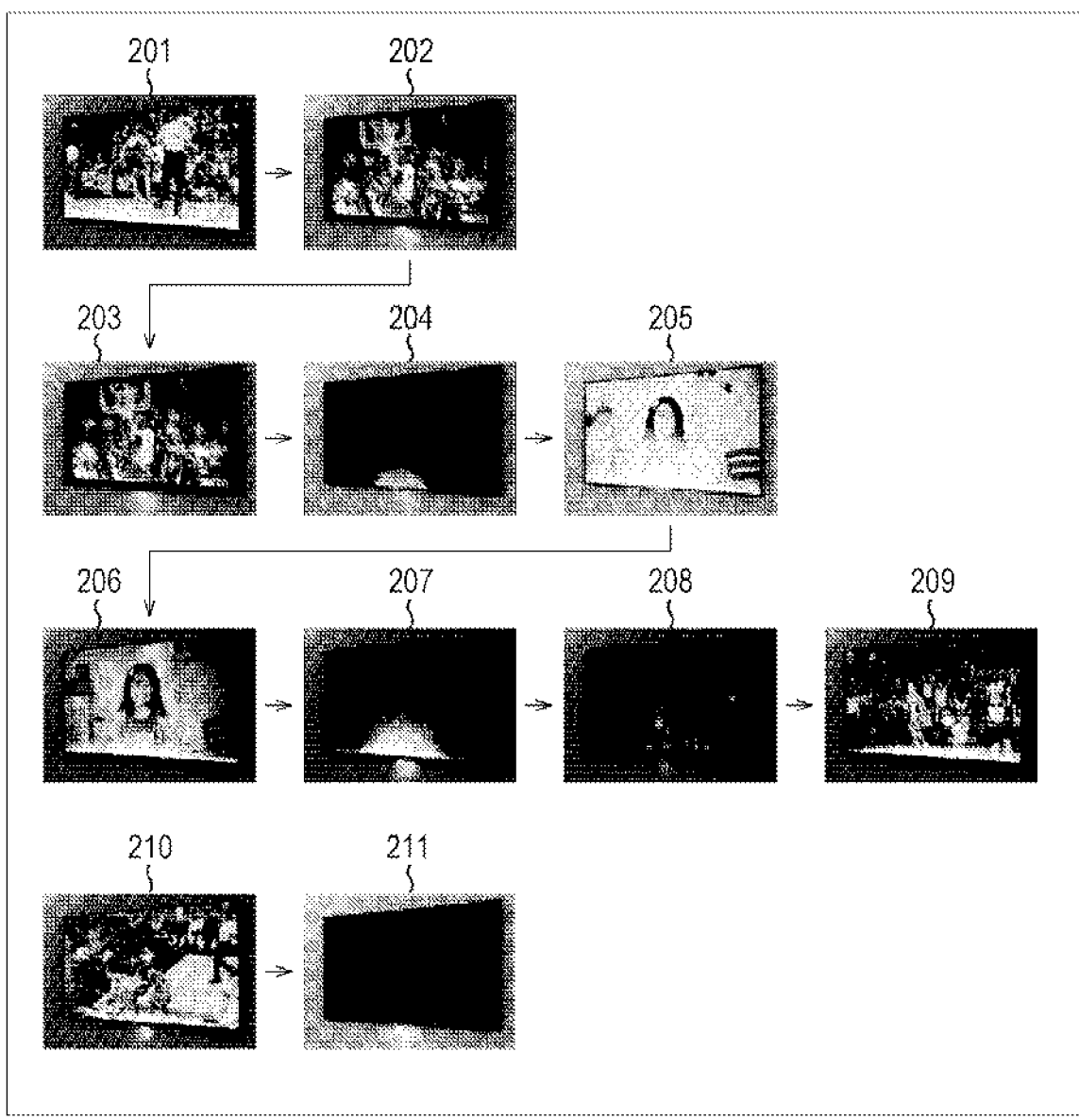
FIG. 23 is a diagram illustrating screen transition when a video chatting function is used.

FIG. 23 illustrates screen transition when a video chatting function is used via the Internet in the TV 1.

As in an image 201, when the user views a predetermined broadcast program on the TV 1, if there is an incoming call of video chatting from another user via a network such as the Internet, the TV 1 turns on the smart unit 12 in synchronization with a sound indicating the incoming call of the video chatting as in an image 202. Here, the turning-on synchronized with a sound indicating the incoming call of the video chatting indicates that emission luminance of the LED indicator 84 is changed depending on an interval or volume of the sound indicating the incoming call of the video chatting. As described with reference to FIG. 17C, since an emission color of the LED indicator 84 is correlated with a predetermined function, the user can recognize an incoming call of video chatting by visually recognizing a turning-on color of the LED indicator 84 even if a sound indicating the incoming call of video chatting is not made.

The user responds to the incoming call of video chatting by pressing a predetermined button of the remote controller, or the like. Then, as illustrated in images 203 and 204, the control section 66 of the TV 1 displays a video chatting screen in a cooperative representation in which image display of the display 14 is combined with turning-on of the smart unit 12 as described with reference to FIG. 22B. In other words, the control section 66 controls turning-on of the smart unit 12 and a display image of the display 14 so that a video chatting image is expelled from the smart unit 12 on a broadcast program image which is currently viewed.

In a case where the user finishes the video chatting, as illustrated in images 206 to 209, the control section 66 of the TV 1 erases the video chatting image in a cooperative representation in which image data of the display 14 is combined with turning-on of the smart unit 12 as described with reference to FIG. 22A. In other words, the control section 66 controls turning-on of the smart unit 12 and a display image of the display 14 so that the video chatting image is absorbed by the smart unit 12 disposed on the lower side of the display 14.

In addition, in video chatting, the chatting may be performed only with a voice conversation without displaying a video chatting image on the display 14. In a voice conversation mode of performing chatting only with a voice conversation, as illustrated in images 210 and 211, a video chatting image is erased, and the smart unit 12 is turned on in synchronization with a voice (sound) of a communication partner.

The above-described example has described an example in which a video chatting image is displayed on a currently displayed broadcast program image. However, also in a case where other images are displayed or erased, such a representation in which image display of the display 14 is combined with turning-on of the smart unit 12 may be employed.

Figure 24:
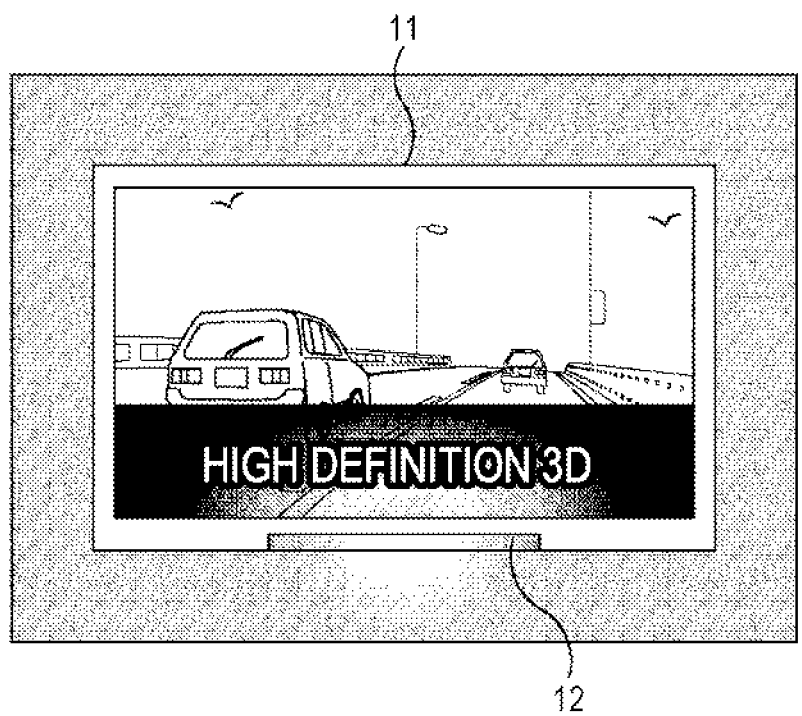
FIG. 24 is a diagram illustrating an example of cooperative turning-on representation in electronic POP.

FIG. 24 illustrates an example in which a representation in which image display of the display 14 is combined with turning-on of the smart unit 12 is applied to electronic point of purchase advertising (POP).

In addition, for example, also in a case where an individual user is recognized on the basis of a user image captured by the camera 93 of the smart unit 12, and an information providing screen for providing optimal information to the recognized user is displayed and erased, such a representation in which image display of the display 14 is combined with turning-on of the smart unit 12 may be employed. Content of information provided to a user in the information providing screen may be changed depending on not only a recognized individual user but also a time point, the data, weather, and the like. For example, in a case where a certain user is recognized in the weekday morning, traffic information (congestion information) or the like such as a train route or a road which is registered in advance may be presented to the user by using the information providing screen.

As mentioned above, when a second image which is another image is superimposed and disposed on a first image which is currently displayed on the display 14, or is erased, a cooperative representation in which the second image is absorbed by the smart unit 12 or is expelled from the smart unit 12 may be employed.

[9. Information Representation of LED Indicator 84 Based on Image Viewing Experience]

Next, a description will be made of an example in which a user recognizes predetermined information (state) through an information explanation image displayed on the display 14 and predetermined turning-on performed by the LED indicator 84 of the smart unit 12.

[9.1 Correspondence to Turning-on Position]

Figure 25:
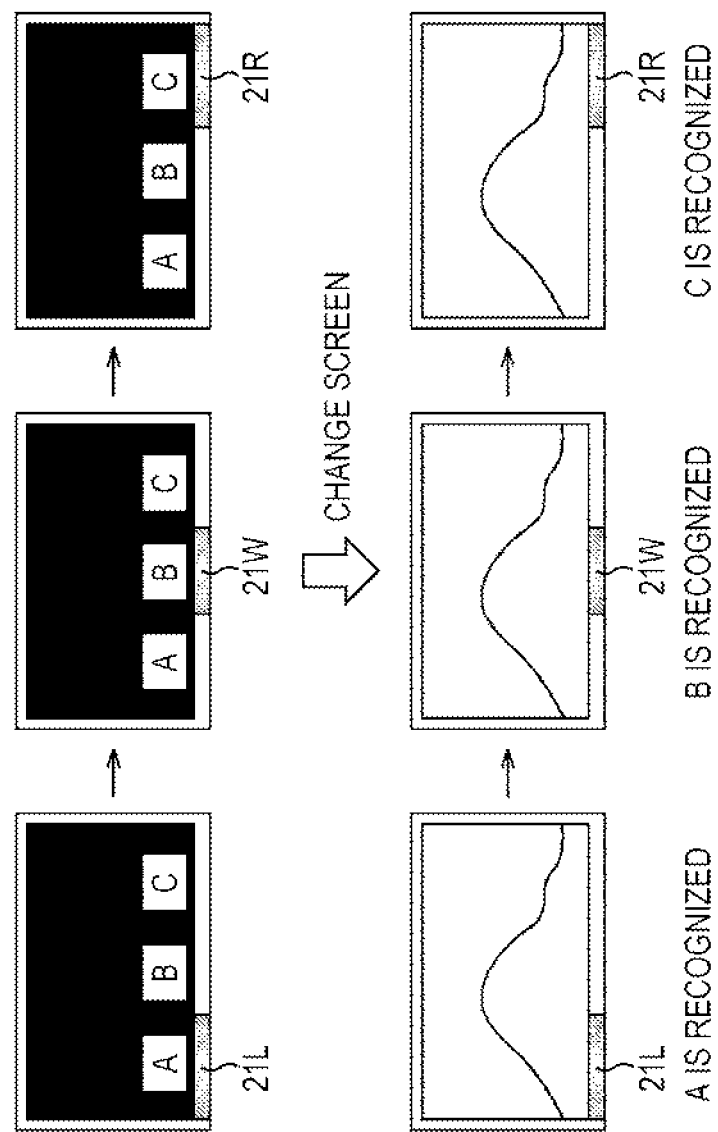
FIG. 25 is a diagram illustrating an example of information representation of the LED indicator corresponding to a turning-on position.

With reference to FIG. 25, a description will be made of an example in which the user recognizes predetermined information in accordance with an information explanation image and a turning-on position of the LED indicator 84.

As described above, since three LEDs 21 are disposed so as to be arranged in the horizontal direction in the LED indicator 84, each of the three LEDs is turned on separately, and thus three positions including the left side, the center, and the right side can be identified by the user.

Therefore, first, as illustrated in the upper part of FIG. 25, explanation images for explaining predetermined information are displayed by the control section 66 at positions corresponding to the three LEDs 21 on the left side, the center, and the right side on the display 14. In the example of the upper part of FIG. 25, an image for explaining "information A" corresponding to the left LED 21L, an image for explaining "information B" corresponding to the central LED 21W, and an image for explaining "information C" corresponding to the right LED 21R are displayed.

In addition, the control section 66 sequentially turns on the three LEDs 21 one by one while the explanation images for explaining the "information A", the "information B", and the "information C" are displayed, so as to allow the user to recognize respective correspondence relationships between the information A, the information B, and the information C, and the LEDs 21.

Next, as in the lower part of FIG. 25, the image displayed on the display 14 is changed, and thus the explanation images are erased. In the example of the lower part of FIG. 25, an image reflecting a mountain therein is displayed on the display 14 of the TV 1, but this merely means that the image has no relation to turning-on of the smart unit 12, and the image itself has no meaning.

If the left LED 21L is turned on during display of the mountain image on the display 14, the user viewing the turning-on can recognize the "information A". If the central LED 21W is turned on, the user viewing the turning-on can recognize the "information B". If the right LED 21R is turned on, the user viewing the turning-on can recognize the "information C". As mentioned above, in a case where predetermined information is indicated, the control section 66 turns on the LED 21 at a position corresponding to the information.

A specific example will be described. For example, a scene is assumed in which the user simultaneously performs video chatting together with three partners. In this case, the control section 66 displays a captured image of a user A as the "information A" of an explanation image displayed on the display 14, a captured image of a user B as the "information B", and a captured image of a user C as the "information C", and then changes the images on the display 14 to a broadcast program image. In addition, the control section 66 turns on the left LED 21L when the user A is in a calling state, turns on the central LED 21W when the user B is in a calling state, and turns on the right LED 21R when the user C is in a calling state. The user in front of the TV 1 can easily recognize which user is in a calling state if the user only has to view a turning-on position of the LED indicator 84.

In addition, in the above-described example, instead of the captured images of the user A, the user B, and the user C, an image may be displayed in which an explanation such as "this position corresponds to the user A" is written.

Figure 26:
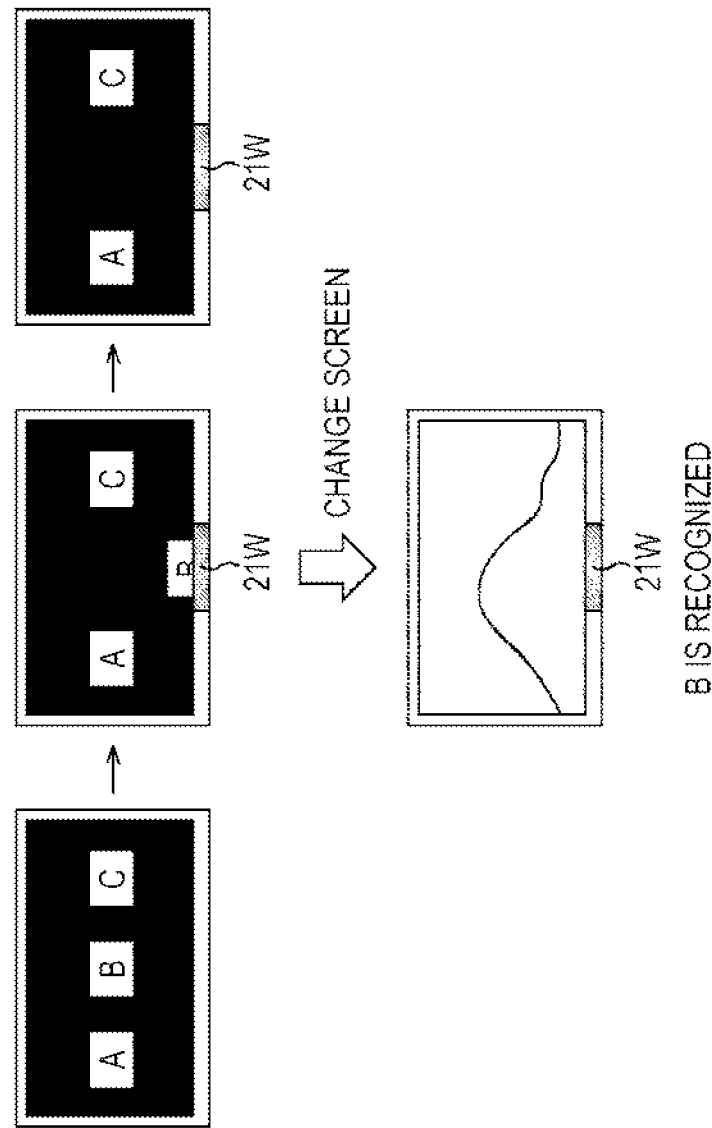
FIG. 26 is a diagram illustrating an example of information representation of the LED indicator corresponding to a turning-on position.

FIG. 26 illustrates another example in which the user recognizes predetermined information in accordance with a turning-on position of the LED indicator 84.

In the example of FIG. 26, the control section 66 displays explanation images in the same manner as in FIG. 25, and moves an image for explaining the "information B" in the downward direction of the screen. In addition, the image for explaining the "information B" disappears, and the central LED 21W corresponding to the "information B" is also turned on, thereby allowing the user to recognize a correspondence relationship between the predetermined information and the LED 21. Accordingly, in a case where the central LED 21W is turned on even after an image is changed, the user viewing the turning-on can recognize the "information B".

[9.2 Correspondence to Turning-on Cycle]

Figure 27:
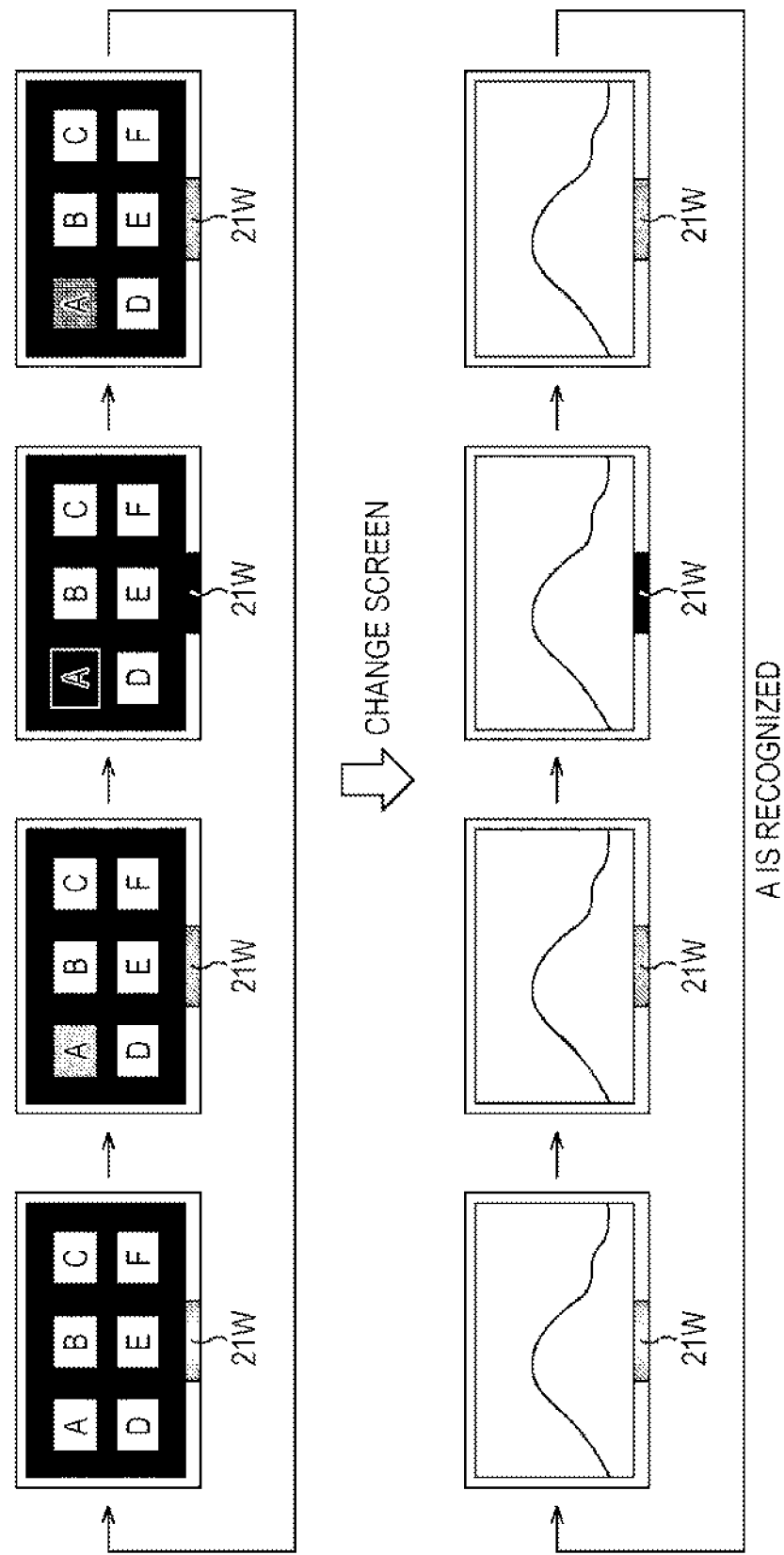
FIG. 27 is a diagram illustrating an example of information representation of the LED indicator corresponding to a turning-on cycle.

With reference to FIG. 27, a description will be made of an example in which the user recognizes predetermined information in accordance with an information explanation image and a turning-on cycle (blinking pattern) of the LED indicator 84.

In the example of FIG. 27, the number of described information pieces is six including "information A" to "information F".

First, as illustrated in the upper part of FIG. 27, the control section 66 displays explanation images of the "information A" to the "information F" on the display 14, and sequentially displays the explanation images of the "information A" to the "information F" in different blinking patterns. In addition, at this time, the LED 21W of the LED indicator 84 is also turned on in brightness synchronized with the blinking patterns of the images.

Next, after the image on the display 14 is changed, the smart unit 12 is turned on in any one of the blinking patterns of the "information A" to the "information F" presented in the previous explanation images. For example, as illustrated in FIG. 27, it is assumed that the LED 21W of the smart unit 12 is turned on (blinks) in the blinking pattern of the "information A". In this case, the user can recognize the "information A" even in a case where an unrelated image is displayed on the display 14.

[9.3 Correspondence to Turning-on Color]

Next, with reference to FIG. 28, a description will be made of an example in which the user recognizes predetermined information in accordance with an information explanation image and a turning-on color of the LED indicator 84.

First, in the same manner as in the example illustrated in FIG. 25, the control section 66 displays explanation images for explaining the "information A", the "information B", and the "information C" on the display 14. However, in FIG. 28, there is a difference in that the explanation images for explaining the "information A", the "information B", and the "information C" are represented in different colors. For example, the "information A" is displayed red, the "information B" is displayed blue, and the "information C" is displayed green.

Figure 28:
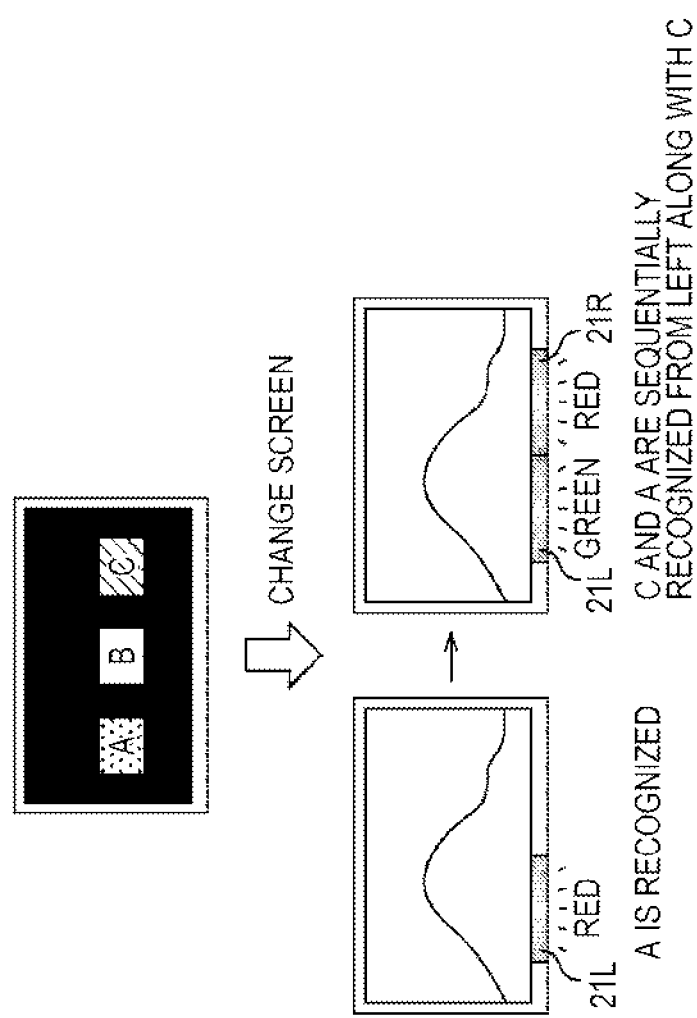
FIG. 28 is a diagram illustrating an example of information representation of the LED indicator corresponding to a turning-on color.

Next, if the images on the display 14 are changed so that the explanation images are erased, and the color LED 21L is turned on in red as illustrated in the left part of FIG. 28, the user viewing the turning-on can recognize the "information A".

In addition, if the horizontal direction of the smart unit 12 is defined as a time axis, and LEDs of a plurality of colors are arranged in the time axis direction and are turned on, content of information and ordering thereof can also be recognized as turning-on of the smart unit 12. In the right example of FIG. 28, since the color LED 21L is displayed green, and the color LED 21R is displayed red, the user can recognize the "information C" and the "information A" in an order of green and red.

[10. Cooperative Representation Corresponding to User's Operation Performed on Smart Unit 12]

The smart unit 12 is provided with the touch sensor 85 as described above, and thus can detect contact or proximity of a user's hand or finger. In addition, the smart unit 12 is provided with the NFC communication section 88 and the BT communication section 89 and thus can communicate with other NFC apparatuses or BT apparatuses. Further, the smart unit 12 is provided with the camera 93, and thus can detect an operation of a user. The TV 1 can perform a predetermined cooperative representation by using turning-on of the LED indicator 84 and image display of the display 14 so as to correspond to a user's various operations on the smart unit 12.

[10.1 Cooperative Representation Corresponding to Touch Operation on Smart Unit 12]

Figure 29:
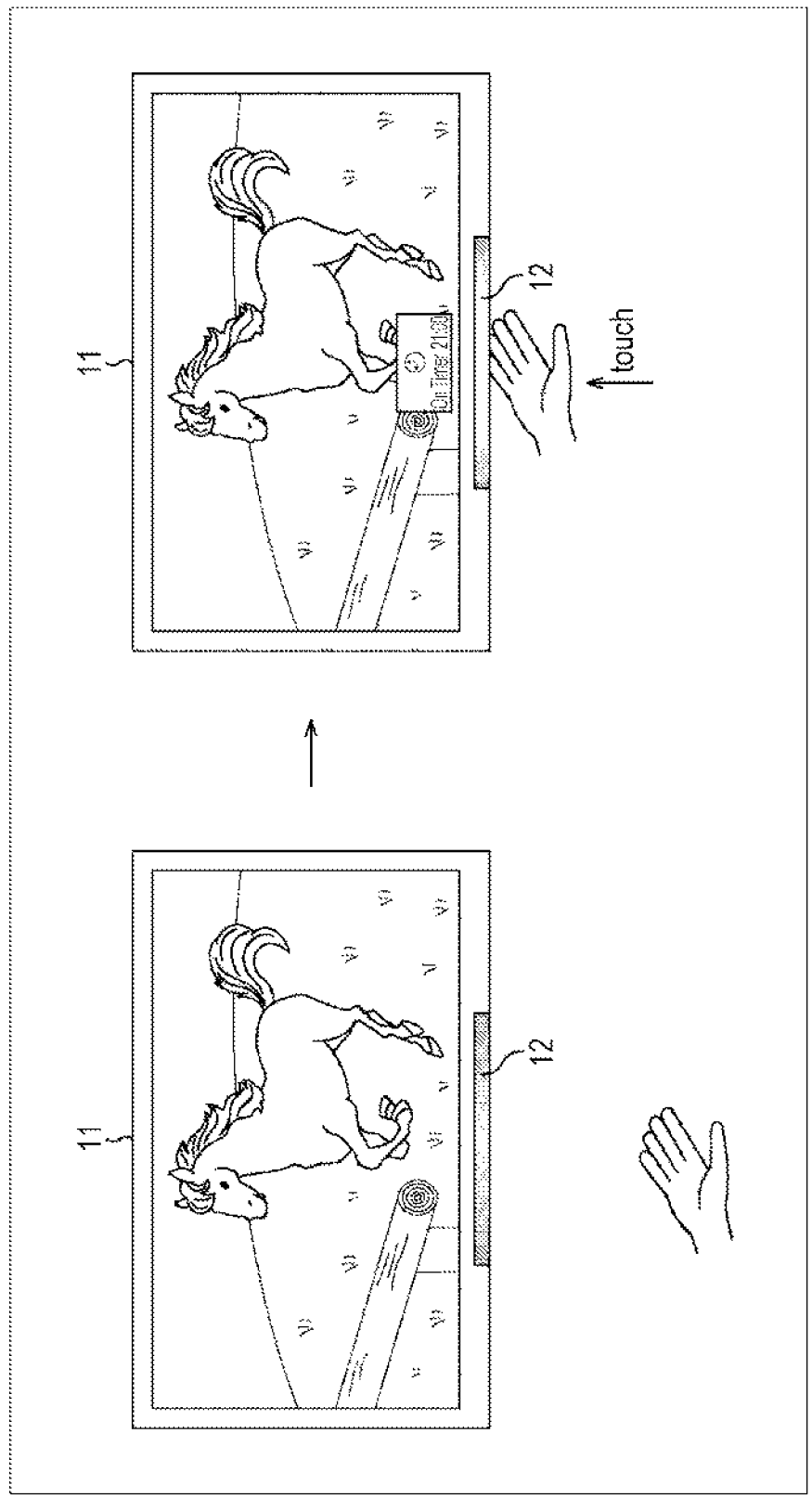
FIG. 29 is a diagram illustrating an example of cooperative representation corresponding to a touch operation on the smart unit.

FIG. 29 illustrates an example of a cooperative representation corresponding to a touch operation on the smart unit 12.

The above-described example of FIG. 16 has described an example in which, when the timer function is currently operated in the TV 1, the smart unit 12 is turned on in an orange color which is an emission color corresponding to the timer function, and, if the screen display button of the remote controller is pressed, supplementary information is displayed by a sub-screen.

In the example of FIG. 29, instead of pressing the screen display button in the example of FIG. 16, a similar cooperative representation is performed in a case where a touch operation on the smart unit 12 is detected.

In a case where the timer function is currently operated in the TV 1, the smart unit 12 is turned on in an orange color which is an emission color corresponding to the timer function. The user touches the smart unit 12 which is turned on in an orange color, with the hand. If the user's touch operation on the smart unit 12 is detected, the control section 66 of the TV 1 displays a sub-screen as supplementary information in a superimposition manner and causes (the LED indicator 84 of) the smart unit 12 to emit light in a color corresponding to the function in synchronization with the sub-screen as illustrated in FIG. 16.

The user can understand what kind of function of the TV 1 is operated if the user only has to view a state in which the smart unit 12 is turned on in a predetermined color at all times. In other words, the user can intuitively recognize an operation or a set state of a predetermined function of the TV 1. In addition, through a simple operation such as touch on the smart unit 12, it is possible to display supplementary information of a currently operated function by using a sub-screen, and thus to call content thereof.

Figure 30:
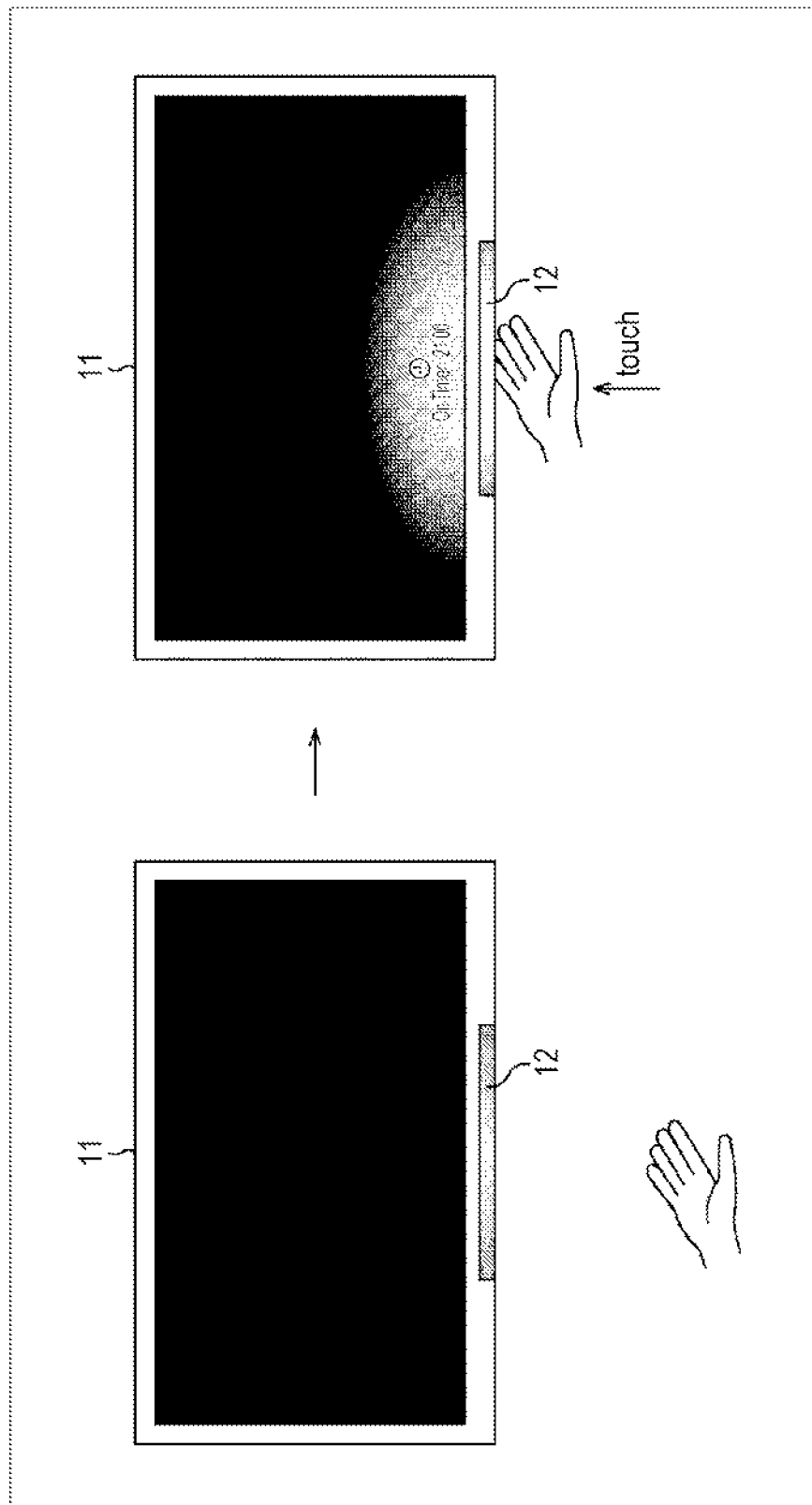
FIG. 30 is a diagram illustrating an example of cooperative representation corresponding to a touch operation on the smart unit.

FIG. 29 illustrates an example of a case where a predetermined image such as a broadcast program image is displayed on a main screen in the same manner as in the case of FIG. 16 described above, but FIG. 30 illustrates an example of a case where a touch operation on the smart unit 12 is detected when an image is not displayed in a standby state of the TV 1.

Also in the same manner for this case, if a user's touch operation on the smart unit 12 is detected, the TV displays supplementary information on the display 14 around the smart unit 12, and causes the LED indicator 84 of the smart unit 12 to emit light in a color corresponding to a function in synchronization with the display of the supplementary information.

[10.2 Cooperative Representation Corresponding to NFC Proximity Operation to Smart Unit 12]

Figure 31:
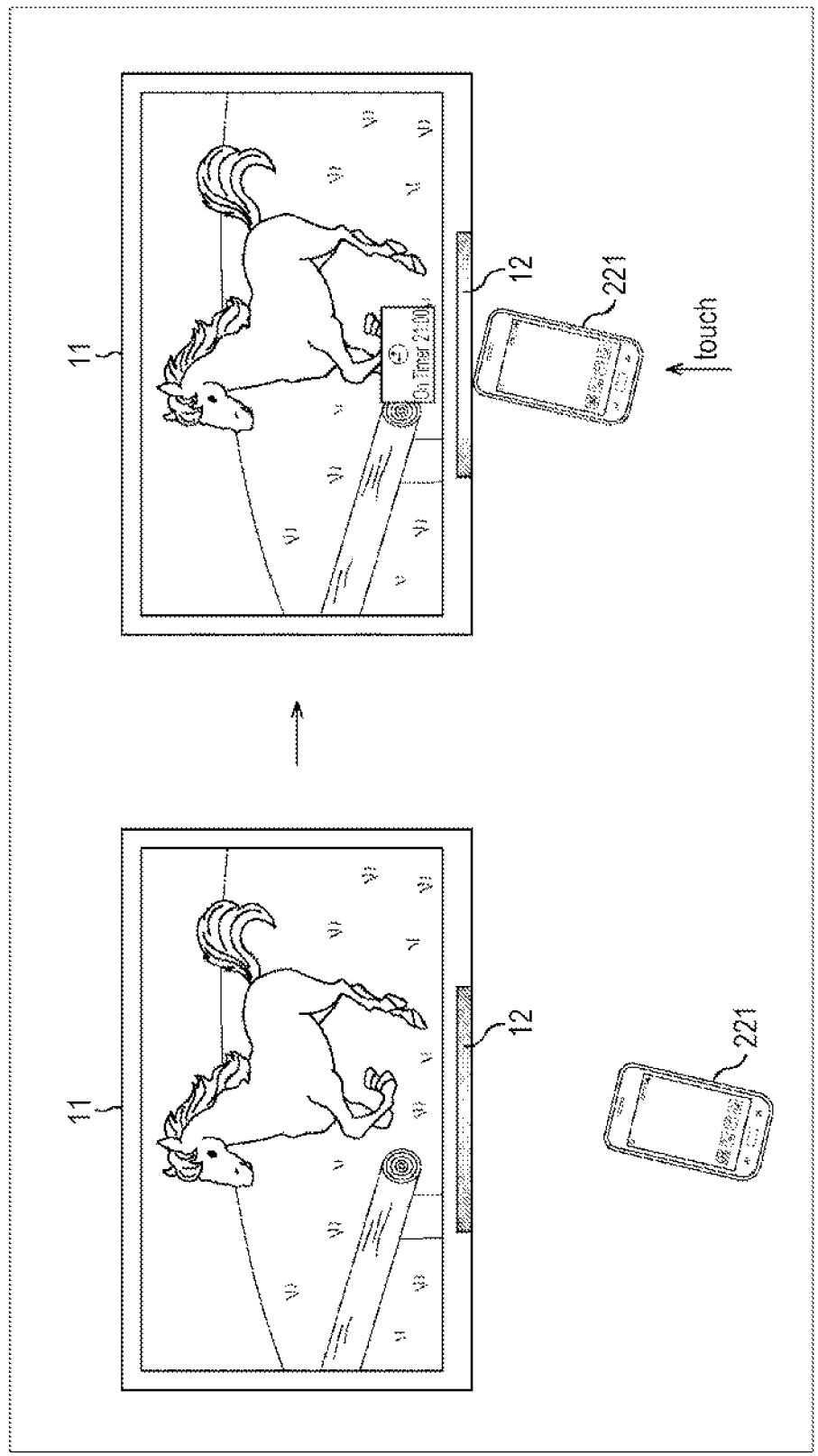
FIG. 31 is a diagram illustrating an example of cooperative representation corresponding to an NFC approximate operation to the smart unit.

FIG. 31 illustrates an example of a cooperative representation corresponding to an NFC proximity operation to the smart unit 12.

In the example of FIG. 31, the user grasps a portable terminal (a smart phone or the like) 221 having an NFC communication function, and brings not the user's hand but the portable terminal close to the smart unit 12.

If the TV 1 detects the proximity of the portable terminal 221 to the smart unit 12, the smart unit 12 performs turning-on indicating that the proximity is detected. For example, the LED indicator 84 is turned on in synchronization or interlocking with an LED lamp of the portable terminal 221.

Then, the TV 1 performs a cooperative representation in the same manner as in FIG. 29. In other words, the TV 1 displays a sub-screen as supplementary information in a superimposition manner and causes the LED indicator 84 to emit light in a color corresponding to the function in synchronization with the sub-screen as illustrated in FIG. 16.

Figure 32:
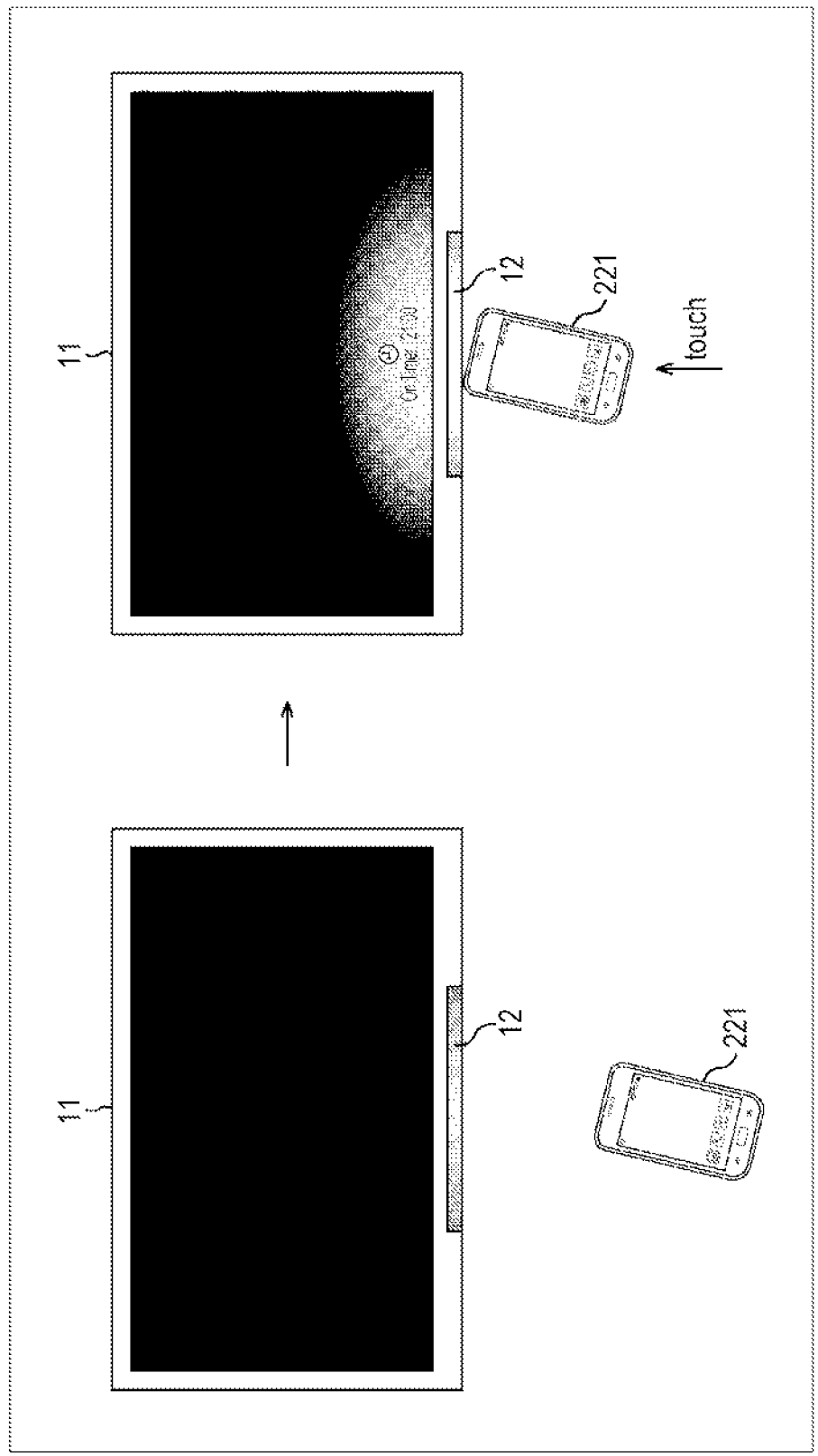
FIG. 32 is a diagram illustrating an example of cooperative representation corresponding to an NFC approximate operation to the smart unit.

FIG. 32 illustrates an example of a case where proximity of the portable terminal 221 to the smart unit 12 is detected in a standby state of the TV 1.

Also in the same manner for this case, if the TV detects the proximity of the portable terminal 221 to the smart unit 12, the smart unit 12 performs turning-on indicating that the proximity is detected. Next, supplementary information is displayed on the display 14 around the smart unit 12, and the LED indicator 84 emits light in a color corresponding to a function in synchronization with the display of the supplementary information.

[10.3 Cooperative Representation Corresponding to Data Transmission Between Portable Terminal and TV 1]

Figure 33:
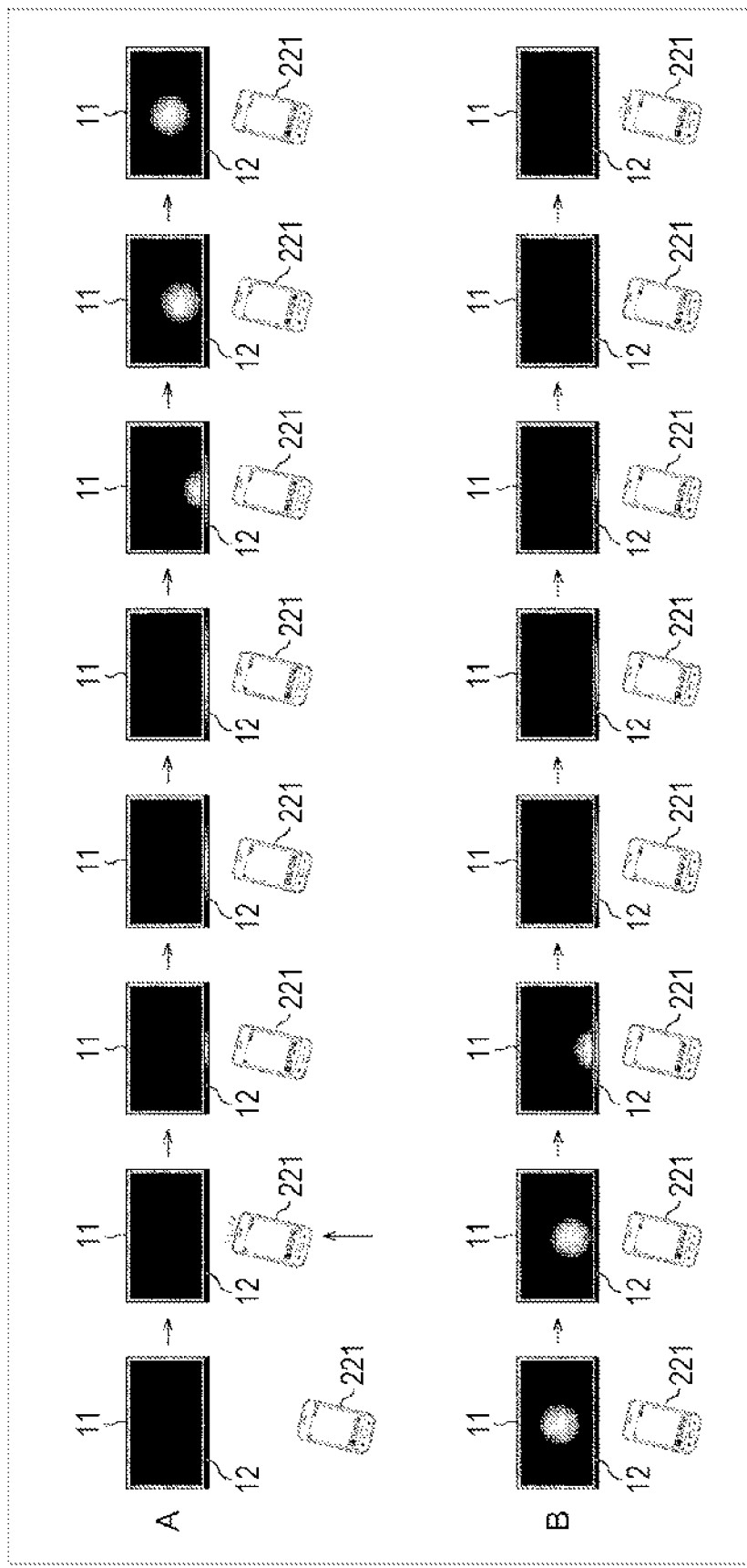
FIG. 33 is a diagram illustrating an example of cooperative representation corresponding to data transmission.

FIG. 33 illustrates an example of a cooperative representation corresponding to data transmission performed between the proximate portable terminal 221 and the smart unit 12.

FIG. 33A illustrates a cooperative representation example in a case where data is transmitted from the portable terminal 221 to the TV 1.

The user brings the portable terminal 221 close to the smart unit 12 of the TV 1. If the proximity of the portable terminal 221 to the smart unit 12 is detected, the control section 66 of the TV 1 turns on the smart unit 12 in synchronization with the LED lamp of the portable terminal 221. In other words, the LED indicator 84 of the smart unit 12 and the LED lamp of the portable terminal 221 emit light at the same timing and are turned on at all times, or are repeatedly turned on and off in the same blinking pattern.

Next, data transmission starts from the portable terminal 221 to the TV 1 through NFC communication. The control section 66 of the TV 1 starts acquiring predetermined data from the portable terminal 221 through the NFC communication.

During the data transmission operation, the control section 66 of the TV 1 performs a turning-on representation indicating data input, combined with turning-on of the LED lamp of the portable terminal 221. Specifically, first, the LED lamp of the portable terminal 221 is turned on with predetermined luminance. In addition, the control section 66 of the TV 1 performs the turning-on representation in which the LED indicator 84 and the image display of the display 14 are combined with each other in FIG. 11B or FIG. 11D, so as to correspond to a turning-off operation (reduction in luminance) of the LED lamp of the portable terminal 221.

FIG. 32A illustrates an example in which the TV 1 performs the turning-on representation of FIG. 11B.

FIG. 33B illustrates a cooperative representation example in a case where data is transmitted from the TV 1 to the portable terminal 221.

FIG. 33A illustrates a turning-on representation when the TV 1 (the smart unit 12 thereof) and the portable terminal 221 as NFC communication apparatuses detect a communication partner.

When data starts being transmitted from the TV 1 to the portable terminal 221, the control section 66 of the TV 1 performs a turning-on representation indicating data output, combined with turning-on of the LED lamp of the portable terminal 221. Specifically, first, the control section 66 of the TV 1 performs the turning-on representation in which the LED indicator 84 and the image display of the display 14 are combined with each other in FIG. 11A or FIG. 11C. In addition, in the portable terminal 221, the LED lamp of the portable terminal 221 is gradually turned on, and is then turned off, so as to correspond to a turning-off operation (reduction in luminance) of the LED indicator 84. FIG. 33B illustrates an example in which the TV 1 performs the turning-on representation of FIG. 11A.

As mentioned above, the TV 1 performs a turning-on representation cooperating (synchronized or interlocking) with a display part (LED lamp) of an external apparatus which is a communication partner of NFC communication by using the LED indicator 84, thereby indicating that the communication partner is detected.

In addition, the TV 1 makes the cooperative representation in which turning-on of the LED indicator 84 is combined with image display (image representation) further cooperate with turning-on of an LED lamp of an external apparatus which is a communication partner of NFC communication, thereby indicating input and output operations of data.

[10.4 Cooperative Representation Corresponding to Gesture Operation on Smart Unit 12]

The TV 1 has a gesture input mode in which a predetermined command is given or predetermined information is input to the TV 1 through a gesture operation.

Figure 34:
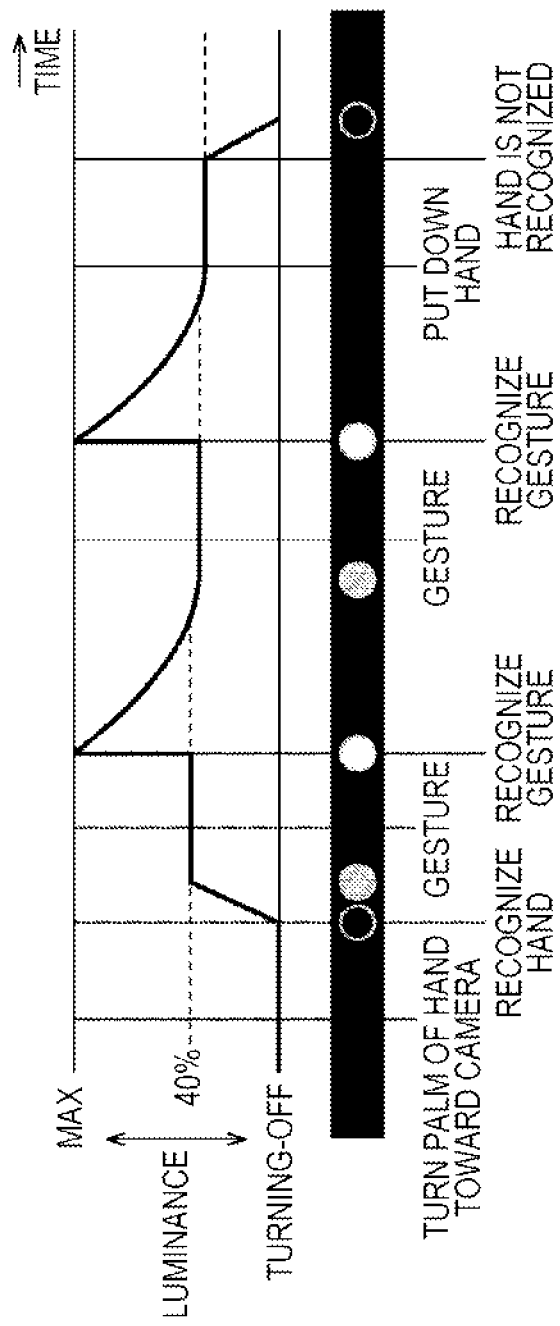
FIG. 34 is a diagram illustrating an example of cooperative representation corresponding to a gesture operation.

In a case where the hand of the user is detected or a gesture is recognized in the gesture input mode, the control section 66 of the TV 1 performs control so that the LED indicator 84 is turned on as illustrated in FIG. 34.

In other words, the user in front of the TV 1 turns the user's palm toward the TV 1 (the camera 93 thereof). If the user's hand is detected on the basis of an image captured by the camera 93, the control section 66 turns on the LED indicator 84 with first luminance (for example, 40% luminance).

If the user performs a predetermined gesture set in advance, and the control section 66 of the TV 1 recognizes the gesture on the basis of an image captured by the camera 93, luminance is instantaneously increased from the first luminance to second luminance (for example, 100% luminance). Next, the control section 66 gradually reduces luminance so that the second luminance becomes the first luminance.

If a gesture is recognized again on the basis of an image captured by the camera 93, the control section 66 performs control so that luminance is instantaneously increased from the first luminance to the second luminance, and is then returned to the first luminance. On the other hand, if the user puts the user's hand down and thus the user's palm which is a recognition target cannot be recognized, the control section 66 turns off the LED indicator 84.

As above, the control section 66 controls the LED indicator 84 so as to perform a turning-on representation which leaves the user with an allusive feeling by changing luminance from the first luminance to the second luminance with the passage of time when a gesture is recognized. By performing such turning-on, it is possible to easily understand whether or not the TV 1 side which receives a predetermined command or information receives an instruction from the user.

[10.5 Cooperative Representation Corresponding to Pairing Operation of BT Apparatus]

Figure 35:
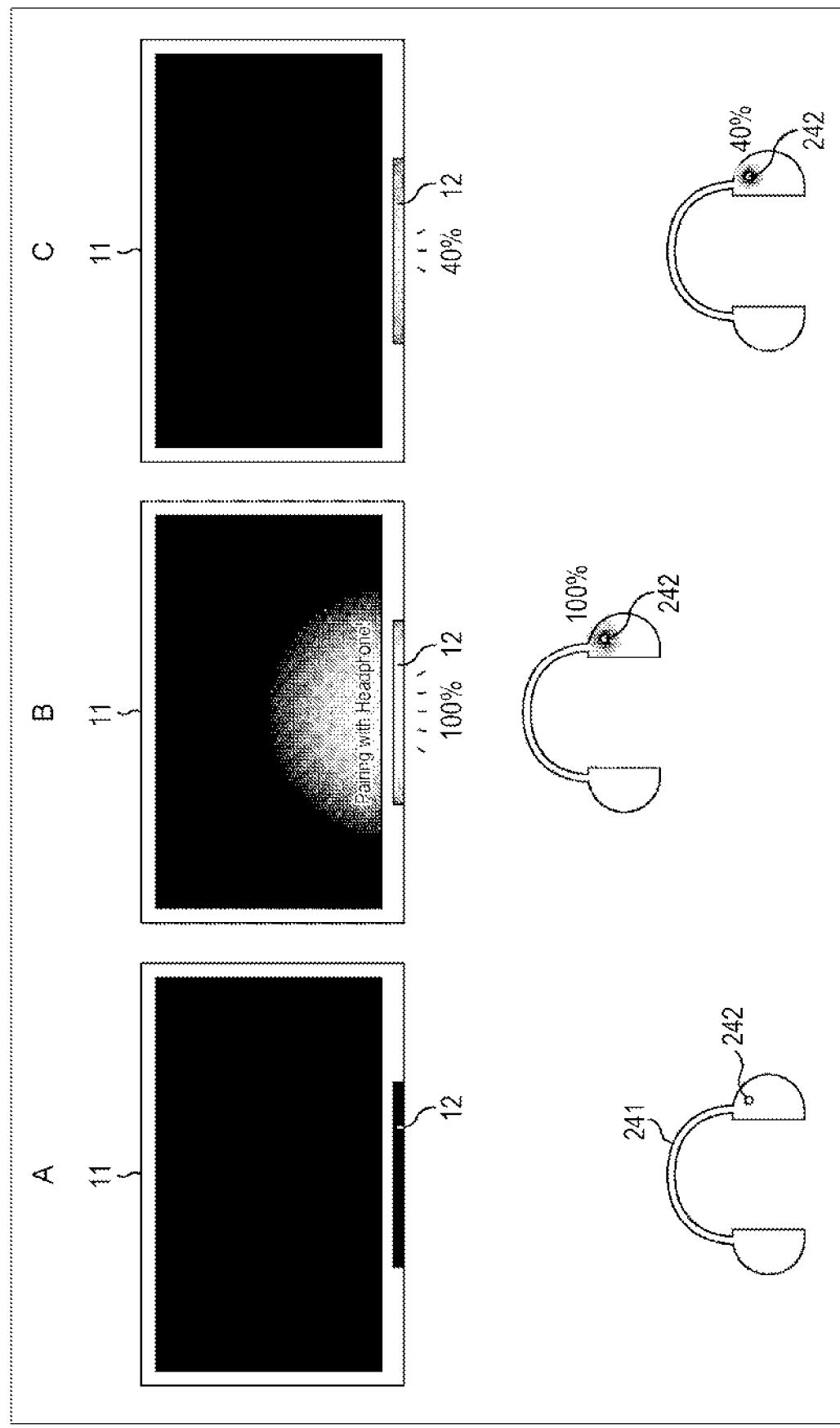
FIG. 35 is a diagram illustrating an example of cooperative representation corresponding to a pairing operation of a BT apparatus.

FIG. 35 illustrates an example of a cooperative representation corresponding to a pairing operation of a BT apparatus.

A headphone 241 illustrated in FIG. 35 is a BT apparatus which receives an audio signal of a broadcast program or the like from the TV 1 through BT communication, and outputs sounds. The headphone 241 is provided with an LED lamp 242 which emits predetermined light according to a power supply state or a communication state.

As illustrated in FIG. 35A, before the TV 1 and the headphone 241 which are BT apparatuses are paired with each other, the LED indicator 84 of the TV 1 and the LED lamp 242 of the headphone 241 are all turned off.

The user performs a pairing operation of the TV 1 and the headphone 241. In other words, the user performs a predetermined operation set in advance on the headphone 241, and thus a mode of the headphone 241 is changed to a pairing mode. In addition, a mode of the TV 1 is changed to a pairing mode, and the control section 66 of the TV 1 retrieves BT apparatuses in a range in which communication can be performed, so as to detect the headphone 241.

The control section 66 of the TV 1 performs a pairing operation with the detected headphone 241. Accordingly, the TV 1 and the headphone 241 share the same passcode (PIN code).

If the pairing is completed, the TV 1 performs a cooperative representation in which turning-on of the LED indicator 84 is combined with image display (image representation) so as to indicate the completion of the pairing as illustrated in FIG. 35B. In other words, the TV 1 causes the LED indicator 84 to emit light with first luminance (for example, 100% luminance) and also displays an image of hemispherical light centering on the smart unit 12 on the display 14. The text "Pairing with Headphone!" is displayed in the image displayed on the display 14. The turning-on of the LED indicator 84 and the image display are controlled so as to be the same as a blinking pattern of the LED lamp 242 of the headphone 241 in synchronization with each other. In addition, the turning-on of the LED indicator 84 and the image display may be performed so as to interlock with a blinking pattern of the LED lamp 242 of the headphone 241 while maintaining a predetermined time difference therewith.

In the second and subsequent connections between the TV 1 and the headphone 241 in which the pairing is set, the synchronous turning-on control is also performed as in FIG. 35B when the mutual BT apparatuses are detected. In addition, in a case where the TV 1 is currently connected to the headphone 241 through BT communication, the LED indicator 84 of the smart unit 12 and the LED lamp 242 of the headphone 241 are turned on with second luminance (for example, 40% luminance) lower than the first luminance.

[10.6 Cooperative Representation with Wi-Fi Apparatus in Home Network]

The TV 1 turns on the smart unit 12 in accordance with a communication state with other communication apparatuses connected to a home network in a wired or wireless manner.

The TV 1 is, for example, a DLNA correspondence apparatus which corresponds to a digital living network alliance (DLNA) standard, and can acquire content from other DLNA correspondence apparatuses conforming to the DLNA standard so as to display an image of the acquired content on the display 14.

An operation of outputting content (an image thereof) which is reproduced and displayed on a first DLNA correspondence apparatus from the first DLNA correspondence apparatus to a second DLNA correspondence apparatus is referred to as throw. Conversely, an operation of inputting content (an image thereof) which is reproduced and displayed on the second DLNA correspondence apparatus to the first DLNA correspondence apparatus is referred to as catch.

Figure 36:
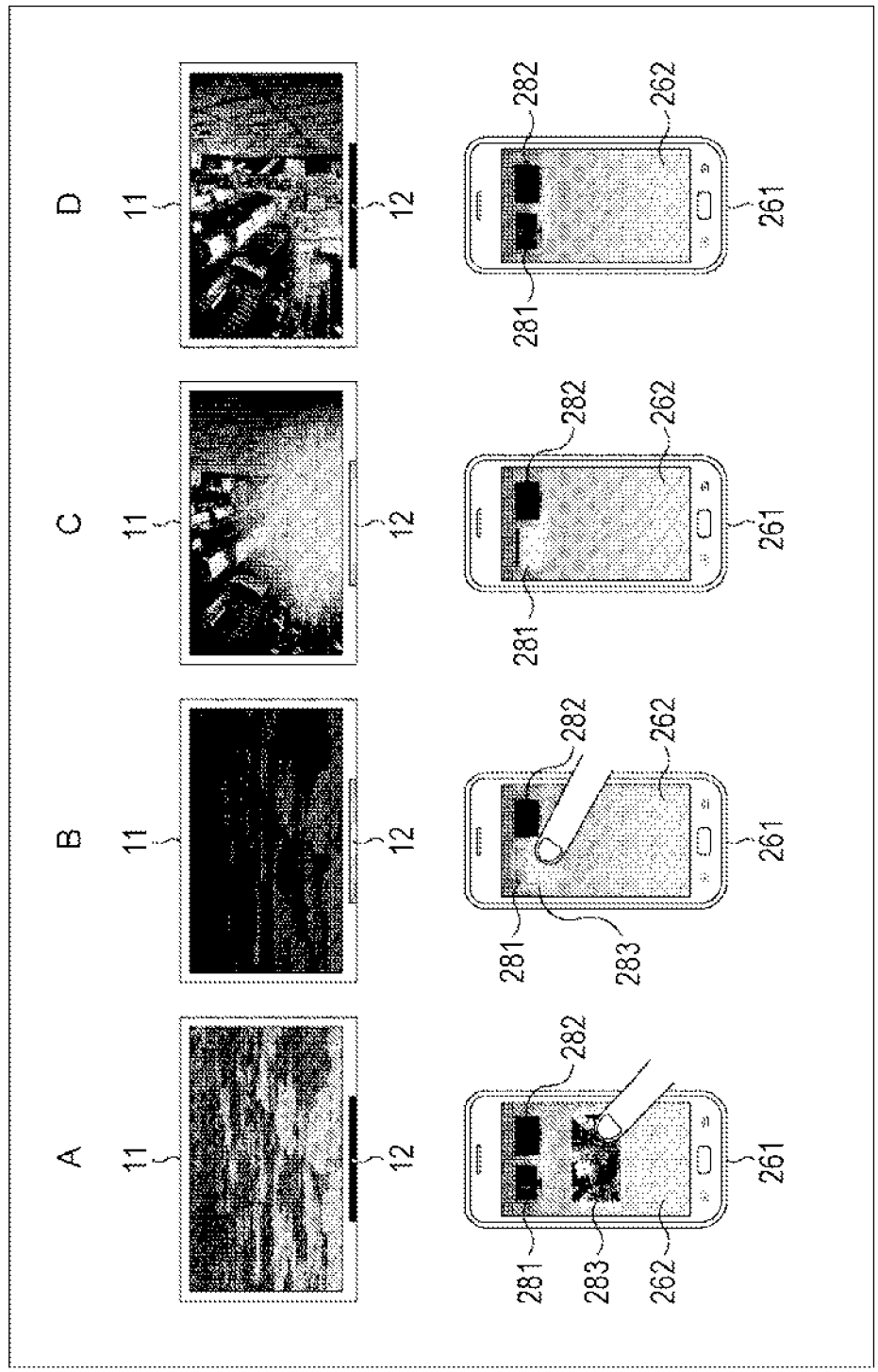
FIG. 36 is a diagram illustrating an example of cooperative representation with a Wi-Fi apparatus.

FIG. 36 illustrates an example of a cooperative representation of the TV 1 and a portable terminal 261 when content is thrown from the portable terminal 261 which is a first DLNA correspondence apparatus to the TV 1 which is a second DLNA correspondence apparatus.

First, the user selects a throw process of content which is currently reproduced and displayed on the portable terminal 261. Accordingly, as illustrated in FIG. 36A, through apparatus icons 281 and 282 which are icons of DLNA correspondence apparatuses connected to the home network as throw destination candidates are displayed on a display 262 of the portable terminal 261. In this example, it is assumed that the throw apparatus icon 281 corresponds to the TV 1, and the throw apparatus icon 282 corresponds to a personal computer (not illustrated) connected to the home network. Hereinafter, the throw apparatus icon 281 is also referred to as a TV icon 281, and the throw apparatus icon 282 is also referred to as a PC icon 282.

The user drags a content icon 283 using a thumbnail of content which is reproduced and displayed with the finger, and moves the icon to the throw apparatus icon 281 or 282 to which the content is desired to be thrown.

Assuming that the TV 1 is selected as a throw destination, the user releases the finger which drags the icon, from the display 262 on the TV icon 281.

When the finger which drags the icon is released on the TV icon 281, the content icon 283 disappears as if the content icon appears to be absorbed by the TV icon 281 as illustrated in FIG. 36C, which finally leads to a state as in FIG. 36D. Whereas the content icon 283 is absorbed by the TV icon 281 and disappears, as illustrated in FIG. 36C, the LED indicator 84 of the smart unit 12 is gradually brightened from first luminance (50% luminance) and is increased to second luminance (100% luminance). In addition, as illustrated in FIG. 36D, the LED indicator 84 is gradually turned off from the second luminance, and thus the image of the content which is reproduced and displayed on the portable terminal 261 is displayed on the display 14 of the TV 1.

Figure 37:
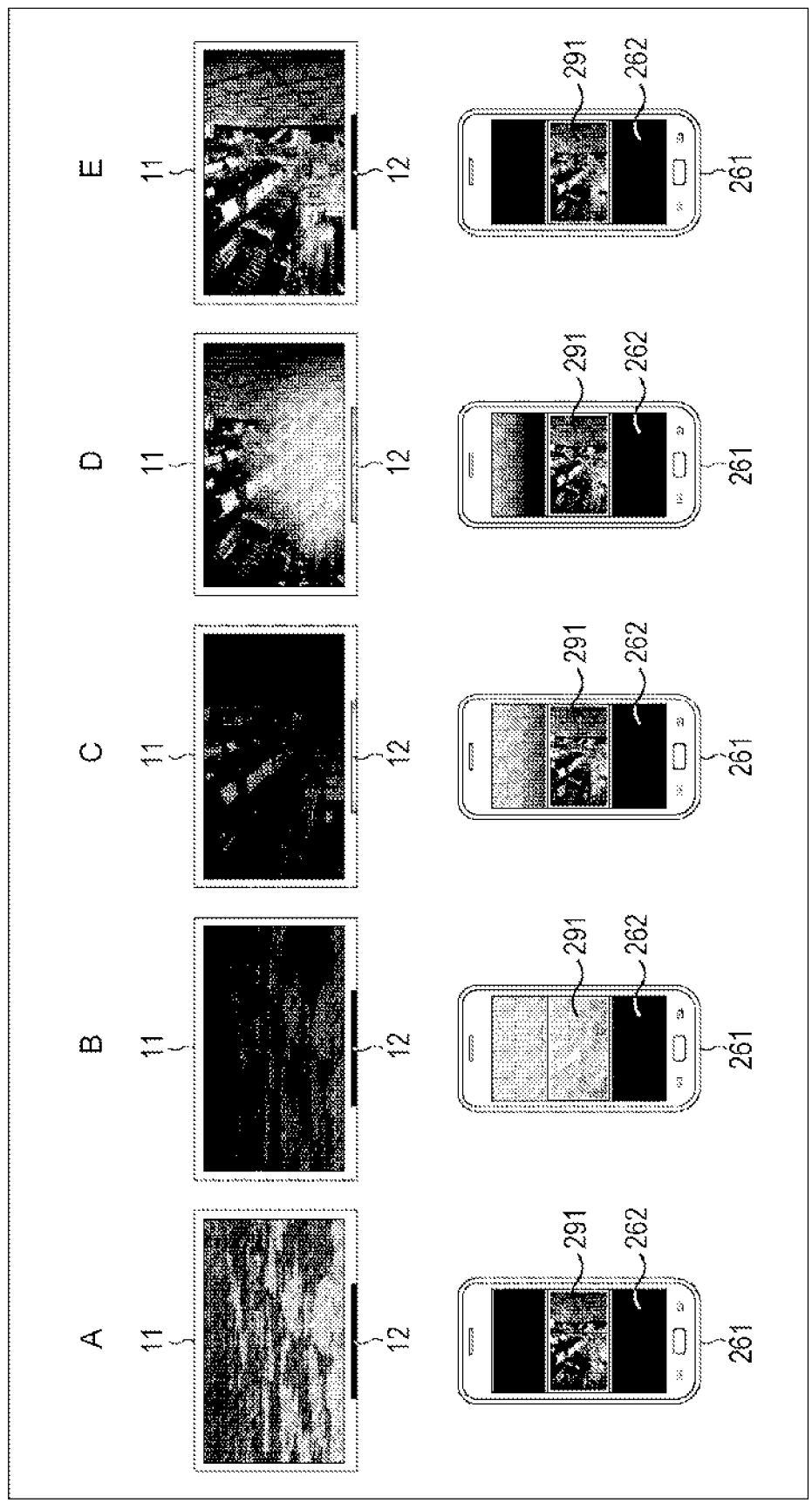
FIG. 37 is a diagram illustrating an example of cooperative representation with the Wi-Fi apparatus.

FIG. 37 illustrates a state in which the content image 291 which is reproduced and displayed on the display 262 of the portable terminal 261 is gradually displayed on the TV 1. The content image 291 which is currently reproduced in the portable terminal 261 is displayed on the TV 1 in an order of FIG. 37A, FIG. 37B, FIG. 37C, FIG. 37D, and FIG. 37E.

[Various Operations of Catch and Throw]

With reference to FIGS. 38 to 44, a description will be made of cooperative communication of catch or throw, and a cooperative representation between the display 14 and the LED indicator 84 of the TV 1 corresponding thereto.

Figure 38:
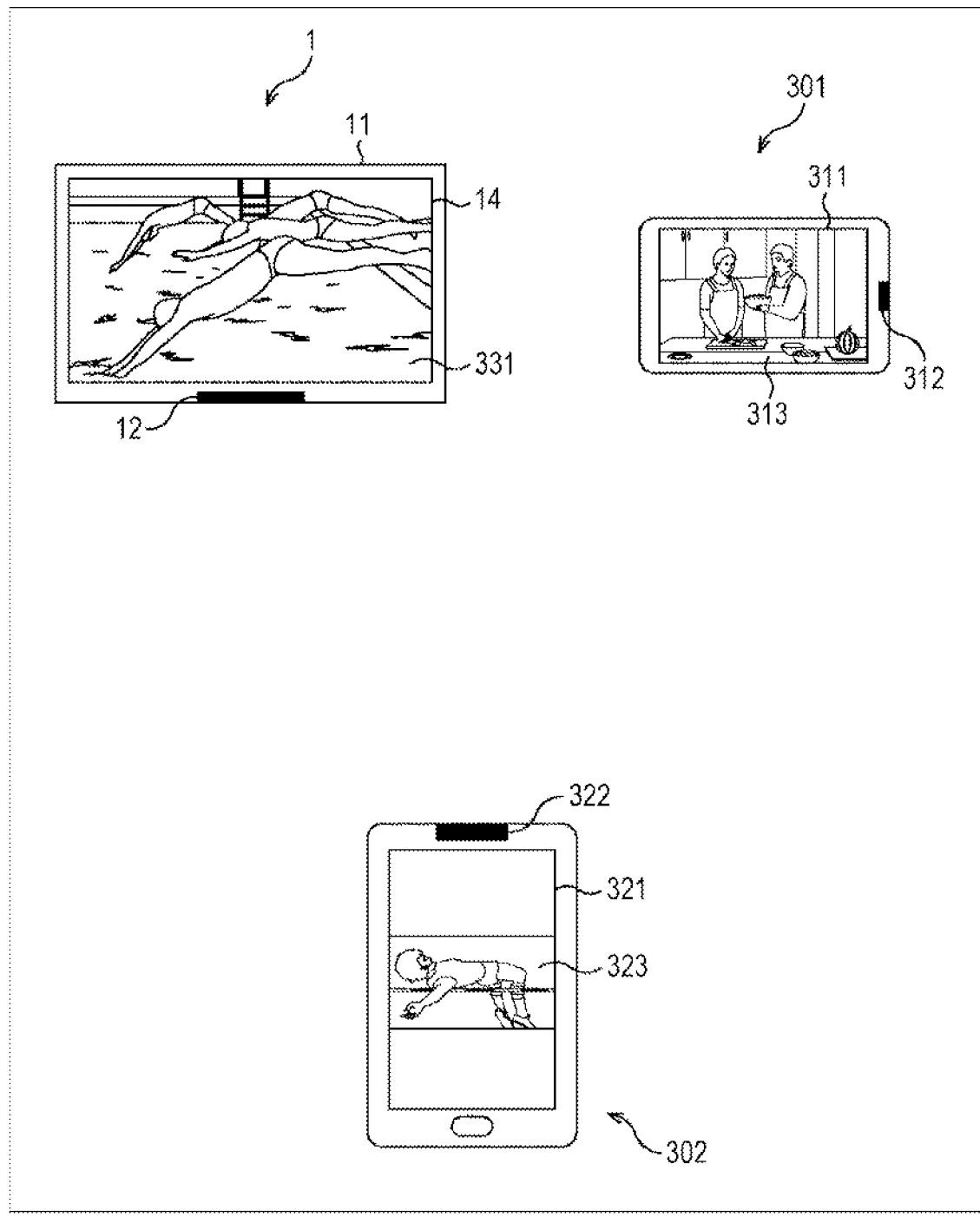
FIG. 38 is a diagram illustrating an example of cooperative representation with the Wi-Fi apparatus.
Figure 39:
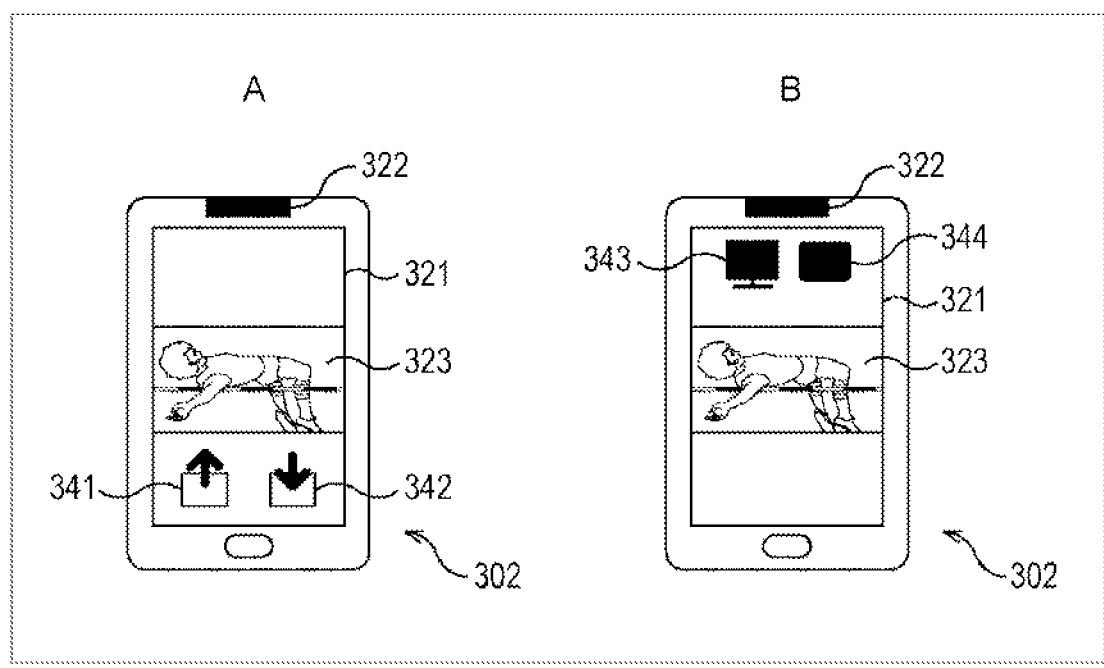
FIG. 39 is a diagram illustrating an example of cooperative representation with the Wi-Fi apparatus.

First, the home network connected to the TV 1 is connected to the TV 1, a tablet terminal 301, and a portable terminal 302 called a smart phone as illustrated in FIG. 38.

The tablet terminal 301 includes a display 311, an LED lamp 312, a control unit (not illustrated) which controls the above-described elements, and a wireless communication unit (not illustrated) which performs wireless communication such as Wi-Fi communication, NFC communication, and BT communication. A predetermined content image 313 is displayed on the display 311 of the tablet terminal 301. The portable terminal 302 also includes a display 321, an LED lamp 322, a control unit (not illustrated) which controls the above-described elements, and a wireless communication unit (not illustrated). A predetermined content image 323 is displayed on the display 321 of the portable terminal 302. A content image 331 of a broadcast program or the like is displayed on the display 14 of the TV If the user performs a predetermined operation set in advance such as tapping the display 321 in the portable terminal 302, a throw/catch instruction screen illustrated in FIG. 39A is displayed on the display 321. A throw selection icon 341 which is operated when a throw process is performed, and a catch selection icon 342 which is operated when a catch process is performed, are displayed on the throw/catch instruction screen.

In a case where the content image 323 which is reproduced and displayed on the portable terminal 302 is thrown, the user taps (selects) the throw selection icon 341 displayed on the display 321.

If the throw selection icon 341 is tapped, and thus a throw (process) is selected, as illustrated in FIG. 39B, a TV icon 343 corresponding to the TV 1 and a tablet icon 344 corresponding to the tablet terminal 301 are displayed on the display 321 of the portable terminal 302 as throw destination candidates.

The user taps and selects either the TV icon 343 or the tablet icon 344 displayed on the portable terminal 302 as a throw destination, and thus the content image 323 which reproduced and displayed on the portable terminal 302 is thrown to the TV 1 or the tablet terminal 301.

Figure 40:
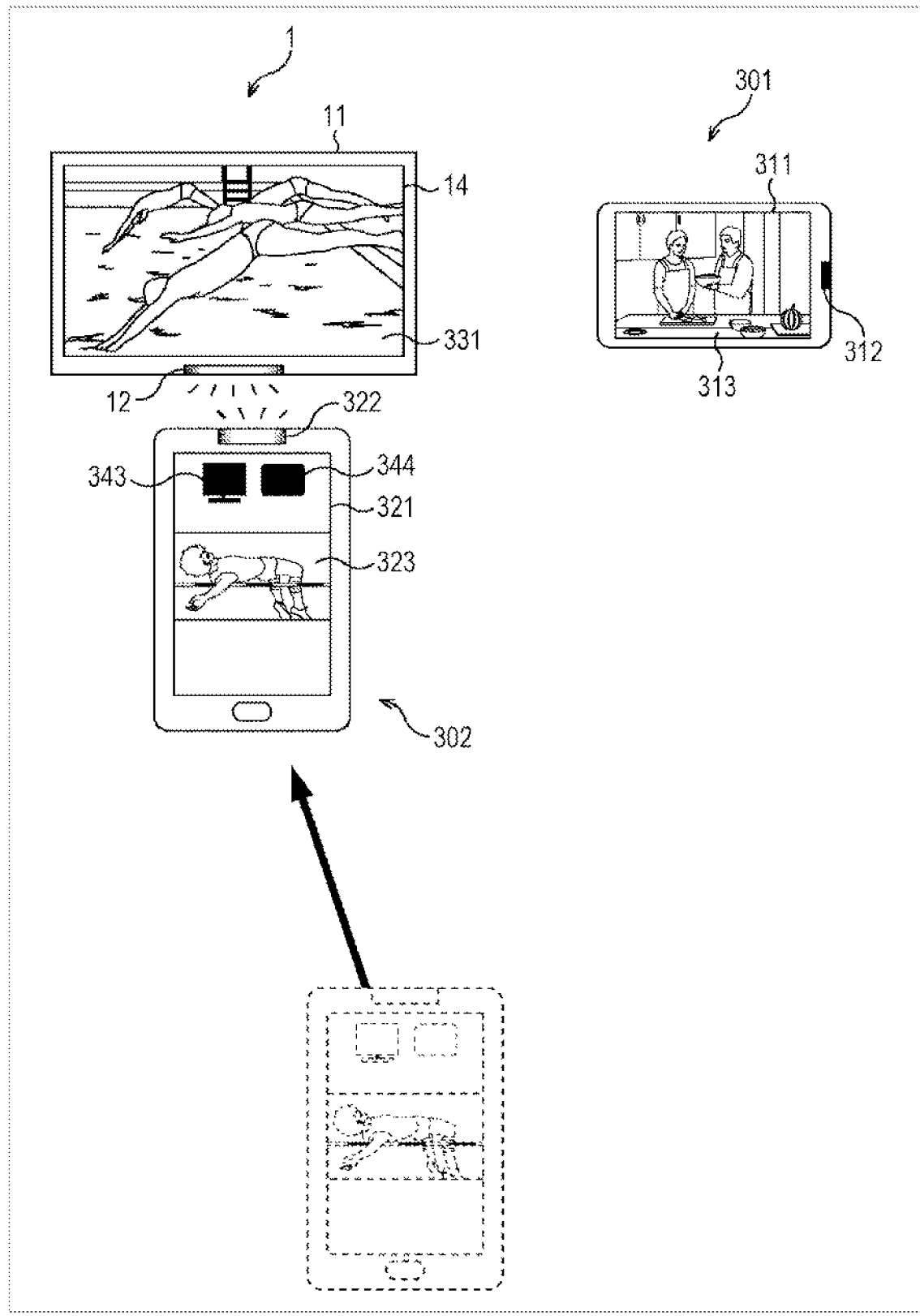
FIG. 40 is a diagram illustrating an example of cooperative representation with the Wi-Fi apparatus.

In addition, in a state in which a throw destination selection screen is displayed on the display 321 of the portable terminal 302 as illustrated in FIG. 39B, the user brings the grasped portable terminal 302 close to the smart unit 12 of the TV 1 as a throw destination as illustrated in FIG. 40. Then, the TV 1 and the portable terminal 302 detect mutual proximity through NFC communication, so that the TV 1 is selected as a throw destination, and the content image 323 reproduced and displayed on the portable terminal 302 is thrown to the TV 1.

In the throw process, the cooperative representation between the display 14 and the LED indicator 84 of the TV 1, described with reference to FIG. 37, is performed between the TV 1 as a throw destination and the portable terminal 302.

On the other hand, in the throw/catch instruction screen illustrated in FIG. 39A, also in a case where the catch selection icon 342 is tapped, and thus a catch (process) is selected, a catch destination selection screen as in FIG. 39B is displayed on the display 321 of the portable terminal 302. In addition, a DLNA correspondence apparatus which is a catch target is designated due to tapping of the TV icon 343 or the tablet icon 344, or proximity of the portable terminal 302. As a result, a content image is input from the designated DLNA correspondence apparatus and is displayed on the display 321 of the portable terminal 302.

Figure 41:
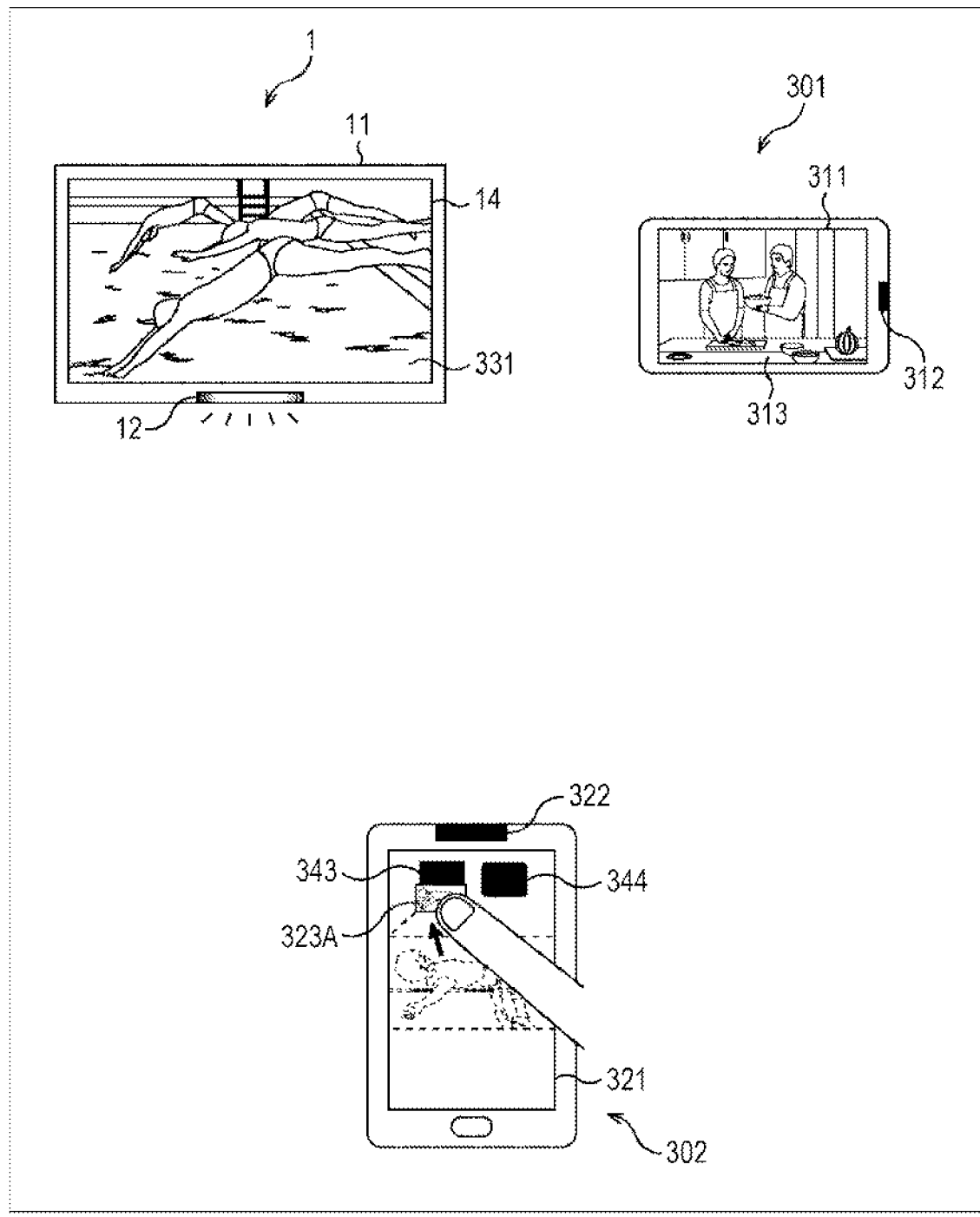
FIG. 41 is a diagram illustrating an example of cooperative representation with the Wi-Fi apparatus.
Figure 42:
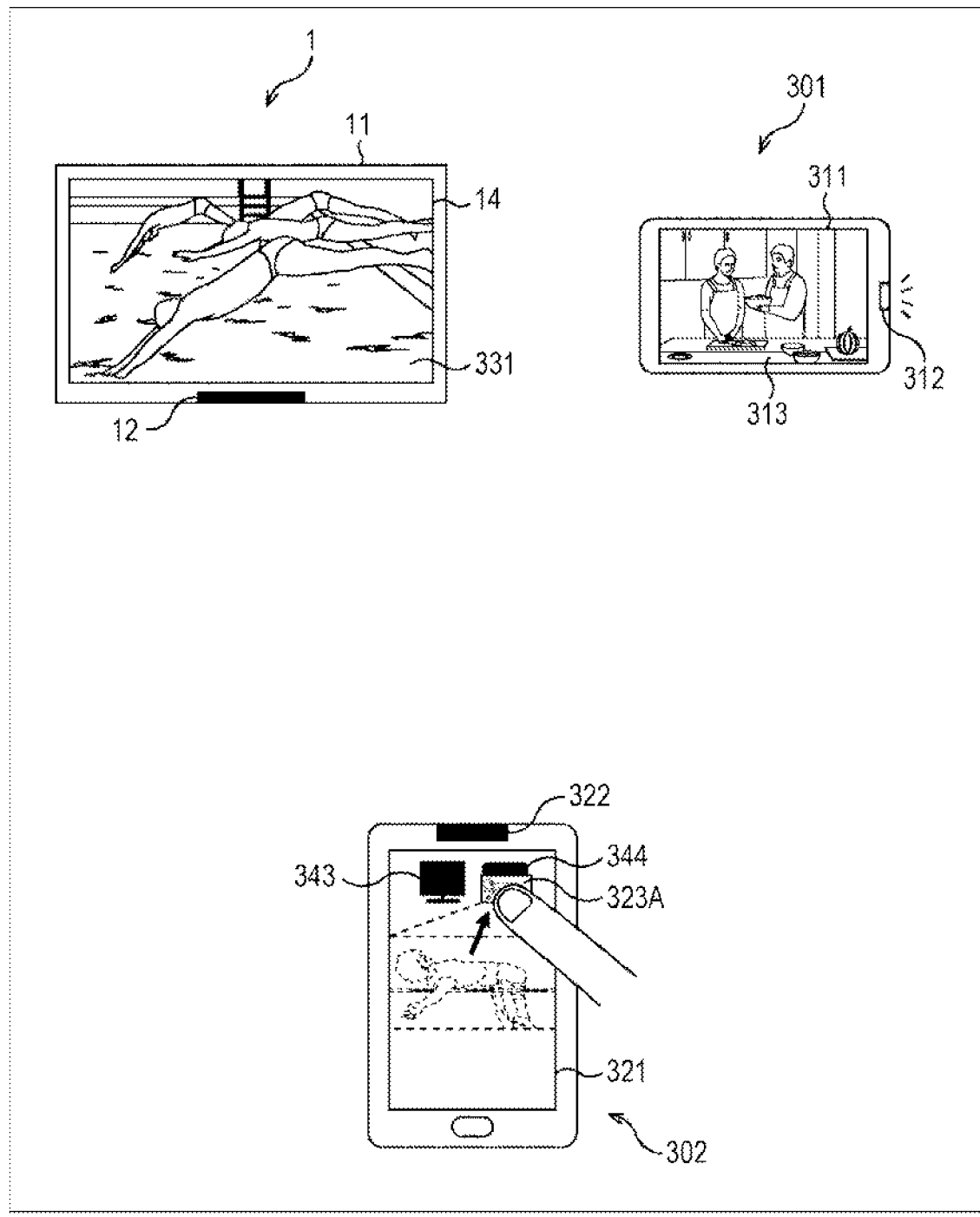
FIG. 42 is a diagram illustrating an example of cooperative representation with the Wi-Fi apparatus.

FIGS. 41 and 42 are diagrams illustrating another operation method of cooperative communication.

In the portable terminal 302, in the state in which the throw destination selection screen of FIG. 39B is displayed, the TV 1 or the portable terminal 302 can be designated as a throw destination by performing an operation in which the content image 323 displayed on the display 321 is dragged in the upward direction of the figure, and the finger is released on the TV icon 343 or the tablet icon 344.

At this time, as illustrated in FIG. 41, if a content image 323A to which the content image 323 is reduced due to the dragging is in a state of overlapping the TV icon 343, the LED indicator 84 of the smart unit 12 of the TV 1 corresponding to the TV icon 343 is turned on in a predetermined cycle. In other words, the portable terminal 302 causes the LED indicator 84 of the smart unit 12 to be turned on in a predetermined cycle by transmitting a control signal indicating that the TV is selected, to the TV 1 which is selected as a throw destination in a state in which the content image 323A overlaps the TV icon 343.

At this time, as illustrated in FIG. 42, if a content image 323A to which the content image 323 is reduced due to the dragging is in a state of overlapping the tablet icon 344, the LED lamp 312 of the tablet terminal 301 corresponding to the tablet icon 344 is turned on in a predetermined cycle. In other words, the portable terminal 302 causes the LED indicator 84 of the smart unit 12 to be turned on in a predetermined cycle by transmitting a control signal indicating that the tablet terminal is selected, to the tablet terminal 301 which is selected as a throw destination in a state in which the content image 323A overlaps the tablet icon 344.

As mentioned above, the TV 1 and the tablet terminal 301 are turned on in a predetermined cycle in a case where the TV and the tablet terminal are selected as an output destination of the content image 323 in the portable terminal 302. Accordingly, the user can easily recognize an apparatus which is a throw destination (an output destination of content data).

Figure 43:
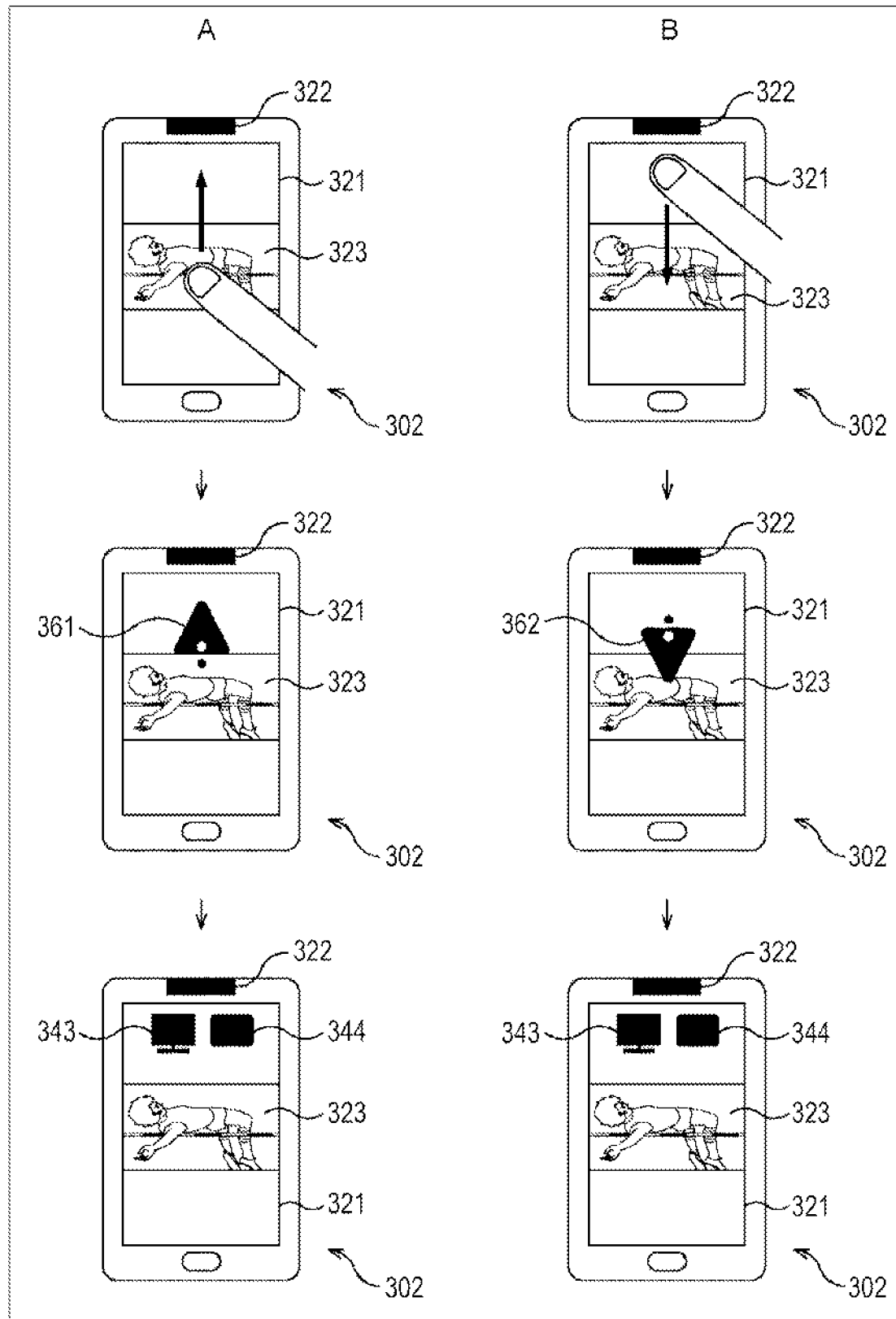
FIG. 43 is a diagram illustrating an example of cooperative representation with the Wi-Fi apparatus.

FIG. 43 is a diagram illustrating still another operation method of cooperative communication.

In the state in which the content image 323 is reproduced and displayed on the portable terminal 302, illustrated in FIG. 38, the user performs a dragging operation on the display 321 of the portable terminal 302 in the upward direction of the figure as illustrated in FIG. 43A. If the user's upward dragging operation is detected, the portable terminal 302 recognizes that a throw command is instructed, and a throw icon 361 indicating a throw operation is displayed on the display 321 in a superimposition manner. Next, the same throw destination selection screen as that in FIG. 39B is displayed on the display 321.

On the other hand, as illustrated in FIG. 43B, the user performs a dragging operation on the display 321 of the portable terminal 302 in the downward direction of the figure. If the user's downward dragging operation is detected, the portable terminal 302 recognizes that a catch command is instructed, and a catch icon 362 indicating a catch operation is displayed on the display 321 in a superimposition manner. Next, the same catch destination selection screen as that in FIG. 39B is displayed on the display 321.

An operation after the throw destination or catch destination selection screen is displayed is the same as in the above-described example, and description thereof will not be repeated.

Figure 44:
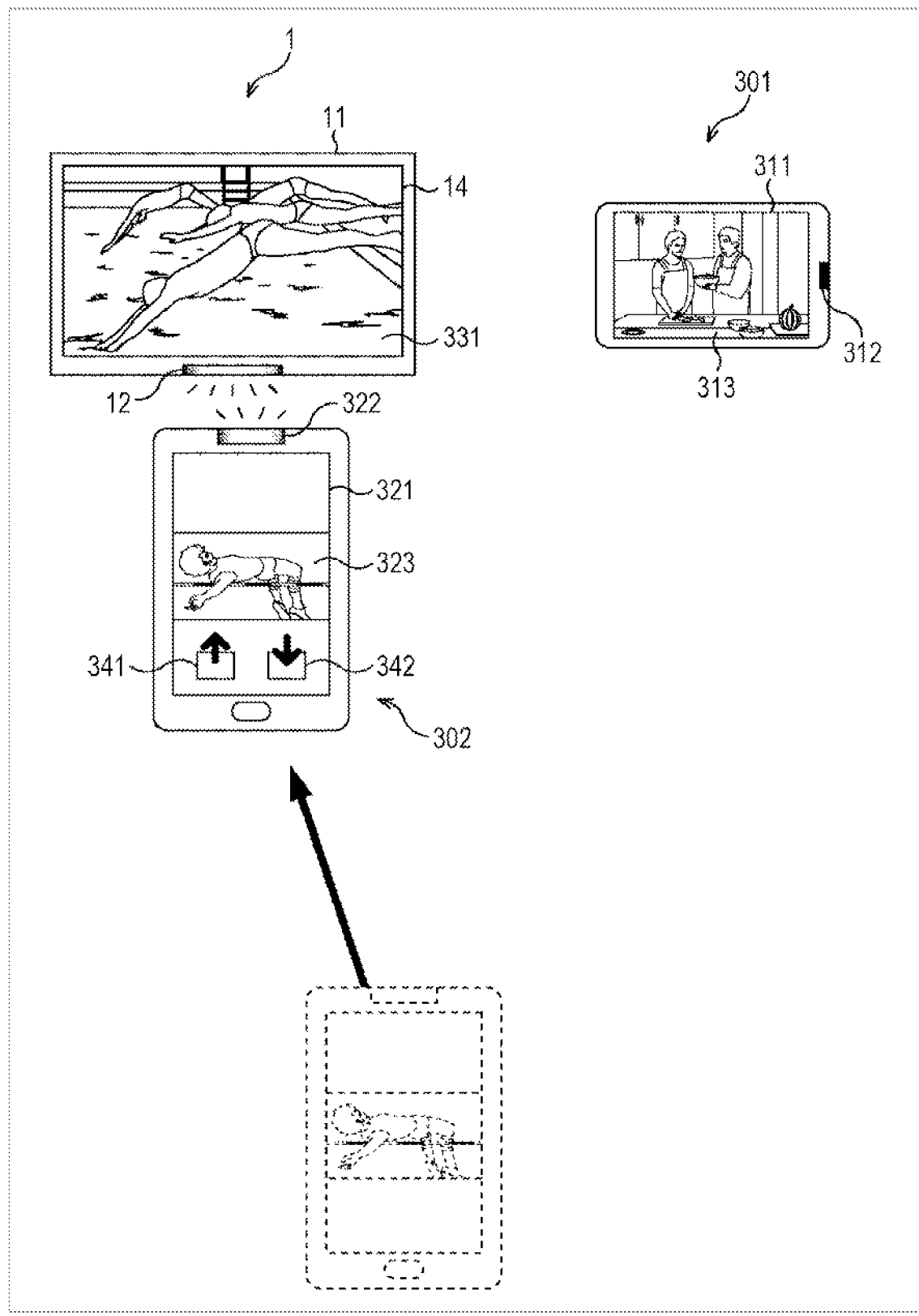
FIG. 44 is a diagram illustrating an example of cooperative representation with the Wi-Fi apparatus.

FIG. 44 is a diagram illustrating still another operation method of cooperative communication.

In a state in which the content image 323 is reproduced and displayed on the portable terminal 302, illustrated in FIG. 38, the user brings the grasped portable terminal 302 close to the smart unit 12 of the TV 1 as a cooperative communication destination as illustrated in FIG. 44. Then, the TV 1 and the portable terminal 302 detect mutual proximity through NFC communication. In addition, the LED indicator 84 of the smart unit 12 of the TV 1 and the LED lamp 322 of the portable terminal 302 are turned on in synchronization with each other.

Simultaneously, the portable terminal 302 displays the same cooperative communication selection screen as that of FIG. 39A on the display 321. In the cooperative communication selection screen, in a case where the throw selection icon 341 is tapped (selected), the content image 323 which is reproduced and displayed on the portable terminal 302 is thrown to the TV 1. On the other hand, in the cooperative communication selection screen, in a case where the catch selection icon 342 is tapped (selected), the content image 331 which is reproduced and displayed on the TV 1 is caught by the portable terminal 302 from the TV 1, and is displayed on the display 321 of the portable terminal 302.

Figure 45:
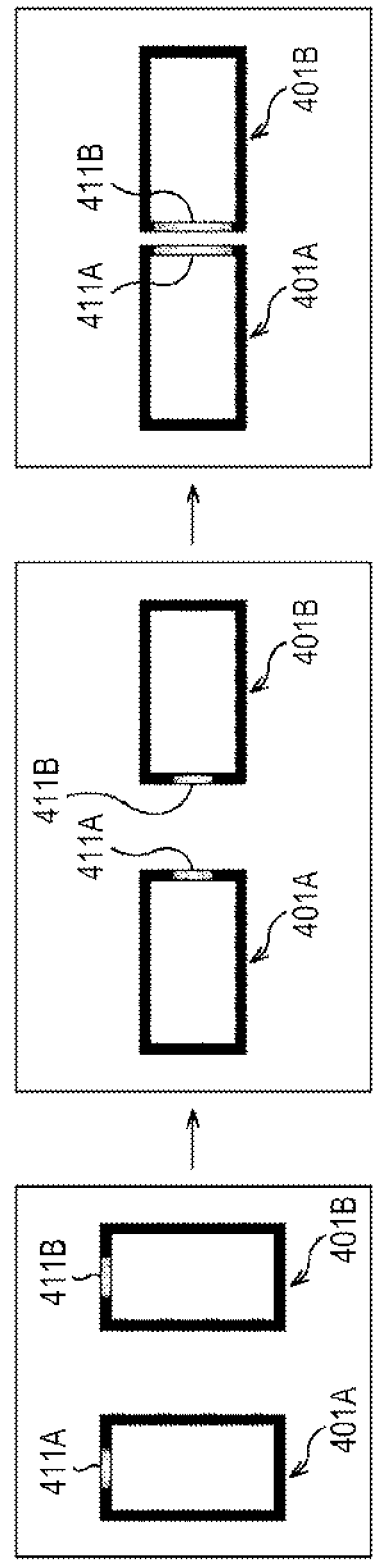
FIG. 45 is a diagram illustrating an example of cooperative representation with the Wi-Fi apparatus.
Figure 46:
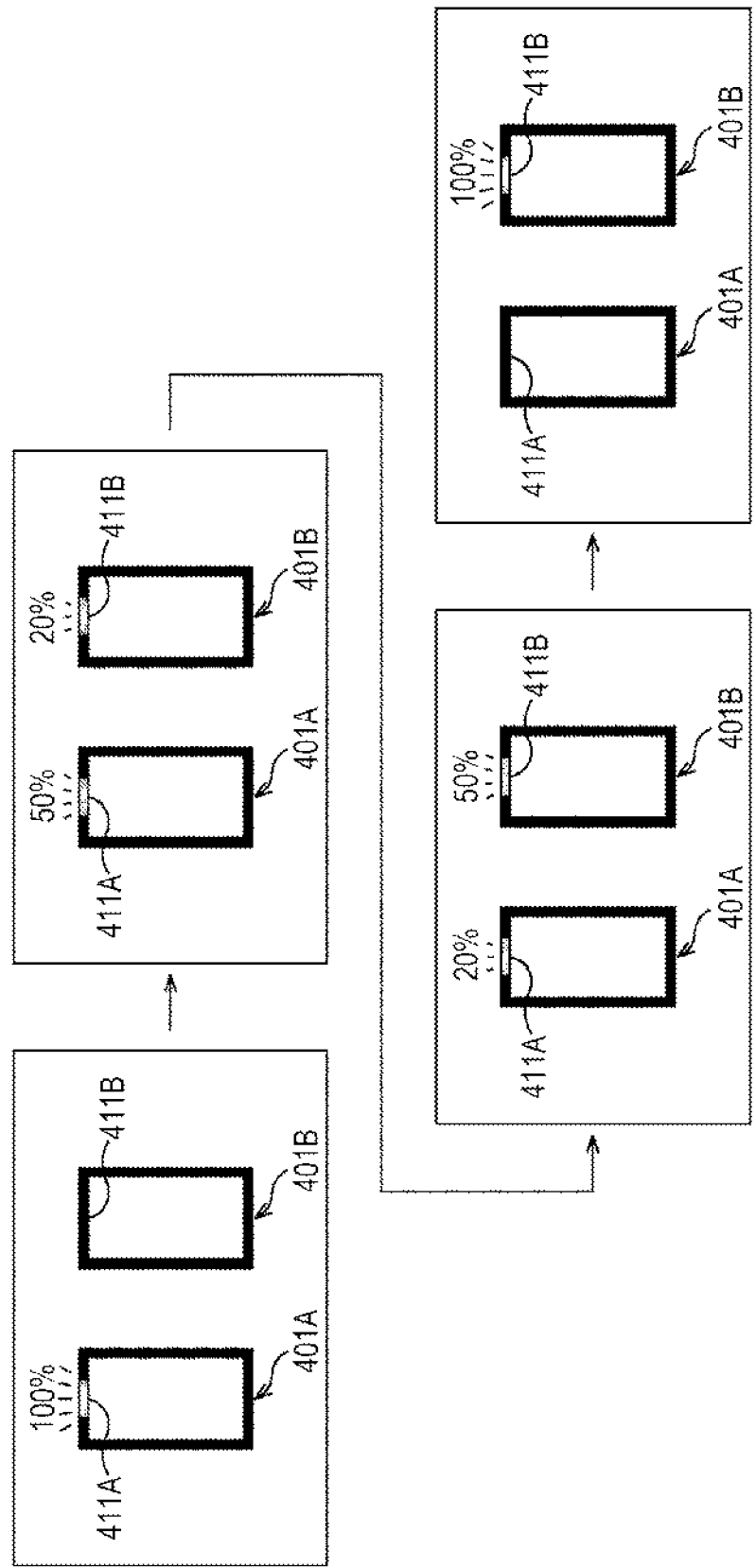
FIG. 46 is a diagram illustrating an example of cooperative representation with the Wi-Fi apparatus.

Two communication apparatuses 401 (401A and 401B) of FIGS. 45 and 46 have the same function as that of the above-described TV 1, tablet terminal 301, and the portable terminal 302, and include LED indicators 411 (411A and 411B).

In a case where the two communication apparatuses 401A and 401B are brought close to each other, and cooperative communication such as catch and throw starts between the communication apparatuses 401A and 401B, as illustrated in FIG. 45, first, if the LED indicator 411A of the communication apparatuses 401A and the LED indicator 411B of the communication apparatuses 401B are left flashing, it is possible for the user to can easily understand favorable parts which are brought close to each other.

In addition, if the user brings the vicinity of the flashing LED indicator 411A of the communication apparatus 401A and the vicinity of the flashing LED indicator 411B of the communication apparatus 401B close to each other, the communication apparatus 401A and the communication apparatus 401B mutually detect (recognize) partners. In a case where the communication apparatus 401A and the communication apparatus 401B detect partners, they are turned on in the same turning-on manner as the partners. For example, the LED indicator 411A of the communication apparatus 401A and the LED indicator 411E of the communication apparatus 401B simultaneously blink. Accordingly, the user can easily recognize that the communication apparatus 401A and the communication apparatus 401B mutually recognize partners. Instead of changing emission luminance, a flashing color may be changed, or a shape of a flashing part may be changed.

In addition, during data communication, as illustrated in FIG. 46, turning-on of the LED indicator 411A of the communication apparatus 401A and the LED indicator 411B of the communication apparatus 401B is controlled so that light transitions so as to correspond to data movement. In other words, control may be repeatedly performed in the predetermined data unit so that the LED indicator 411A of the communication apparatus 401A which is a data transmission source is turned on with high luminance at first, and the LED indicator 411B of the communication apparatus 401B is turned on with high luminance in accordance with turning-off of the LED indicator 411A. Accordingly, the user can intuitively recognize that transmission and reception of data are performed between the communication apparatuses 401A and 401B. Alternatively, the LED indicator 411A of the communication apparatus 401A and the LED indicator 411B of the communication apparatus 401B may be turned on so that turning-on and turning-off are repeated at the same timing.

[11. Flowchart for Realizing Cooperative Representation]

Figure 47:
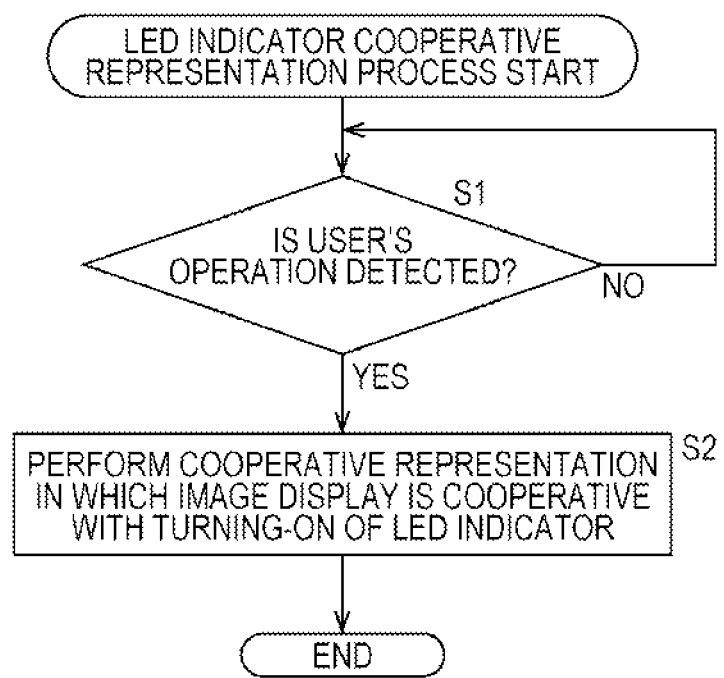
FIG. 47 is a flowchart illustrating a process of realizing cooperative representation.

FIG. 47 is a flowchart illustrating a process for realizing the above-described cooperative representation between image display of the display 14 and turning-on of the LED indicator 84 of the TV 1.

In this process, first, in step S1, the control section 66 of the TV 1 determines whether or not a user's operation or the like is detected as a trigger for performing the cooperative representation. The user's operation or the like corresponds to various operations or apparatus states such as a button operation of the remote controller, a user's operation such as a gesture, proximity of other communication apparatuses to the smart unit 12, and reception of a message requesting cooperative communication.

The process in step S1 is repeatedly performed until it is determined that a user's operation is detected, and if it is determined that a user's operation or the like is detected in step S1, the process proceeds to step S2. In addition, in step S2, the control section 66 of the TV 1 performs the above-described cooperative representation in which image display of the display 14 is cooperative with turning-on of the LED indicator 84.

In the above-described examples, a cooperative representation performed by the TV 1 has been mainly described, but the present technology is applicable to not only a television receiver but also general display apparatuses, such as a portable terminal including a smart phone, or a tablet terminal, provided with an image display unit such as an LCD or an electroluminescence (EL) display, and an indicator (a turning-on unit) such as an LED which indicates a predetermined operation or state with illumination.

Embodiments of the present technology are not limited to the above-described embodiments, and may have various modifications within the scope without departing from the spirit of the present technology.

In addition, the present technology may have the following configurations.

(1) A display apparatus including a display unit that displays a predetermined image; a communication unit that performs communication of image data with another image display apparatus; an indicator unit that is disposed at at least a part of surroundings of the display unit and includes an indicator which is turned on with predetermined luminance; and a control unit that turns on the indicator so as to correspond to a transmission operation of the image data in another image display apparatus.

(2) The display apparatus according to the above (1), in which the indicator is turned on under the control of the control unit when the display apparatus is selected as an output destination of the image data in another image display apparatus.

(3) The display apparatus according to the above (1) or (2), in which the indicator is turned on under the control of the control unit during transmission of the image data with another image display apparatus.

(4) The display apparatus according to any one of the above (1) to (3), in which the indicator performs turning-on cooperative with another image display apparatus under the control of the control unit so that light transitions so as to correspond to movement of the image data with another image display apparatus.

(5) The display apparatus according to any one of the above (1) to (4), in which the communication unit receives the image data from another image display apparatus, and in which the control unit performs control for display in which an image corresponding to the received image data is expelled from the indicator unit, and turns on the indicator in synchronization or interlocking with the display in which the image is expelled from the indicator unit.

(6) The display apparatus according to any one of the above (1) to (5), further including a proximity communication unit that detects that another image display apparatus is at least brought close to the indicator unit, in which the communication unit communicates with another image display apparatus which is brought close to the display apparatus by a user as a transmission operation of the image data.

(7) A display control method for a display apparatus including a display unit that displays a predetermined image, a communication unit that performs communication of image data with another image display apparatus, an indicator unit that is disposed at at least a part of surroundings of the display unit and includes an indicator which is turned on with predetermined luminance, and a control unit that controls turning-on of the indicator, the method including causing the control unit to turn on the indicator so as to correspond to a transmission operation of the image data in another image display apparatus.

(8) A program causing a computer which controls a display apparatus, to perform the process of turning on an indicator so as to correspond to a transmission operation of image data in another image display apparatus, in which the display apparatus includes a display unit that displays a predetermined image; a communication unit that performs communication of image data with another image display apparatus; and an indicator unit that is disposed at at least a part of surroundings of the display unit and includes the indicator which is turned on with predetermined luminance.

(9) A portable terminal apparatus including a communication unit that performs transmission of image data with an image display apparatus; a display unit that displays an instruction image for instructing a transmission operation of the image data; and a control unit that changes a turning-on state of an indicator of the image display apparatus so as to correspond to a user's transmission operation of the image data based on the instruction image.

(10) A display apparatus including a display unit that displays a predetermined image; a communication unit that performs communication of image data with another image display apparatus; an indicator unit that is disposed at at least a part of surroundings of the display unit and includes an indicator which is turned on with predetermined luminance; and a control unit that turns on the indicator during communication of the image data with another image display apparatus, in which the control unit turns on the indicator of the indicator unit only during a predetermined period before or after an indicator of another image display apparatus is turned on only during a predetermined period.

(11) The display apparatus according to the above (10), in which, of the indicators of another image display apparatus and the display apparatus, an indicator of an apparatus which is a transmission source of the image data is first turned on only during a predetermined period, and then an indicator of an apparatus which is a transmission destination of the image data is turned on only during a predetermined period.

(12) The display apparatus according to the above (10) or (11), in which the indicator of the indicator unit is turned on only during a predetermined period before or after an image in which a region near the indicator of the indicator unit has high luminance in the display unit is displayed.

(13) The display apparatus according to any one of the above (10) to (12), further including a proximity communication unit that detects that another image display apparatus is at least brought close to the indicator unit, in which the indicator of the indicator unit is further turned on in synchronization with turning-on of the indicator of another image display apparatus when proximity of another image display apparatus is detected by the proximity communication unit.

(14) A display control method for a display apparatus including a display unit that displays a predetermined image, a communication unit that performs communication of image data with another image display apparatus, an indicator unit that is disposed at at least a part of surroundings of the display unit and includes an indicator which is turned on with predetermined luminance, and a control unit that turns on the indicator during communication of the image data with another image display apparatus, the method including causing the control unit to turn on the indicator of the indicator unit only during a predetermined period before or after an indicator of another image display apparatus is turned on only during a predetermined period.

(15) A program causing a computer which controls a display apparatus, to perform the process of turning on an indicator of an indicator unit only during a predetermined period before or after an indicator of another image display apparatus is turned on only during a predetermined period while communication of image data with another image display apparatus is performed, in which the display apparatus includes a display unit that displays a predetermined image; a communication unit that performs communication of the image data with another image display apparatus; and an indicator unit that is disposed at at least a part of surroundings of the display unit and includes the indicator which is turned on with predetermined luminance.

REFERENCE SIGNS LIST

1 TELEVISION RECEIVER, 11 DISPLAY MAIN BODY, 12 SMART UNIT, 14 DISPLAY, 15 FRAME PART, 66 CONTROL SECTION, 84 LED INDICATOR, 85 TOUCH SENSOR, 87 WI-FI COMMUNICATION SECTION, 88 NFC COMMUNICATION SECTION, 89 BT COMMUNICATION SECTION, 93 CAMERA, 101 AV SIGNAL PROCESSING PORTION, 102 COMMUNICATION CONTROL PORTION, 103 LED CONTROL PORTION, 104 CAMERA CONTROL PORTION

The invention claimed is:

1. A display apparatus comprising:
a display configured to display an image;
communication circuitry configured to perform communication of image data with another image display apparatus;
light emitting indicator circuitry comprising an indicator outputting illumination configured to be turned on with a luminance; and
control circuitry configured to turn on the indicator in correspondence with a communication operation of the image data with another image display apparatus such that the indicator is turned on during a first part of a communication operation of the image data with the another image display apparatus and turned off when the first part of the communication operation of the image data with the another image display apparatus is complete.

2. The display apparatus according to claim 1, wherein the control circuitry is configured to turn on the indicator of the indicator circuitry during a period before or after an indicator of another image display apparatus is turned on during a period.

3. The display apparatus according to claim 1, wherein a second indicator of the another image display apparatus is configured such that the second indicator is turned on during a second part of the communication operation of the image with the display apparatus which takes place after the indicator is turned off.

4. The display apparatus according to claim 1, wherein the indicator is configured to be turned on under the control of the control circuitry when the display apparatus is selected as an output destination of image data of another image display apparatus.

5. The display apparatus according to claim 1, wherein the indicator is configured to be turned on under the control of the control circuitry during communication of the image data with another image display apparatus.

6. The display apparatus according to claim 1, wherein the indicator is configured to be turned on in cooperation with another image display apparatus under the control of the control circuitry such that light transitions to correspond to movement of the image data with another image display apparatus.

7. The display apparatus according to claim 1, wherein the communication circuitry is configured to receive the image data from another image display apparatus, and
wherein the control circuitry is configured to perform control for display in which an image corresponding to the received image data is output from the indicator circuitry and is configured to turn on the indicator in synchronization or interlocking with the display in which the image is output from the indicator circuitry.

8. The display apparatus according to claim 1, further comprising:
proximity communication circuitry configured to detect that another image display apparatus is in proximity of the indicator circuitry,
wherein the communication circuitry is configured to communicate with another image display apparatus which is in proximity of the display apparatus as a communication operation of the image data.

9. The display apparatus according to claim 1, wherein, of indicators of another image display apparatus and the display apparatus, an indicator of an apparatus which is a transmission source of the image data is first turned on only during a period, and then an indicator of an apparatus which is a transmission destination of the image data is turned on during a period.

10. The display apparatus according to claim 1, wherein the indicator of the indicator circuitry is turned on during a period before or after an image in which a region near the indicator of the indicator circuitry has high luminance in the display is displayed.

11. The display apparatus according to claim 1, further comprising:
proximity communication circuitry configured to detect that another image display apparatus is in proximity of the indicator circuitry, wherein the indicator of the indicator circuitry is configured to be turned on in synchronization with turning-on of the indicator of another image display apparatus when proximity of another image display apparatus is detected by the proximity communication circuitry.

12. A system comprising:
the display apparatus according to claim 1 and a portable terminal apparatus for performing transmission of image data with the display apparatus.

13. A display control method, comprising:
displaying an image;
performing communication of image data with another image display apparatus;
turning on an indicator of indicator circuitry at a luminance to correspond to a communication operation of the image data with another image display apparatus; and
causing control circuitry to turn on the indicator of the indicator circuitry during a period before or after an indicator of another image display apparatus is turned on during a period such that the indicator is turned on during a first part of a communication operation of the image data with the another image display apparatus and turned off when the first part of the communication operation of the image data with the another image display apparatus is complete.

14. The method according to claim 13, further comprising turning on the indicator under the control of the control circuitry when the display apparatus is selected as an output destination of the image data in another image display apparatus.

15. The method according to claim 13, further comprising turning on the indicator under the control of the control circuitry during transmission of the image data with another image display apparatus.

16. The method according to claim 13, further comprising turning on the indicator in cooperation with another image display apparatus under the control of the control circuitry so that light transitions to correspond to movement of the image data with another image display apparatus.

* * * * *